United States Patent [19]
Yagi et al.

[11] Patent Number: 5,825,366
[45] Date of Patent: Oct. 20, 1998

[54] METHOD AND APPARATUS FOR SYNTHESIZING IMAGES FOR VIDEO COMMUNICATION SYSTEMS

[75] Inventors: Takashi Yagi; Kazuho Arita, both of Yokosuka; Shigeru Oikawa, Kashiwa; Satoshi Ishibashi, Yokohama, all of Japan

[73] Assignee: Nippon Telegraph and Telephone Corporation, Tokyo, Japan

[21] Appl. No.: 832,851

[22] Filed: Apr. 4, 1997

Related U.S. Application Data

[63] Continuation of Ser. No. 298,549, Aug. 30, 1994, abandoned.

[30] Foreign Application Priority Data

Sep. 1, 1993 [JP] Japan .................................. 5-217124
Oct. 7, 1993 [JP] Japan .................................. 5-251306

[51] Int. Cl.$^6$ .................................................. G06T 11/60
[52] U.S. Cl. ........................... 345/433; 345/432; 345/113
[58] Field of Search ........................... 345/418–9, 426, 345/431–32, 433, 435, 440–41, 113–15; 382/169, 172

[56] References Cited

U.S. PATENT DOCUMENTS

| | | | |
|---|---|---|---|
| 4,160,994 | 7/1979 | Mendrala | 358/22 |
| 4,879,753 | 11/1989 | El-Sherbini | 382/50 |
| 5,095,447 | 3/1992 | Manns et al. | 395/161 |
| 5,134,668 | 7/1992 | Appel | 382/50 |
| 5,170,443 | 12/1992 | Todd | 382/50 |
| 5,187,754 | 2/1993 | Currin et al. | 382/54 |
| 5,227,863 | 7/1993 | Bilbrey et al. | 358/22 |
| 5,317,427 | 5/1994 | Ichikawa | 358/520 |
| 5,363,475 | 11/1994 | Baker et al. | 395/122 |
| 5,384,912 | 1/1995 | Ogrinc et al. | 395/164 |
| 5,412,399 | 5/1995 | Hara | 345/113 |
| 5,457,754 | 10/1995 | Han et al. | 382/128 |
| 5,463,728 | 10/1995 | Blahut et al. | 395/158 |
| 5,511,148 | 4/1996 | Wellner | 395/106 |

FOREIGN PATENT DOCUMENTS

| | | |
|---|---|---|
| 0 335 036 | 10/1989 | European Pat. Off. . |
| 0 447 197 | 9/1991 | European Pat. Off. . |
| 0 605 945 | 7/1994 | European Pat. Off. . |

OTHER PUBLICATIONS

Newman, et al, "A Desk Supporting Computer–based Interaction with Paper Documents", *ACM Conference on Human Factors in Computing Systems* (CHI '92) May 3–7, 1992, pp. 587–592.
Patent Abstracts of Japan, vol. 17, No. 547, Oct. 4, 1993.
Patent Abstracts of Japan, vol. 17, No. 102, Oct. 16, 1992.

*Primary Examiner*—Rudolph J. Buchel, Jr.
*Attorney, Agent, or Firm*—Finnegan, Henderson, Farabow, Garrett & Dunner, L.L.P.

[57] ABSTRACT

According to the method of synthesizing a image from a plurality of images, each of the luminance $I_{p1xy}$–$I_{pNxy}$ of each of the pixel $p_{1xy}$–$p_{Nxy}$ positioned at the same coordinates (x,y) of N images $P_1$–$P_N$ are compared with each of the predetermined threshold luminance $T_1$–$T_N$ corresponding to images $P_1$–$P_N$, wherein "N" is a natural number greater than 1. If the luminance $I_{p1xy}$–$I_{pNxy}$ of the pixels $p_{1xy}$–$p_{Nxy}$ are all greater than the corresponding threshold $T_1$–$T_N$ of corresponding image, the synthesized pixel $p_{xy}$ at the coordinate (x,y) of a synthesized image is determined by synthesizing the pixels $p_{1xy}$–$p_{Nxy}$ with predetermined synthesis ratio for each of the images $P_1$–$P_N$. If the condition described above is not satisfied, the synthesized pixel $p_{xy}$ at the coordinate (x,y) of the synthesized image is determined by synthesizing with arbitrary synthesis ratio only the pixels having luminance less than or equal to the corresponding threshold $T_1$–$T_N$ among the pixels $p_{1xy}$–$p_{Nxy}$. The procedure described above is performed with regard to all pixels in the region wherein images are to be synthesized.

10 Claims, 28 Drawing Sheets

METHOD AND APPARATUS FOR SYNTHESIZING IMAGES FOR VIDEO COMMUNICATION SYSTEMS

This application is a continuation, of application Ser. No. 08/298,549, filed Aug. 30, 1994, now abandoned.

BACKGROUND OF THE INVENTION

1. Field of the Invention

The present invention concerns methods and apparatus for the synthesis of images to be utilized on the terminals of video communication systems, especially those methods and apparatus which are used for the sending and receiving through communication lines of multiple images of writings or hand movements on a desktop of multiple users separated into remote locations. The images are synthesized, and with the use of display apparatus, it is possible for user to point with one's finger or pen and to write words at the desired location in the writings on their respective desktops. Such apparatus would make it possible to perform group work such as office work, design work, or software design on the individual desktops of the respective users.

2. Related Technology

Up until now, there has been a video communication terminal which is able to send and receive through communication lines video images of hand movements on the desktops of multiple users who are stationed at separate locations. The terminal offers a shared drawing space in which each person's video image is synthesized translucently, so that it is possible to see through. Displayed on a monitor, it is possible for many people to simultaneously give directions for the desired location on the video image by using a finger or a pen, as well as writing in words (see Japanese Patent Application Laid-Open Publication No. 4-119,087).

FIG. 24 shows a block diagram of the structure of a video communication system which utilizes this kind of video communication terminal. In FIG. 24, the two video communication terminals 1a and 1b are able to communicate in two directions through a communication line 2. The video communication terminals 1a and 1b are each made up of video image input apparatuses 3a and 3b, video image synthesis apparatuses 4a and 4b, display apparatuses 5a and 5b, and video image communication apparatuses 6a and 6b respectively. The video image input apparatuses 3a and 3b comprise video cameras, which take image of each person's desktop, and, for example, output the video images 7a and 7b shown in FIG. 25. The video image synthesis apparatus 4a carries out a translucent synthesis, so that the images are able to be seen through, of the video image 7a received directly from the video image input apparatus 3a and the video image 7b, which is received through the video image communication apparatus 6a and the communication line 2 from the video image communication apparatus 6b, which in turn received the image from the video image input apparatus 3b. In this way, the display apparatus 5a receives video image 8 as seen in FIG. 25. Similarly, the video image synthesis apparatus 4b carries out a translucent synthesis, of the video image 7b received directly from the video image input apparatus 3b and the video image 7a, which is received through the video image communication apparatus 6b and the communication line 2 from the video image communication apparatus 6a, which in turn received the image from the video image input apparatus 3a. In this way, the display apparatus 5b receives the video image 8 as seen in FIG. 25.

Next, the image synthesis method used by the image synthesis apparatuses 4a and 4b of the video communication system mentioned above (designated Prior Image Synthesis Method 1 from here on) will be explained. Regarding Prior Image Synthesis Method 1, suppose a synthesized image P is created by synthesizing two images P1 and P2, each of which have (X×Y) (X and Y are natural numbers) pixels, at arbitrary synthesis ratios. Suppose the pixels which lie on the coordinates (x,y)($1 \leq x \leq X$, $1 \leq y \leq Y$, x and y are natural numbers) on each image P1, P2, and P are designated $p_{1xy}$, $p_{2xy}$, and $p_{xy}$ respectively. If the synthesis ratio between the image P1 and P2 is set at $w_1:w_2$ ($w_1+w_2=1$, $w_1>0$, $w_2>0$), the image synthesis is carried out by using equation (1) on the pixels which are positioned at (x,y) of each image.

$$p_{xy}=w_1 p_{1xy}+w_2 p_{2xy} \tag{1}$$

Prior Image Synthesis Method 1 is explained using the flow chart in FIG. 26 as a reference. First, in step SA1, the register y to vary the y coordinates is set at an initial value of "1"; similarly, in step SA2, the register x to vary the x coordinates is set at an initial value of "1". Next, in step SA3, after carrying out the image synthesis using equation (1) for the set x and y coordinates, the procedure advances to step SA4, in which "1" is added to the value of the register x. In step SA5, it is determined whether or not the value of register x is greater than the maximum value X, and if the result is "NO", then the procedure returns to step SA3. Then, the procedure in steps SA3 and SA4 is repeated until the value of the register x becomes greater than the maximum value X. When the value of the register x becomes greater than the maximum X, the result of step SA5 becomes "YES", and the procedure advances to step SA6. In step SA6, "1" is added to the value of the register y. In step SA7, it is determined whether or not the value of the register y is greater than the maximum value Y, and if the result is "NO", then the procedure returns to step SA2. Then, the procedure in steps SA2–SA6 is repeated until the value of the register y becomes greater than the maximum value Y. When the value of the register y becomes greater than the maximum Y, the result of step SA7 becomes "YES", and the procedure ends.

In FIG. 27, the result in the case when Prior Image Synthesis Method 1 is used to create a translucent synthesized image is shown symbolically. In FIG. 27, if the synthesis ratio of image 9a and 9b is 0.5:0.5, then as shown in image 10, the synthesis of a black pixel and a white pixel (white pixel=1, black pixel=0) becomes a gray (0.5) pixel.

Because of this, when synthesizing two video images of desktops using Prior Image Synthesis Method 1; as seen in FIG. 25, the contrast of the drawings of both sides drops, and there was often a problem in seeing document and drawings clearly. In addition, as shown in FIG. 24, the two image communication terminals 1a and 1b are connected through the communication line 2 and each one synthesizes two images, but when the number of images to be synthesized increases due to the addition of more video communication terminals, the contrast decreases; and therefore, regarding the aforementioned Prior Image Synthesis Method 1, it was difficult to put into practice a video communication system which could synthesize several video images by connecting several separate locations through communication lines.

Additionally, regarding the aforementioned Prior Image Synthesis Method 1, when sharing document by means of a video image, for example, if a low-volume digital line such as N-ISDN is used for the communication line 2, then upon compression or decompression of the video image the quality drops sharply, and often, when used with business document, small words would become illegible.

In order to solve the problems in the aforementioned Prior Image Synthesis Method 1, there is another image synthesis method (designated Prior Image Synthesis Method 2) which adds the following technology to Prior Image Synthesis Method 1. This Prior Image Synthesis Method 2 has technology which adds a apparatus which preserves the document by sending it as high-precision still images, then translucently synthesizes these high-precision still images with the video images from each video communication terminal (see Japanese Patent Application Laid-Open Publication No. 6-153,192).

FIG. 28 shows a block diagram of a structural example of a video communication system which uses Prior Image Synthesis Method 2. In FIG. 28, the two video communication terminals 9a and 9b are connected by a communication line 10 and are able to communicate in either direction. The video communication terminals 9a and 9b are made up of video image input apparatuses 11a and 11b, still image memories 12a and 12b, image synthesis apparatuses 13a and 13b, display apparatuses 14a and 14b, and video/still image communication apparatuses 15a and 15b respectively. The video image input apparatuses 11a and 11b comprise high-resolution cameras which are able to capture a document very precisely.

Next, the Prior Image Synthesis Method 2 is explained with reference to FIG. 28. First, in the video communication terminal 9a, in order to use the document in both video communication apparatus 9a and 9b, the document which is on a desktop is captured by the video image input apparatus 11a, then a single frame of the captured image is stored in the still image memory 12a as a still image. Next, the video/still image communication apparatus 15a sends the still image, which was stored in the still image memory 12a, through the communication line 10 to the video communication terminal 9b. The video communication terminal 9b stores the still image, which was received by the video/still image communication apparatus 15b from the video communication terminal 9a, in the still image memory 12b.

Next, in the video communication terminal 9a, the desktop is captured by the video image input apparatus 11a, the captured video image is sent to the video communication terminal 9b through the communication line 10 by the video/still image communication apparatus 15a. Meanwhile, the still image which was held in the still image memory 12a, the video image which was captured by the video image input apparatus 11a, and the video image from the video communication terminal 9b, which was obtained through the video/still image communication apparatus 15a, are combined translucently, so that each image is able to be seen, by the image synthesis apparatus 13a, and displayed on the display apparatus 14a.

Similarly, in the video communication terminal 9b, the desktop is captured by the video image input apparatus 11b, the captured video image is sent to the video communication terminal 9a through the communication line 10 by the video/still image communication apparatus 15b. Meanwhile, the still image which was held in the still image memory 12b, the video image which was captured by the video image input apparatus 11b, and the video image from the video communication terminal 9a, which was obtained through the video/still image communication apparatus 15b, are combined translucently, so that each image is able to be seen, by the image synthesis apparatus 13b, and displayed on the display apparatus 14.

In the aforementioned video communication terminals 9a and 9b, as shown in FIG. 29, when the video image 16a (captured by the video image input apparatus 11a) taken by capturing one's own desktop, video image 16b (captured by the video image input apparatus 11b) taken be capturing another person's desktop, and the still image 17 which was held in the still image memory 12a are synthesized translucently so that each image is visible, as shown in the image 18, it is possible to create a shared work space in which both video communication apparatus 9a and 9b can simultaneously write in comments regarding the still image 17.

In the aforementioned Prior Image Synthesis Method 2, by sending document as still images separate from the video images and making the document image high precision, the need to write directly on the paper is dropped, and it is possible for both sides to write on the document image simultaneously.

However, in the aforementioned Prior Image Synthesis Method 2, because the still image is combined with the video images translucently, as shown in the synthesized image 18 in FIG. 29, the contrast of the still image drops, and a problem with not being able to read the document remains.

SUMMARY OF THE INVENTION

The object of this invention is to offer methods and apparatus for image synthesis which can eliminate the visual problems caused by the drop in contrast resulting when multiple video images and still images are synthesized translucently, and make it possible for a video communication terminal to offer a shared work space connecting several locations.

Therefore, this invention compares the luminances $I_{p1xy}$–$I_{pNxy}$ of each pixel $p_{1xy}$–$p_{Nxy}$ positioned at the same coordinates (x,y) of N (N is a natural number greater than 1) images $P_1$–$P_N$, and determine whether all of the luminances $I_{p1xy}$–$I_{pNxy}$ are greater than their threshold values of $T_1$–$T_N$. If all of those luminances are greater, then the respective pixels $p_{1xy}$–$p_{Nxy}$ of each image $P_1$–$P_N$ are synthesized at their predetermined synthesis ratios, and the result of the syntheses are taken as the synthesized pixels $p_{xy}$ at the relevant coordinates (x,y) of the synthesized image. Otherwise, of the respective pixels $p_{1xy}$–$p_{Nxy}$ of the images $P_1$–$P_N$, only the pixels which have a luminance $I_{p1xy}$–$I_{pNxy}$ less than the threshold values $T_1$–$T_N$ are synthesized at the arbitrary synthesis ratios, and the results of the synthesis for each coordinate (x,y) on the synthesized image is taken as the synthesized pixel $p_{xy}$. The procedure is carried out for each region which needs to be synthesized.

The present invention has the ability to perform well a procedure in which it compares the respective luminance $I_{p1xy}$–$I_{pNxy}$ of the pixels $p_{1xy}$–$p_{Nxy}$ positioned at the same coordinates (x,y) on the N (N is a natural number greater than 1) images $P_1$–$P_N$, and take the pixel with the lowest luminance as the synthesized pixel $p_{xy}$ on the relevant coordinates (x,y) of the synthesized image for all regions which need to be synthesized.

In addition, the invention uses an image synthesis method which synthesizes N (N is a natural number greater than 1) video images $V_1$–$V_N$ and M (M is a natural number) still images $S_1$–$S_M$. If M is equal to "1", then the relevant still image $S_1$ is taken as the synthesized still image S, and if M is greater than "1", then it compares the respective luminance $I_{s1xy}$–$I_{sMxy}$ of those pixels $s_{1xy}$–$s_{Nxy}$ lying on the same coordinates (x,y) of the M still images with the respective threshold luminance $T_{s1}$–$T_{sM}$ which have been predetermined for each previous still image $S_1$–$S_M$ to see whether all of the luminances $I_{s1xy}$–$I_{sMxy}$ are greater than their respective thresholds $T_{s1}$–$T_{sM}$. If all of those luminances are greater, then the respective pixels $s_{1xy}$–$s_{Mxy}$ of the previous still images $S_1$–$S_M$ are synthesized at the predetermined synthesis ratios, and the result of the synthesis is taken as synthesized still image pixel $s_{xy}$ on the relevant coordinates (x,y) of synthesized still image S. Otherwise, of the respective pixels $s_{1xy}$–$s_{Mxy}$ of the previous still image $S_1$–$S_M$, only those which have luminances $I_{s1xy}$–$I_{sMxy}$ less than or equal to the threshold values $T_1$–$T_M$ are synthesized at their respective predetermined synthesis ratios, and the result of the synthesis is taken as synthesized still image pixel $s_{xy}$ on the relevant coordinates (x,y) of synthesized still image S. This procedure is repeated for all regions which need to be synthesized in order to create synthesized still image S. Then it compares the respective luminance $I_{v1xy}$–$I_{vNxy}$ of those pixels $v_{1xy}$–$v_{Nxy}$ lying on the same coordinates (x,y) of the N video images with the respective threshold luminance $T_{v1}$–$T_{sN}$ which have been predetermined for each previously mentioned video image $V_1$–$V_N$ to see whether all of the luminances $I_{v1xy}$–$I_{vNxy}$ are greater than their respective thresholds $T_{v1}$–$T_{vN}$. If all of those luminances are greater, then the synthesized still image pixel $s_{xy}$ positioned at the relevant coordinates (x,y) on the previously mentioned synthesized still image S is taken as the synthesized pixel $p_{xy}$ located at the relevant coordinates (x,y) of synthesized image P. Otherwise, then of the respective pixels $v_{1xy}$–$v_{Nxy}$ of the previously mentioned video images $V_1$–$V_N$, only those pixels with luminances $I_{v1xy}$–$I_{vNxy}$ which are less than or equal to their threshold values $T_1$–$T_N$ are synthesized at their arbitrary synthesis ratios, and the result of the synthesis is taken as synthesized pixel $p_{xy}$ located at the relevant coordinates (x,y) on synthesized image P. This procedure is repeated for all regions which need to be synthesized.

In addition, the invention uses an image synthesis method which synthesizes N (N is a natural number greater than 1) video images $V_1$–$V_N$ and M (M is a natural number) still images $S_1$–$S_M$. If M is equal to "1", then the relevant still image $S_1$ is taken as the synthesized still image S, and if M is greater than "1", then it compares the respective luminance $I_{s1xy}$–$I_{sMxy}$ of those pixels $s_{1xy}$–$s_{Mxy}$ lying on the same coordinates (x,y) of the M still images, and takes the pixel with the least luminance as the synthesized still image pixel $s_{xy}$ positioned at the relevant coordinates (x,y) on synthesized still image S. This procedure is repeated over all regions which need to be synthesized and the result is the synthesized still image S. Then it compares the respective luminance $I_{v1xy}$–$I_{vNxy}$ of those pixels $v_{1xy}$–$v_{Nxy}$ lying on the same coordinates (x,y) of the N video images $V_1$–$V_N$ with the respective threshold luminance $T_{v1}$–$T_{vN}$ which have been predetermined for each previously mentioned video image $V_1$–$V_N$ to see whether all of the luminances $I_{v1xy}$–$I_{vNxy}$ are greater than their respective thresholds $T_{v1}$–$T_{vN}$. If they are greater, then the synthesized still image pixel $s_{xy}$ positioned at the relevant coordinates (x,y) on the previously mentioned synthesized still image S is taken as the synthesized pixel $p_{xy}$ located at the relevant coordinates (x,y) of synthesized image P. Otherwise, of the respective pixels $v_{1xy}$–$v_{Nxy}$ of the previously mentioned video images $V_1$–$V_N$, the pixel with the lowest luminance out of those pixels with luminances $I_{v1xy}$–$I_{vNxy}$ less than or equal to their thresholds $T_{v1}$–$T_{vN}$ is taken as the synthesized pixel $p_{xy}$ located at the relevant coordinates (x,y) on the synthesized image P. The procedure is repeated over all regions which need to be synthesized.

Additionally, the invention uses an image synthesis method which synthesizes N (N is a natural number greater than 1) video images $V_1$–$V_N$ and M (M is a natural number) still images $S_1$–$S_M$. If M is equal to "1", then the relevant still image $S_1$ is taken as the synthesized still image S, and if M is greater than "1", then it compares the respective luminance $I_{s1xy}$–$I_{sMxy}$ of those pixels $s_{1xy}$–$s_{Mxy}$ lying on the same coordinates (x,y) of the M still images, and takes the pixel with the least luminance as the synthesized still image pixel $s_{xy}$ positioned at the relevant coordinates (x,y) on synthesized still image S. This procedure is repeated over all regions which need to be synthesized and the result is the synthesized still image S. Then it compares the respective luminance $I_{v1xy}$–$I_{vNxy}$ of those pixels $v_{1xy}$–$v_{Nxy}$ lying on the same coordinates (x,y) of the N video images $V_1$–$V_N$ and chooses the pixel with the lowest luminance. If the luminance of the pixel is greater than the predetermined threshold value, then the synthesized still image pixel $s_{xy}$ which lies on the relevant coordinates (x,y) of the previously mentioned synthesized still image S is taken as the synthesized pixel $p_{xy}$ lying on the relevant coordinates (x,y) of the synthesized image P. Otherwise, then the previously mentioned pixel with the lowest luminance is taken as synthesized pixel $p_{xy}$ lying on the relevant coordinates (x,y) of synthesized image P. This procedure is repeated for all regions which need to be synthesized.

Additionally, the invention is an image synthesis apparatus which synthesizes N (N is a natural number greater than 1) images $P_1$–$P_N$ pixel by pixel, and being so, it has the ability to compare the luminance signals $I_{p1}$–$I_{pN}$ of images $P_1$–$P_N$ and the threshold value signals $S_{T1}$–$S_{TN}$ which were predetermined for the aforementioned images $P_1$–$P_N$; and employs a comparison technique in which it outputs Data 1 regarding all of the luminance signals which are less than or equal to their corresponding threshold value signals or Data 2 that all luminance signals are greater than their corresponding threshold value signals, and a synthesis technique in which it synthesizes the images which have the luminance signals specified by the data at their respective arbitrary ratios if Data 1 is reported or it synthesizes the all images $P_1$–$P_N$ at their respective predetermined ratios if Data 2 is reported.

In addition, the invention is an image synthesis apparatus which synthesizes N (N is a natural number greater than 1) images $P_1$–$P_N$ pixel by pixel, and being so, it has the ability to compare the luminance signals $I_{p1}$–$I_{pN}$ of images $P_1$–$P_N$; employs a comparison technique in which it outputs data regarding the lowest luminance signals, and a selection technique in which it chooses and outputs the images which have those luminance signals which were specified by the data.

Additionally, the present invention is an image synthesis apparatus which synthesizes N (N is a natural number greater than 1) video images $V_1$–$V_N$ and M (M is a natural number) still images $S_1$–$S_M$ pixel by pixel. It performs Comparison Technique 1 in which it compares the luminance signals $I_{s1}$–$I_{sM}$ of still images $S_1$–$S_M$ and the respective predetermined threshold value signals $S_{Ts1}$–$S_{TsM}$ of the aforementioned still images $S_1$–$S_M$, outputs Data 0 regarding all of the luminance signals which are less than or equal to their corresponding threshold value signals or Data 1 if all the luminance signals are greater than their corresponding threshold value signals. Then, it performs Synthesis Technique 1 in which it synthesizes the still image which have luminance signals referred by the aforementioned Data 0 at their respective arbitrary ratios if Data 0 is reported or it synthesizes all still images $S_1$–$S_M$ at their respective predetermined ratios if Data 1 is reported, and it performs Comparison Technique 2 in which it compares the luminance signals $I_{v1}$–$I_{vN}$ of the N video images $V_1$–$V_N$ with the respective predetermined threshold value signals $S_{Tv1}$–$S_{TvN}$ of the aforementioned images $V_1$–$V_N$. If the luminance signals $I_{v1}$–$I_{vN}$ of all N video images $V_1$–$V_N$ are greater than their respective threshold value signals $S_{Tv1}$–$S_{TvN}$, it outputs that information as Data 3. Otherwise, it outputs data regarding all of the luminance signals $I_{v1}$–$I_{vN}$ which are less than or equal to their corresponding threshold value signals $S_{Tv1}$–$S_{TvN}$ as Data 2. If the aforementioned Data 3 is input, the previously mentioned synthesized still image is output as the synthesized image; otherwise, it performs Synthesis Technique 2, in which it outputs the synthesized image created by synthesizing the video images which have luminance signals referred to by the aforementioned Data 2 at their respective arbitrary ratios.

Additionally, the present invention is an image synthesis apparatus which synthesizes N (N is a natural number greater than 1) video images $V_1$–$V_N$ and M (M is a natural number) still images $S_1$–$S_M$ pixel by pixel. It compares the luminance signals $I_{s1}$–$I_{sM}$ of still images $S_1$–$S_M$, performs Comparison Technique 1 in which it outputs Data 1 regarding the lowest level luminance signals, performs the Selection Technique in which it selects those images with luminance signals referred to by the aforementioned Data 1 to be the synthesized still images, and employs Comparison Technique 2 in which it compares the luminance signals $I_{v1}$–$I_{vN}$ of the N video images $V_1$–$V_N$ with the respective predetermined threshold value signals $S_{Tv1}$–$S_{TvN}$ of the aforementioned images $V_1$–$V_N$. If the luminance signals $I_{v1}$–$I_{vN}$ of all N video images $V_1$–$V_N$ are greater than their respective threshold value signals $S_{Tv1}$–$S_{TvN}$, it outputs that information as Data 3. Otherwise, it outputs data regarding the lowest level luminance signals as Data 2. If the aforementioned Data 3 is input, the previously mentioned synthesized still image is output as the synthesized image; otherwise, it outputs the video image which contains the luminance signals referred to by the aforementioned Data 2.

In addition, the present invention is an image synthesis apparatus which synthesizes N (N is a natural number greater than 1) video images $V_1$–$V_N$ and M (M is a natural number) still images $S_1$–$S_M$ pixel by pixel. It employs Comparison Technique 1 in which it compares the luminance signals $I_{s1}$–$I_{sM}$ of still images $S_1$–$S_M$, outputs Data 1 regarding the lowest level luminance signals, performs the Selection Technique in which it selects those images with luminance signals referred to by the aforementioned Data 1 to be the synthesized still images, and employs Comparison Technique 2, in which it compares the luminance signals $I_{v1}$–$I_{vN}$ of the N video images $V_1$–$V_N$. It outputs Data 2 which pertains to the lowest level luminance signals and compares those lowest level luminance signals with the predetermined threshold values. If the aforementioned luminance signal is greater than the aforementioned threshold value signal, it outputs that information as Data 3. If the aforementioned Data 3 is input, then it outputs the aforementioned synthesized still image as the synthesized image. Otherwise, it outputs the video image referred to in the aforementioned Data 2.

With the use of the present invention the clarity of text and drawings in shared work spaces increases; especially when using document as a still image, the drop in contrast is able to be eliminated. In addition, especially in the case when several video images are synthesized, since a similar increase in the contrast is possible, there is the advantage that a multiple-location shared work space can be created by linking several points and synthesizing several desktop images. There is also the advantage that a shared work space is possible in which it is not necessary to write directly on the text in the still image.

DETAILED DESCRIPTION OF THE INVENTION

Below is an explanation of the embodiments of the invention, using the figures as a guide.

Embodiment 1

First, an explanation of the invention's first embodiment. Regarding Embodiment 1, N (N is a natural number greater than 1) images $P_1$–$P_N$, which are each made up of X×Y pixels (X and Y are natural numbers), are mixed in a ratio of W1:W2: ... :$W_{N-1}$:$W_N$ (with the condition that $W_1 + W_2 + ... + W_{N-1} + W_N = 1$; $W_1, W_2, ..., W_{N-1}, W_N > 0$) and a synthesized image is formed. In this case, the pixel corresponding to each coordinate (x,y) (1≦x≦X, 1≦y≦Y, where x and y are natural numbers) in each image $P_n$ (1≦n≦N, n is a natural number) is designated $p_{nxy}$, and each such pixel $p_{nxy}$ is given a luminance $I_{pnxy}$ (0≦$I_{pnxy}$≦1; wherein 0=black, 1=white). In addition, for each image $P_n$, the threshold luminance $T_n$ (0≦$T_n$≦1) for each pixel is set.

Figure 1:
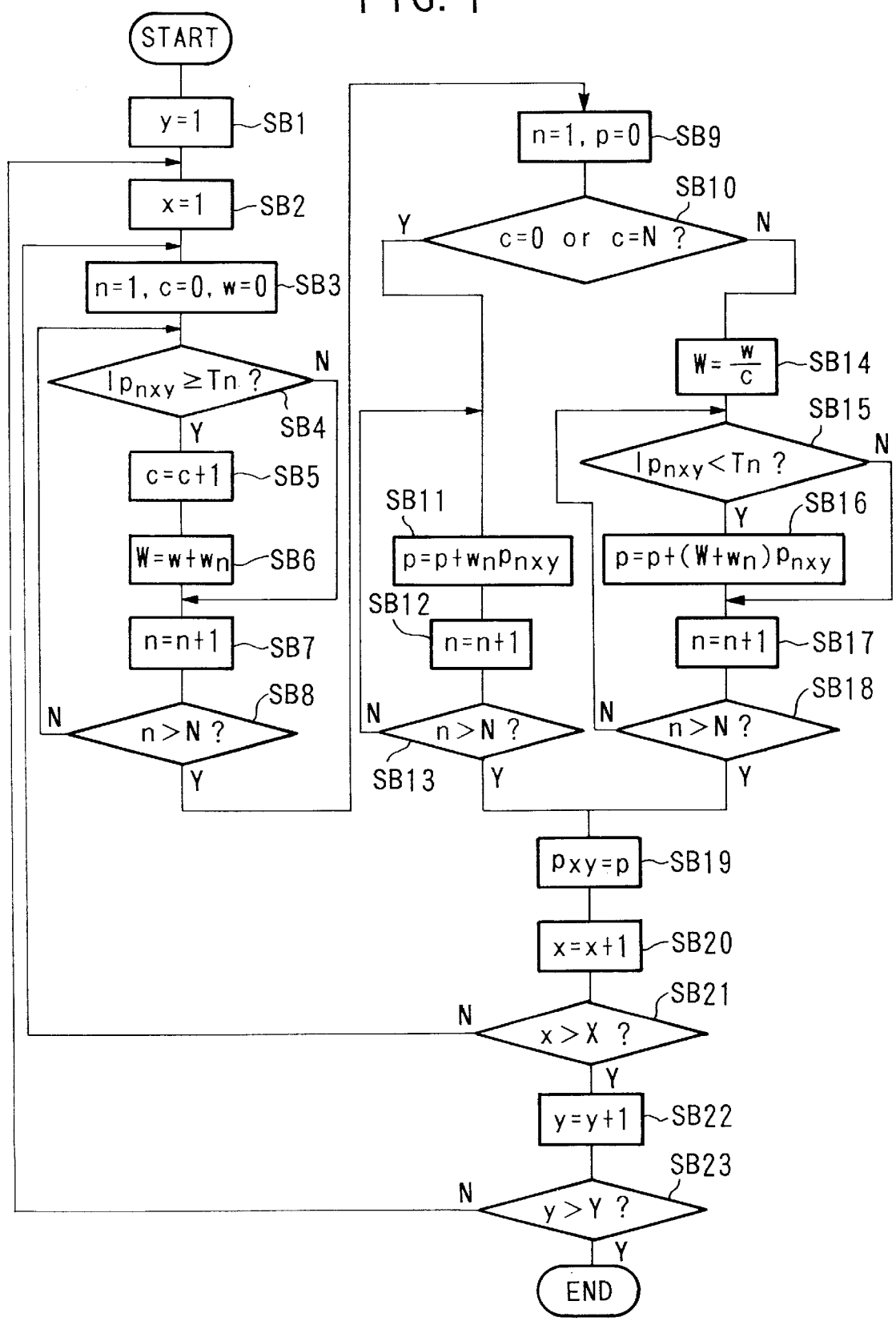
FIG. 1 is a flow chart showing the image synthesis method of Embodiment 1 of the present invention.

Next, the image synthesis method of the first embodiment of the invention is explained with reference to the flow chart shown in FIG. 1. First, in step SB1, the register for the y coordinates is set to "1" as an initial value, likewise, in step SB2, the register for the x coordinates is set to "1". Next, in step SB3, the initial value of the variable n which indicates the order of the images P is set at "1", the value of the variable c which represents the number of pixels which have a luminance greater than or equal to the threshold $T_n$ is set at "0", and the value of w which is the sum of the synthesis ratios of the pixels which have a luminance greater than or equal to the threshold $T_n$ is set at "0", then the procedure advances to step SB4.

In step SB4, it is determined whether or not the luminance $I_{pnxy}$ of the pixel $p_{nxy}$ which is positioned at the coordinates (x,y) of the relevant image $P_n$ is greater than or equal to the threshold $T_n$. If the answer is "YES" then the procedure advances to step SB5.

In step SB5, after "1" is added to the variable c and then the procedure advances to step SB6, where the synthesis ratio of the relevant pixel $p_{nxy}$ is added to the sum of the synthesis ratios w, the procedure moves on to step SB7. Additionally, if the result of step SB4 is "NO", that is, if the luminance $I_{pnxy}$ of pixel $p_{nxy}$ is less than the threshold $T_n$, the procedure advances to step SB7 also.

In step SB7, "1" is added to the variable n, and in step SB8, it is determined whether or not variable n is greater than the number of images N. If the answer is "NO", then the procedure returns to step SB4. Then, steps SB4–SB7 are repeated using each pixel $p_{nxy}$ which corresponds to the coordinates (x,y) in all of the images. Thus, for the coordinates (x,y) in each image $P_n$, the number c of pixels $p_{nxy}$ which have a luminance $I_{pnxy}$ grater than or equal to the threshold $T_n$ and the sum of the synthesis ratios w is calculated. Then, the procedure from step SB4 through SB7, considering each pixel $p_{nxy}$ which lies on the coordinates (x,y) of each image, is completed. The value of variable n becomes greater than N, the result of step SB8 becomes "YES", and the procedure advances to step SB9.

In step SB9, the initial value of variable n is set at "1", and the initial value of p which indicates the synthesized value of N pixels $p_{nxy}$ which are positioned on the coordinates (x,y) of N images, is set at "0".

In step SB10, it is determined whether variable c is equal to "0" or equal to N, that is, whether the luminances of all N pixels which are positioned on the coordinates (x,y) of N images is less than the threshold $T_n$ (c=0), or else it is greater than or equal to the threshold $T_n$ (c=N). If the result is "YES", then the procedure advances to step SB11.

In step SB11, the p is constructed with the use of equation (2) and the procedure moves on to step SB12.

$$p = p + w_n p_{nxy} \quad (2)$$

In step SB12, "1" is added to variable n, and in step SB13, it is determined whether variable n is greater than the number N of images. If the answer is "NO", then the procedure returns to step SB11. Then, the procedures of SB11 and SB12 are repeated with each pixel $p_{xny}$ positioned at each coordinate (x,y) of all the images. Thus, all of the pixels $p_{nxy}$ which correspond to each coordinate (x,y) in each image at a ratio $w_n$ are combined. Then, each pixel $p_{nxy}$ corresponding to the coordinates (x,y) in all of the images completes the procedure in steps SB11 and SB12, and when the value of variable n becomes greater than N, the result of step SB13 becomes "YES", and the procedure advances to step SB19.

On the other hand, if the result of step SB10 is "NO", that is, if variable c is equal to neither "0" nor N, then the procedure advances to step SB14. In step SB14, the average value W (=w/c) of the synthesis ratio with regard to the pixels having luminance greater than or equal to the threshold $T_n$ is calculated, and in step SB15, it is determined whether the luminance $I_{pnxy}$ of each pixel $p_{nxy}$ positioned on the coordinates (x,y) of the relevant image $P_n$ is less than the threshold $T_n$. If the answer is "YES", the procedure advances to step SB16.

In step SB16, the p is created by using equation (3) and the procedure moves on to step SB17.

$$p=p+(W+W_n)p_{nxy} \qquad (3)$$

Of course, if the result of step SB15 is "NO", meaning that the luminance $I_{pnxy}$ of the pixel $p_{nxy}$ is not less than the threshold $T_n$ the procedure also advances to step SB17.

In step SB17, "1" is added to the variable n, and in step SB18, it is determined whether variable n is greater than the number N of images. If the answer is "NO", the procedure returns to step SB15. Then, the procedure of steps SB15–SB17 is repeated with each pixel $p_{nxy}$ corresponding to each coordinate (x,y) in the image. Thus, the procedure from step SB15 through step SB17 is completed for each pixel $p_{nxy}$ corresponding to each coordinate (x,y) in the image. If the value of variable n becomes greater than N, the result of step SB18 becomes "YES" and the procedure advances to step SB19.

In step SB19, the pixel $p_{xy}$ which corresponds to the coordinates (x,y) of the synthesized image P is set equal to the p and then the procedure advances to step SB20. In step 20, "1" is added to the value of the register x. In step SB21, it is determined whether or not the value of register x is greater than its maximum value of X, and if the answer is "NO", the procedure returns to step SB3. Then, the procedure of steps SB3–SB20 is repeated until the value of the register x becomes greater than its maximum value of X. When the value of the register x becomes greater than the maximum value and the determination of step SB21 becomes "YES", then advance to step SB22. In step SB22, "1" is added to the value of the register y. In step SB23, it is determined whether or not the value of the register y is greater than the maximum value Y, and if the result is "NO", then the procedure returns to step SB2. Then, the procedure of steps SB2–SB22 is repeated until the value of the register y becomes greater than the maximum value of Y. When the value of the register y becomes greater than the maximum value Y, and the result of step SB23 becomes "YES", then the procedure ends.

In the aforementioned Embodiment 1, when synthesizing pixels, an example was used in which the synthesis ratios of the non-synthesizing pixels were averaged and distributed (the procedure in step SB16), but by using equation (4), it is possible to distribute the synthesis ratio of the non-synthesizing pixels proportionally with the synthesis ratio of the synthesizing pixels.

$$p = p + \left( \frac{w}{1-w} wn + wn \right) \cdot pnxy \qquad (4)$$

Figure 2:
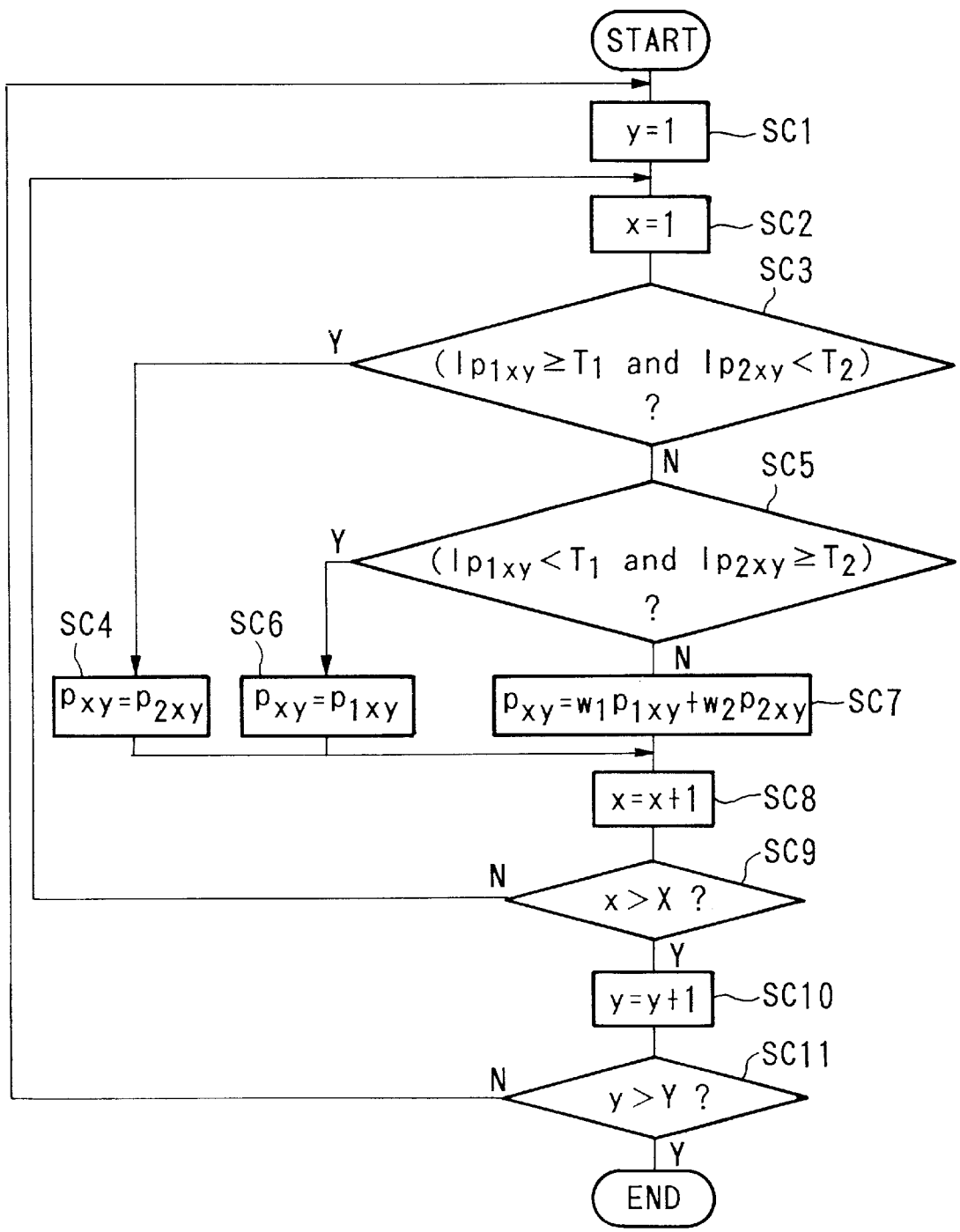
FIG. 2 is a flow chart to show the procedure in the case in which two images P1 and P2 are synthesized using Embodiment 1 of the present invention.

Next, regarding the aforementioned Embodiment 1, if N=2, that is, in the case in which there are two images $P_1$ and $P_2$ which are to be synthesized, the procedure is explained with the help of the flow chart which is given in FIG. 2. First, in step SC1, the register to vary the y coordinates is set at an initial value of "1", and in step SC2, the initial value of the register to vary the x coordinate is set at "1" as well. Next, in step SC3, it is determined whether or not the luminance $I_{p1xy}$ of the pixel $p_{1xy}$ positioned at coordinates (x,y) on image $P_1$ is greater than or equal to the threshold $T_1$, and the luminance $I_{p2xy}$ of the pixel $p_{2xy}$ positioned at coordinates (x,y) on image $P_2$ is less than the threshold $T_2$. If the result is "YES" then the procedure advances to step SC4.

In step SC4, the synthesized pixel $p_{xy}$ corresponding to the coordinates (x,y) on the synthesized image P is set equal to pixel $p_{2xy}$ of image $P_2$ and then the procedure advances to step SC8.

If the result of step SC3 is "NO", that is, if the luminance $I_{p1xy}$ of pixel $p_{1xy}$ is less than the threshold of $T_1$, or if the luminance $I_{p2xy}$ of pixel $p_{2xy}$ is greater than or equal to the threshold of $T_2$, then the procedure advances to step SC5.

In step SC5, it is determined whether or not the luminance $I_{p1xy}$ of pixel $p_{1xy}$ is less than the threshold $T_1$, and the luminance $I_{p2xy}$ of the pixel $p_{2xy}$ is greater than or equal to the threshold $T_2$. If the result is "YES", then the procedure advances to step SC6. In step SC6, the synthesized pixel $p_{xy}$ is set equal to the pixel $p_{1xy}$ and the procedure advances to step SC8.

On the other hand, if the result in step SC5 is "NO", that is, if the luminance $I_{p1xy}$ of pixel $p_{1xy}$ is greater than or equal to the threshold $T_1$, or the luminance $I_{p2xy}$ of pixel $p_{2xy}$ is less than the threshold T2, then the procedure advances to step SC7. In step SC7, the synthesized pixel $p_{xy}$ is constructed by using equation (5) and then the procedure advances to step SC8.

$$p_{xy}=w_1p_{1xy}+w_2p_{2xy} \qquad (5)$$

In step SC8, "1" is added to the value of the register x. In step SC9, it is determined whether or not the value of the register x is greater than the maximum value X, and if the result is "NO", then the procedure returns to step SC3. Then, the procedure in steps SC3–SC8 is repeated until the register's value is greater than the maximum value X. When the value of the register x becomes greater than the maximum of X, and the result of step SC9 becomes "YES", then the procedure advances to step SC10.

In step SC10, "1" is added to the value of the register y. In step SC11, it is determined whether or not the value of the register y is greater than the maximum value of Y, and if the result is "NO", then the procedure returns to step SC2. Then, the procedure in steps SC2–SC10 is repeated until the register's value is greater than the maximum value Y. When the value of the register y becomes greater than the maximum of Y, and the result of step SC11 becomes "YES", then the procedure ends.

Figure 3:
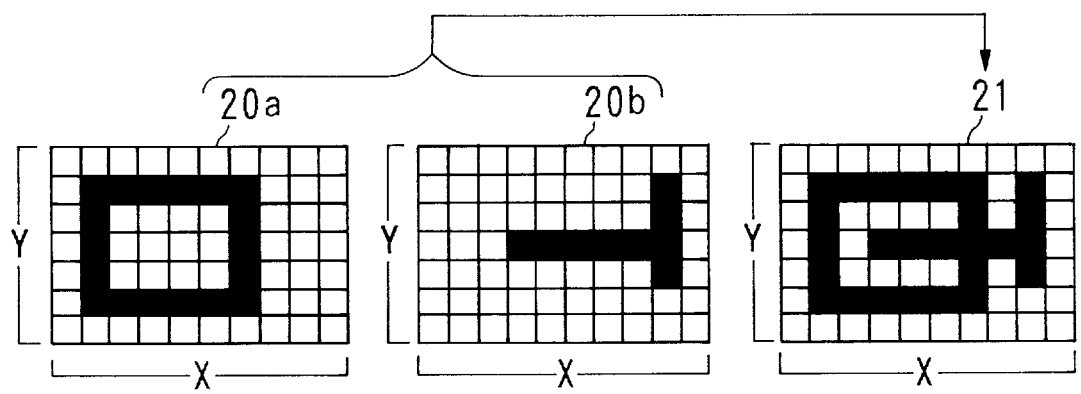
FIG. 3 is a diagram showing the way in which two images P1 and P2 are synthesized using Embodiment 1 of the present invention.
Figure 27:
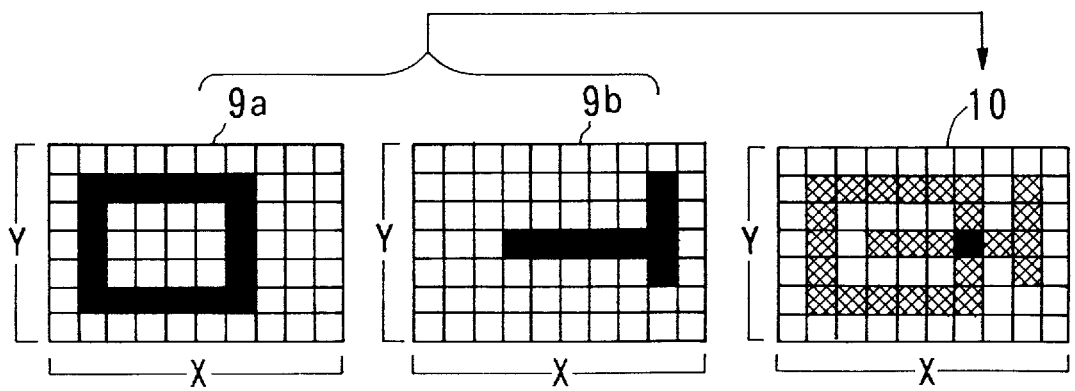
FIG. 27 is a diagram showing symbolically how a translucent synthesized image is created by Prior Image Synthesis Method 1.
Figure 28:
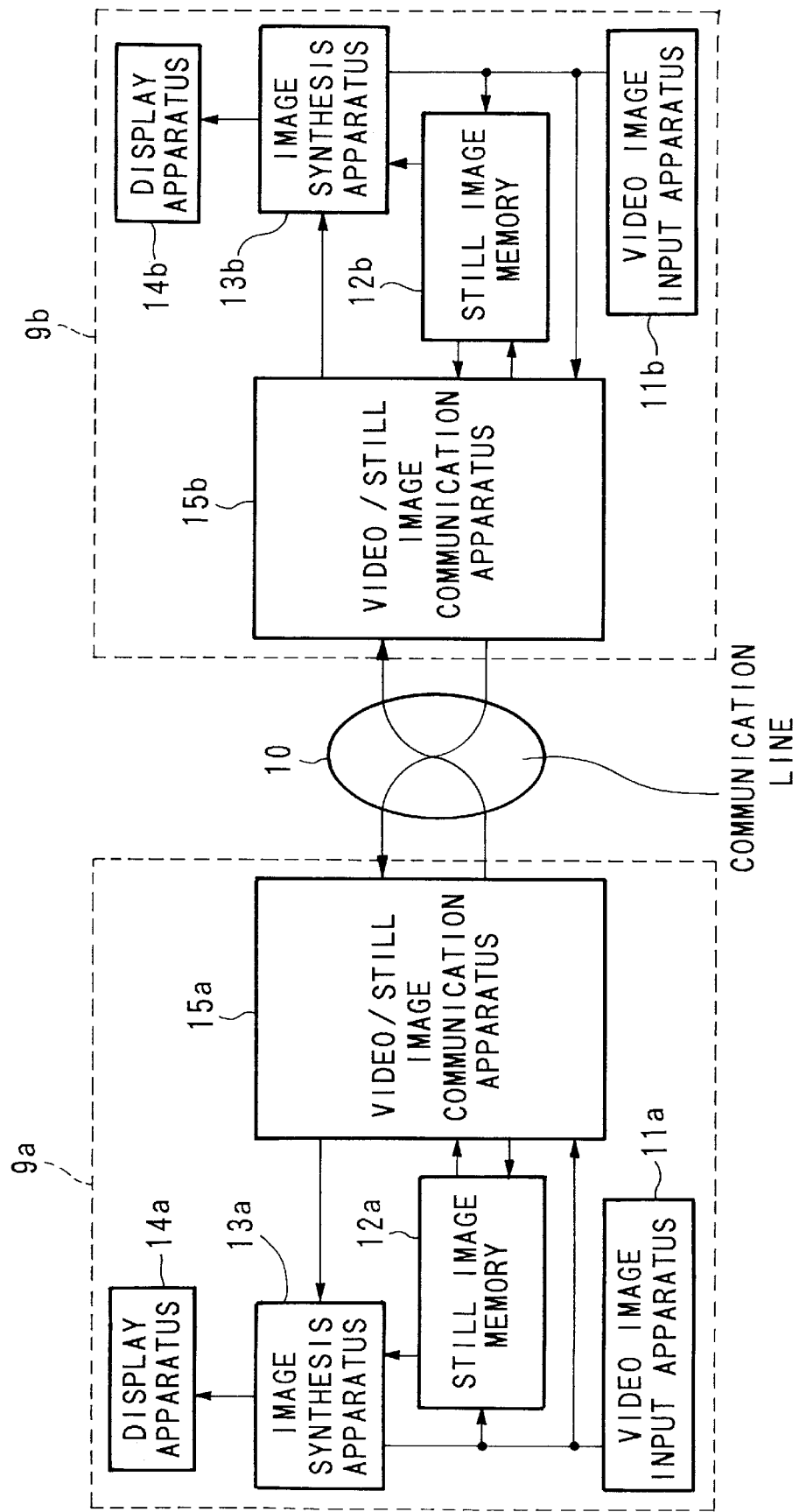
FIG. 28 is a block diagram showing a structural example of an image communication system using Prior Image Synthesis Method 2.
Figure 29:
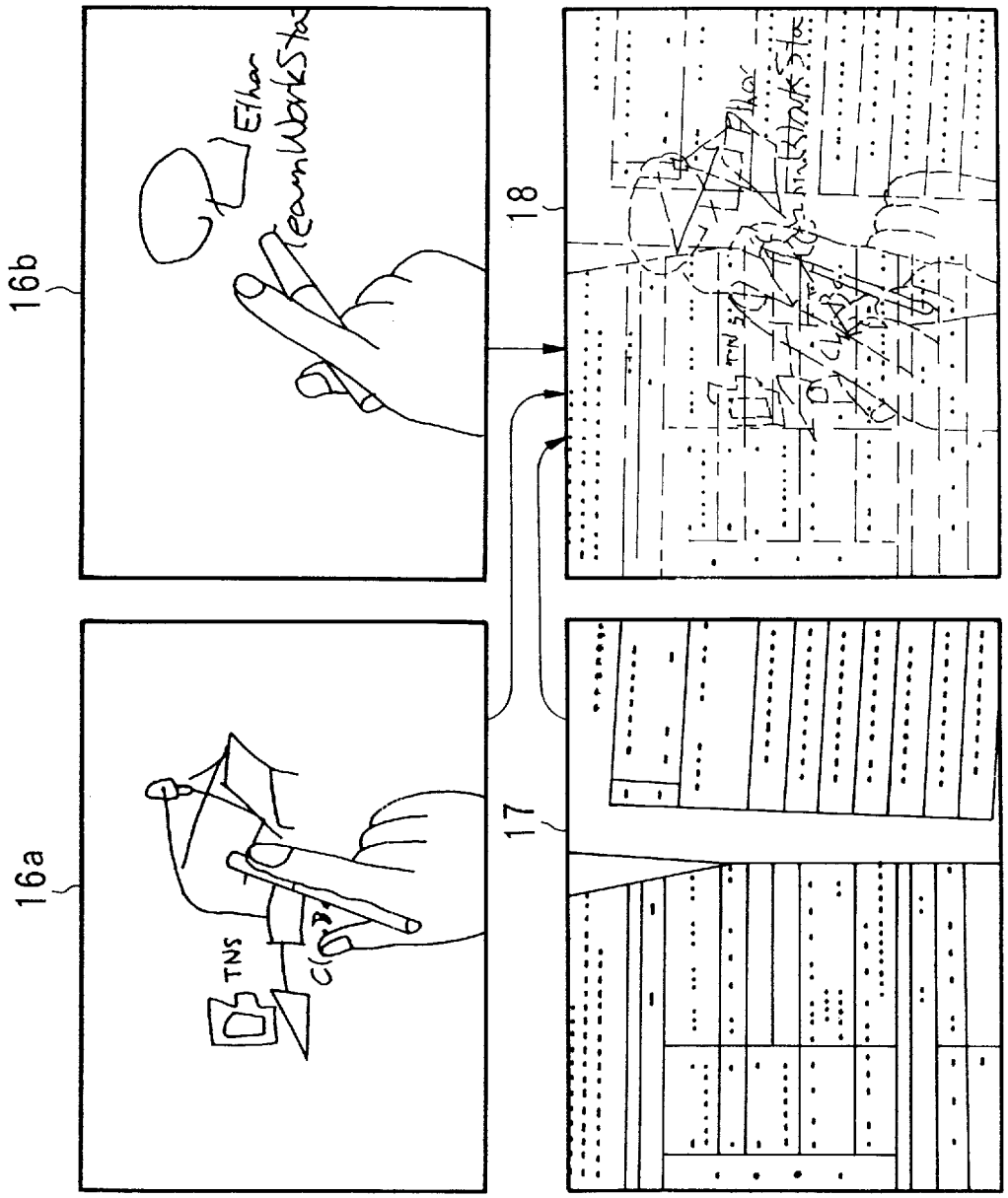
FIG. 29 is a diagram to explain Prior Image Synthesis Method 2.

FIG. 3 shows symbolically how a synthesized image P is constructed out of two images $P_1$ and $P_2$ by utilizing the image synthesis method described above in Embodiment 1. In FIG. 3, if image 20a and image 20b are synthesized at a synthesis ratio of 0.5:0.5 following the flow chart in FIG. 2, a synthesized image with a clear contrast can be achieved. In this embodiment, as is clear in contrast to FIG. 27, pixels which are made by synthesizing white pixels with black pixels do not become gray, they become black pixels, and the lessening of contrast can be avoided.

The image synthesis method mentioned above in Embodiment 1 may be written as a program, stored in a memory apparatus such as a ROM, and run by a CPU, but it is also possible to build it into the hardware.

Embodiment 2

Next, the second embodiment is explained. Regarding Embodiment 2, when the N (N is a natural number greater than 1) images $P_1$ through $P_N$ each of which are made up of (X×Y) pixels (X and Y are both natural numbers) are synthesized, the synthesized image P is constructed by taking the pixel with the lowest luminance among those pixels of the images $P_1$ through $P_N$ which lie on the same coordinates to be the synthesized pixel. In this case, the pixel which lies on the coordinates (x,y) ($1 \leq x \leq X, 1 \leq y \leq Y$, x and y are natural numbers) on each image $P_n$ ($1 \leq n \leq N$, n is a natural number) is designated pixel $p_{nxy}$ and the luminance of pixel $p_{nxy}$ is designated $I_{pnxy}$ ($0 \leq I_{pnxy} \leq 1$ wherein 0=black, 1=white).

Figure 4:
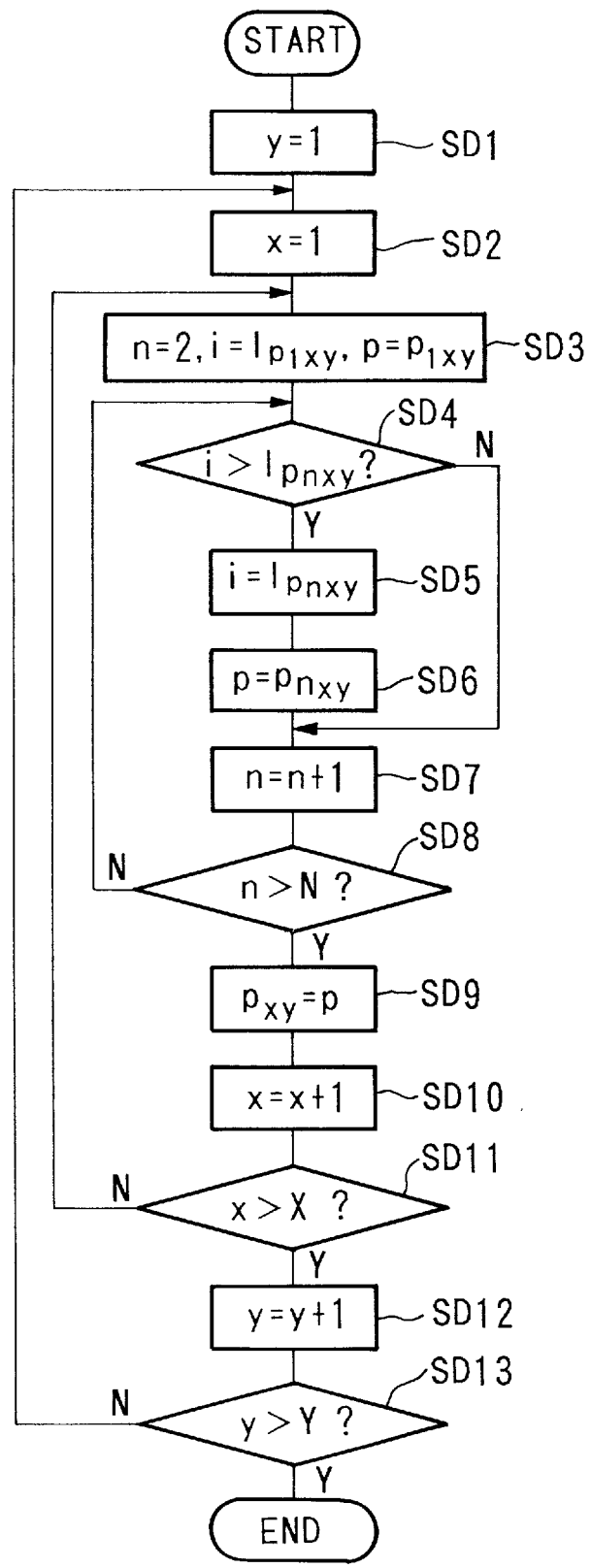
FIG. 4 is a flow chart to explain the image synthesis method of Embodiment 2 of the present invention.

Next, the image synthesis method of the second embodiment of the invention is explained with the use of the flow chart in FIG. 4 as a reference. First, in step SD1, the initial value of register y which is used to vary the y coordinates is set at "1", and in step SD2, the initial value of register x which varies the x coordinates is set at "1". Next, in step SD3, the initial value of the variable n which indicates the order of images P is set at "2", the initial value of the lowest luminance i is set equal to the luminance $I_{p1xy}$ of pixel $p_{1xy}$, and the initial value of p which indicates value of synthesized pixel is set equal to the pixel $p_{1xy}$, then the procedure moves on to step SD4.

In step SD4, it is determined whether or not the luminance $I_{pnxy}$ of the relevant pixel $p_{nxy}$ is less than luminance i. If the result is "YES", then the procedure advances to step SD5. In step SD5, after the luminance i is set equal to luminance $I_{pnxy}$, the procedure goes to step SD6. In step SD6, the p is set equal to the pixel $p_{nxy}$ and the procedure advances to step SD7.

In step SD7, "1" is added to the variable n, and in step SD8, it is determined whether or not variable n is greater than the number of images N; if the result is "NO", then the procedure goes back to step SD4. Then, the procedure in steps SD4–SD7 is repeated with each pixel $p_{nxy}$ positioned at coordinates (x,y) for all of the images. Then, for each pixel $p_{nxy}$ positioned at coordinates (x,y) for all of the images, the above procedure from steps SD4 through SD7 is completed, the value of variable n becomes greater than N, the result of step SD8 becomes "YES", and the procedure advances to step SD9.

In step SD9, the synthesized pixel $p_{xy}$ positioned at coordinates (x,y) on synthesized image P is set equal to the p, then the procedure advances to step SD10. In step SD10, "1" is added to the value of register x. In step SD11, it is determined whether or not the value of register x becomes greater than the maximum value of X, and if the result is "NO", then the procedure returns to step SD3. Then, the procedure from step SD3 through step SD10 is repeated until the value of register x becomes greater than the maximum value X. When register x becomes greater than the maximum of X, and the result in step SD11 becomes "YES", then the procedure moves on to step SD12. In step SD12, "1" is added to the value of register y. In step SD13, it is determined whether or not the value of register y is greater than the maximum value of Y, and if the result is "NO", then the procedure returns to step SD2. Then, repeat the procedure in steps SD2–SD12 is repeated until register y becomes greater than the maximum of Y. When the value of register y becomes greater than the maximum of Y, the result in step SD13 becomes "YES", and the procedure ends.

Of course, the image synthesis method mentioned above in Embodiment 2 may be written as a program, stored in a memory apparatus such as a ROM, and run by a CPU, but it is also possible to build it into the hardware.

Embodiment 3

Next, the third embodiment of the invention is explained. In Embodiment 3, synthesized image P is constructed by synthesizing N (N is a natural number greater than 1) video images $V_1$ through $V_N$ and M (M is a natural number) still images $S_1$ through $S_M$, each of which are made up of (X×Y) (X and Y are natural numbers) pixels at arbitrary synthesis ratios.

First, a synthesized still image is constructed by synthesizing M still images $S_1$ through $S_M$ each of which are made up of (X×Y) (X and Y are natural numbers) pixels at their respective synthesis ratios of $w_{s1}:w_{s2}:\ldots:w_{s(M-1)}:w_{sM}$ (with the conditions that $w_{s1}+w_{s2}+\ldots+w_{s(M-1)}+w_{sM}=1$; $w_{s1}, w_{s2},\ldots w_{s(M-1)}, w_{sM} \geq 0$). In this case, the pixels which are positioned on the coordinates (x,y) ($1 \leq x \leq X, 1 \leq y \leq Y$, x and y are natural numbers) on each still image $S_m$ ($11 \leq n \leq M$, m is a natural number) and synthesized still image S are designated $s_{mxy}$ and $s_{xy}$ respectively, and the luminance of pixel $s_{mxy}$ is designated $I_{smxy}$ ($01 \leq I_{smxy} \leq 1$; wherein 0=black, 1=white). In addition, for each still image $S_m$, a threshold value $T_{sm}$ ($01 \leq T_{sm} \leq 1$) is set for the pixel luminance.

Next, a synthesized video image is constructed by synthesizing N video images $V_1$ through $V_N$ each of which are made up of (X×Y) pixels at their respective synthesis ratios of $w_{v1}: w_{v2}:\ldots:w_{v(N-1)}:w_{vN}$ (with the conditions that $w_{v1}+w_{v2}+\ldots+w_{v(N-1)}+w_{vN}=1$; $w_{v1},w_{v2},\ldots,w_{v(N-1)}, w_{vN} \geq 0$). In this case, the pixels which are positioned on the coordinates (x,y) on each video image $V_n$ ($11 \leq n \leq N$, n is a natural number) are designated $v_{nxy}$, and the luminance of pixel $v_{nxy}$ is designated $I_{vnxy}$ ($01 \leq I_{vnxy} \leq 1$; wherein 0=black, 1=white). In addition, for each video image $V_n$, a threshold value $T_{vn}$ ($01 \leq T_{vn} \leq 1$) is set for the pixel luminance.

Next, the image synthesis method used in the third embodiment of this invention is explained, using the flow charts in FIGS. 5A through 5E as references. First, in step SE1, it is determined whether or not M is equal to "1", that is, whether or not there is only one still image. If the result is "NO", then the procedure advances to step SE2. In step SE2, the initial value of the register y which varies the y coordinates is set at "1", and in step SE3, the initial value of register x which varies the x coordinates is set at "1". Next, in step SE4, the initial value of the variable m which indicates the order of the still images is set at "1", the initial value of the variable c which represents the number of pixels with a luminance greater than or equal to the threshold $T_{sm}$ is set at "0", the initial value of the sum w of the synthesis ratios of the pixels which have a luminance greater than or equal to the threshold $T_{sm}$ is set at "0", and then the procedure moves on to step SE5.

In step SE5, it is determined whether or not the luminance $I_{smxy}$ of the pixel $s_{mxy}$ which is positioned at coordinates (x,y) on the relevant still image $S_m$ is greater than or equal to the threshold value $T_{sm}$. If the result is "YES", then the procedure advances to step SE6.

In step SE6, "1" is added to variable c. In step SE7, the synthesis ratio $w_{sm}$ of the relevant pixel $s_{mxy}$ is added to the total synthesis ratio w, then the procedure advances to step SE8. If the result of step SE5 is "NO", that is, if the luminance $I_{smxy}$ of pixel $s_{mxy}$ is less than the threshold value $T_{sm}$ then the procedure advances to step SE8 as well.

In step SE8, "1" is added to variable m, and in step SE9, it is determined whether or not variable m is greater than the number M of images, and if the result is "NO", then the procedure returns to step SE5. Then, the procedure in steps SE5–SE8 is repeated for each pixel $s_{mxy}$ positioned at the coordinates (x,y) on every still image. That is, for the coordinates (x,y) on each still image $S_m$. the number c of pixels $s_{mxy}$ which have a luminance $I_{smxy}$ greater than or equal to the threshold $T_{sm}$ and the sum w of their synthesis ratios are calculated. Then, for every pixel $s_{mxy}$ which is positioned on the coordinates (x,y) for every still image, the procedure given above in steps SE5–SE8 ends, the value of the variable m becomes greater than M, the result in step SE9 becomes "YES", and the procedure advances to step SE10.

In step SE10, the initial value of variable m is set at "1", and the initial value of s which indicates value of the synthesis of the M pixels $s_{mxy}$ which are positioned at the coordinates (x,y) on the M still images, is set at "0". In step SE11, it is determined if variable c is equal to "0" or if it is equal to M; that is, if the luminances of the M pixels which are positioned at the coordinates (x,y) of the M still images is less than the threshold $T_{sm}$ (c=0), or else if it is greater than or equal to the threshold $T_{sm}$ (c=M). If the answer is "YES", then the procedure advances to step SE12. In step SE12, the s is created by using equation (6), and then the procedure moves on to step SE13.

$$s=s+w_{sm}s_{mxy} \qquad (6)$$

In step SE13, "1" is added to variable m, and in step SE14, it is determined whether or not the variable m is greater than the number M of still images, and if the result is "NO", then the procedure returns to step SE12. Then, the procedure in steps SE12 and SE13 is repeated for each pixel $s_{mxy}$ positioned at the coordinates (x,y) for every still image. That is, all pixels $s_{mxy}$ positioned at coordinates (x,y) on every still image are synthesized at their respective ratios $w_{sm}$. Then, the procedure given above in steps SE12 and SE13 for each pixel $s_{mxy}$ positioned at the coordinates (x,y) for every still image ends, the value of variable m becomes greater than M, the result of step SE14 becomes "YES", and the procedure advances to step SE20.

On the other hand, if the result of step SE11 is "NO", that is, if variable c is neither "0" nor M, then the procedure advances to step SE15. In step SE15, the average value W (=w/c) of the synthesis ratios with regard to the pixels having luminances greater than or equal to the threshold $T_{sm}$ is calculated, and in step SE16, it is determined whether or not the luminance $I_{smxy}$ of each pixel $s_{mxy}$ positioned at coordinates (x,y) on the relevant still image $S_m$ is less than the threshold value $T_{sm}$. If the result is "YES", then the procedure advances to step SE17.

In step SE17, the s is created by using equation (7) and then the procedure goes on to step SE18.

$$s=s+(W+w_{sm})s_{mxy} \qquad (7)$$

Of course, if the result of step SE16 is "NO", that is, in the case that the luminance $I_{smxy}$ of the pixel $s_{mxy}$ is greater than or equal to the threshold value $T_{sm}$, then the procedure advances to step SE18 as well.

In step SE18, "1" is added to variable m, and in step SE19, it is determined whether or not variable m is greater than the number M of still images. If the result is "NO", then the procedure returns to step SE16. Then, the procedure in steps SE16–SE18 is repeated for each pixel $s_{mxy}$ lying on the coordinates (x,y) of every still image. Then, the procedure given above in steps SE16–SE18 is completed for each pixel $s_{mxy}$ lying on the coordinates (x,y) of every still image, the value of variable m becomes greater than M, the result of step SE19 becomes "YES", and the procedure advances to step SE20.

In step SE20, the synthesized pixel $s_{xy}$ which is positioned at the coordinates (x,y) on the synthesized image S is set equal to the s, then the procedure advances to step SE21. In step SE21, "1" is added to the value of register x. In step SE22, it is determined whether or not the value of register x is greater than the maximum value of X, and if the result is "NO", then the procedure returns to step SE4. Then, the procedure in steps SE4–SE21 is repeated until the value of x becomes greater than the maximum value X. When the value of the register x becomes greater than the maximum value X, the result of step SE22 becomes "YES", and the procedure advances to step SE23. In step SE23, "1" is added to the value of register y. In step SE24, it is determined whether or not the value of register y is greater than the maximum value Y, and if the result is "NO", then the procedure returns to step SE3. Then, the procedure in steps SE3–SE23 is repeated until the value of register y becomes greater than Y. When the value of register y becomes greater than the maximum value Y, the result of step SE24 becomes "YES", and the procedure advances to step SE26 in FIG. 5B.

In step SE26, the initial value of register y is set at "1", and in step SE27, the initial value of register x is set at "1". Then, in step SE28, the initial value of the variable n which indicates the order of the video images is set at "1", the initial value of the variable c which represents the number of pixels with a luminance greater than or equal to the threshold $T_{vn}$ is set at "0", and the initial value of the sum w of the synthesis ratios of the pixels with a luminance above the threshold $T_{vn}$ is set at "0", then the procedure moves on to step SE29.

In step SE29, it is determined whether or not the luminance $I_{vnxy}$ of pixel $v_{nxy}$ lying on the coordinates (x,y) on the relevant video image $V_n$ is greater than or equal to the threshold value $T_{vn}$. If the result if "YES", then the procedure advances to step SE30.

In step SE30, "1" is added to the variable c. In step SE31, the synthesis ratio $w_{vn}$ of the relevant pixel $v_{nxy}$ is added to the sum of the synthesis ratios and then the procedure advances to step SE32. If the result in step SE29 is "NO", that is, if the luminance $I_{vnxy}$ of the pixel $v_{nxy}$ is less than the threshold value $T_{vn}$, then the procedure goes to step SE32 as well.

In step SE32, "1" is added to the variable n, and in step SE33, it is determined whether or not variable n is greater than the number N of images; if the result is "NO", then the procedure returns to step SE29. Then, the procedure in steps SE29–SE32 is repeated for each pixel $v_{nxy}$ lying on the coordinates (x,y) on every video image. Thus, for the coordinates (x,y) on each video image $V_n$ the number c of pixels $v_{nxy}$ with a luminance $I_{vnxy}$ greater than or equal to the threshold value $T_{vn}$ and the sum w of their respective synthesis ratios are calculated. Then, the procedure given above for steps SE29–SE32 is completed for each pixel $v_{nxy}$ located at the coordinates (x,y) on every video image, the value of variable n becomes greater than N, the result in step SE33 becomes "YES", and the procedure advances to step SE34.

In step SE34, the initial value of variable n is set at "1", and the initial value of v which indicates value of the synthesis of N pixels $v_{nxy}$ which lie on the coordinates (x,y) for the N video images, is set at "0". In step SE35, it is determined whether variable c is equal to "0", equal to N, or equal to neither "0" nor N; that is, whether the luminance of all N pixels positioned at the coordinates (x,y) for the N video images is less than the threshold $T_{vn}$ (c=0), greater than or equal to the threshold $T_{vn}$ (c=N), or is neither. Regarding step SE35, if variable c is shown to be equal to "0", then the procedure advances to step SE36. In step SE36, subroutine 1, as shown in FIG. 5C, is carried out. Regarding FIG. 5C, in step SE301, the v is created by utilizing equation (8), then the procedure advances to step SE302.

$$v=v+w_{vn}v_{nxy} \qquad (8)$$

In step SE302, "1" is added to variable n, then in step SE303, it is determined whether or not variable n is greater than the number N of video images, and if the result is "NO", then the procedure returns to step SE301. Then, the procedure in steps SE301 and SE302 is repeated for each pixel $v_{nxy}$ positioned at the coordinates (x,y) for every video image. That is, the pixels $v_{nxy}$ which are positioned at the coordinates (x,y) on every video image are synthesized at their respective ratios $w_{vn}$. Then, the procedure given above in steps SE301 and SE302 is completed for each pixel $v_{nxy}$ positioned at the coordinates (x,y) on every video image, the value of variable n becomes greater than N, the result of step SE303 becomes "YES", and the procedure advances to step SE39 in FIG. 5B.

Figure 5A:
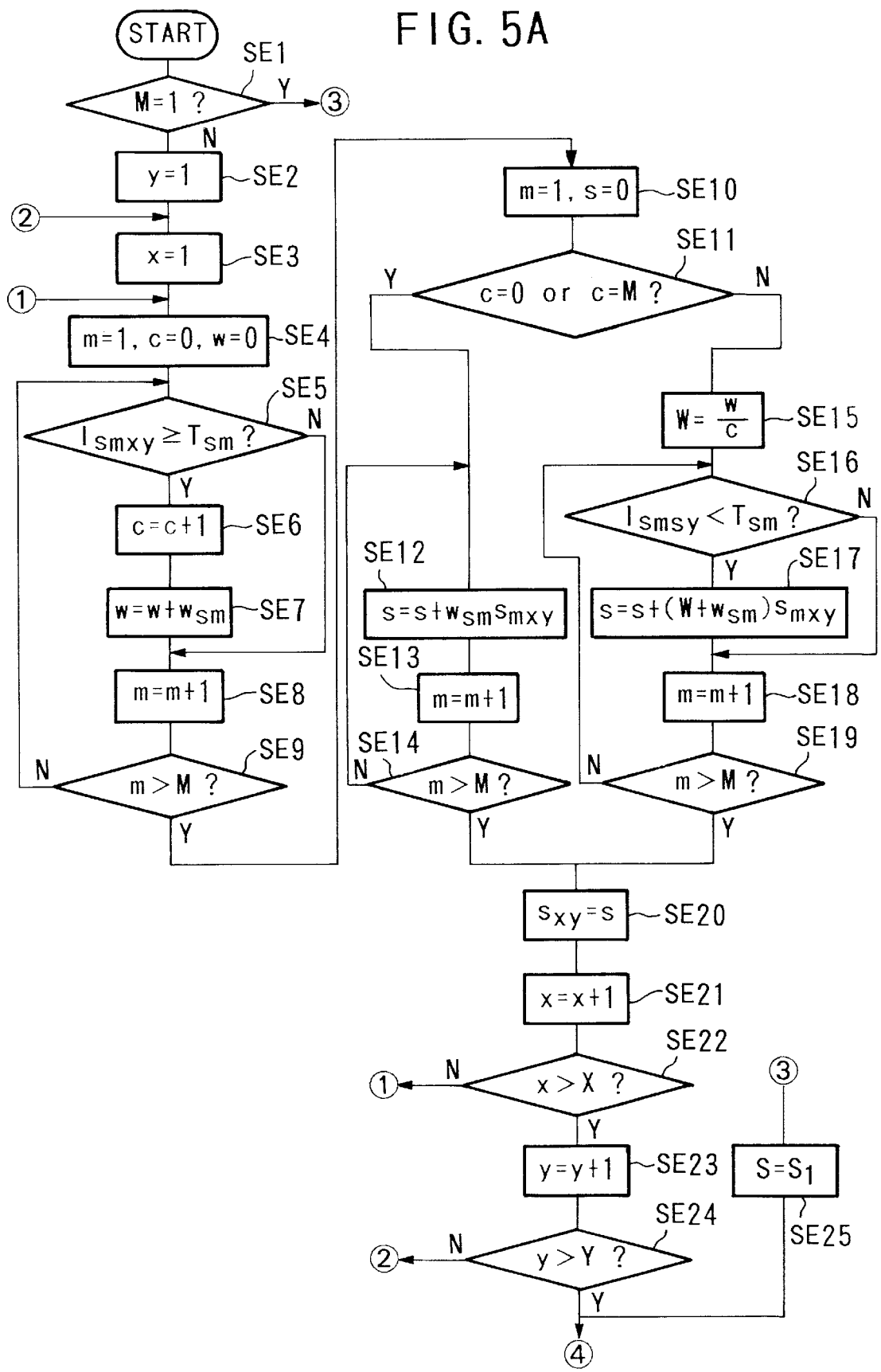
FIG. 5A is a flow chart to explain the image synthesis method of Embodiment 3 of the present invention.
Figure 5B:
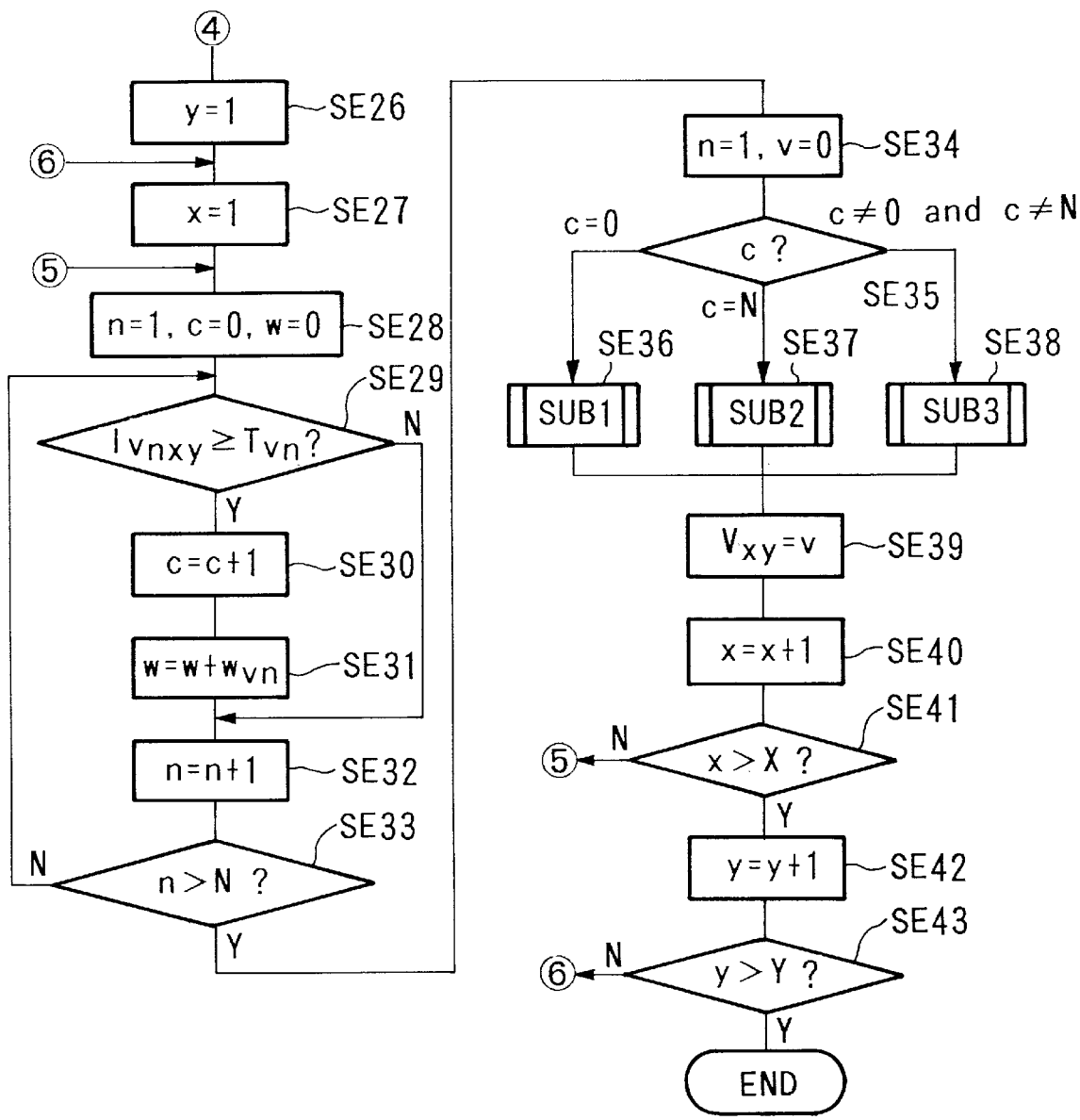
FIG. 5B is a flow chart to explain the image synthesis method of Embodiment 3 of the present invention.
Figure 5E:
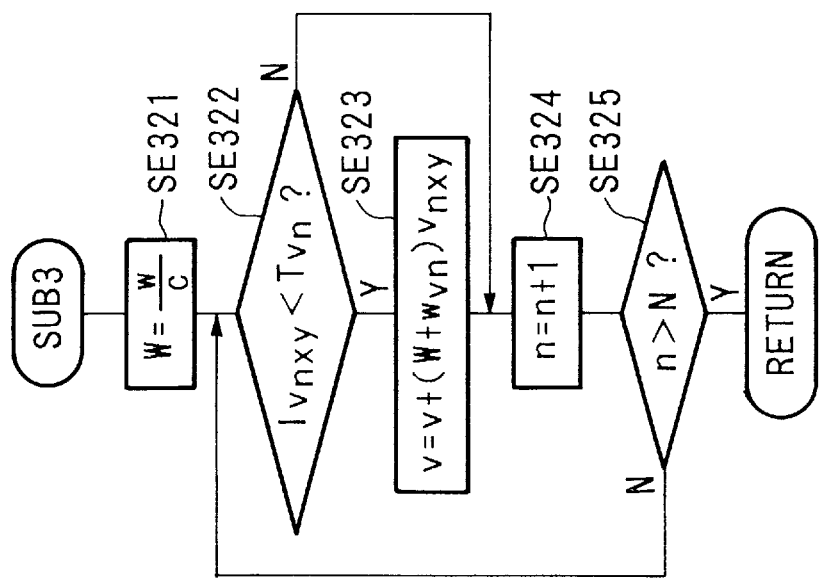
FIG. 5E is a flow chart to explain the image synthesis method of Embodiment 3 of the present invention.
Figure 5D:
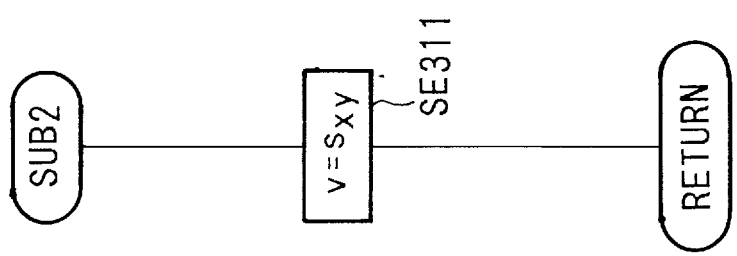
FIG. 5D is a flow chart to explain the image synthesis method of Embodiment 3 of the present invention.
Figure 5C:
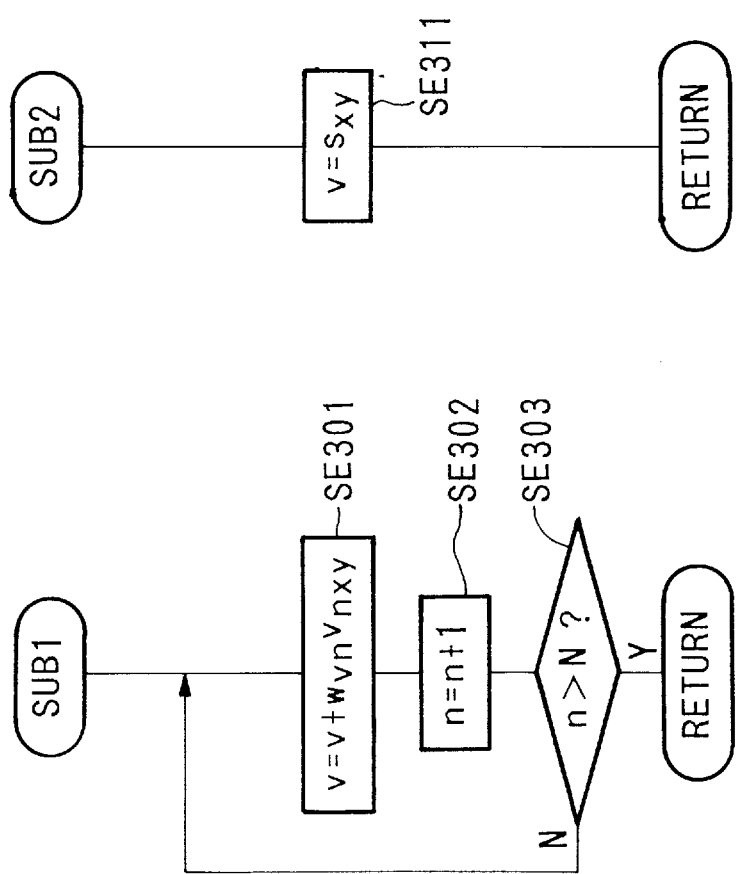
FIG. 5C is a flow chart to explain the image synthesis method of Embodiment 3 of the present invention.

On the other hand, regarding step SE35 in FIG. 5B, if it is determined that the variable c is equal to N, then the procedure advances to step SE37. In step SE37, subroutine 2 as given in FIG. 5D is carried out. Regarding FIG. 5D, after the v is equal to the pixel $s_{xy}$ of synthesized still image S, the procedure advances to step SE39 in FIG. 5B.

Regarding step SE35 in FIG. 5B, if the variable c is determined to be neither "0" nor N, then the procedure advances to step SE38. In step SE38, subroutine 3 given in FIG. 5E is carried out. Regarding FIG. 5E, in step SE321, the average value W (=w/c) of the synthesis ratios with regard to the pixels having luminance greater than or equal to $T_{nv}$ is calculated, then in step SE322, it is determined whether or not the luminance $I_{vnxy}$ of the pixel $v_{nxy}$ positioned at coordinates (x,y) of the relevant video image $V_n$ is less than the threshold $T_{vn}$. If the answer is "YES", then the procedure advances to step SE323.

In step SE323, the v is created by using equation (9), and then the procedure advances to step SE324.

$$v=v+(W+w_{vn})v_{nxy} \qquad (9)$$

Of course, if the result in step SE322 is "NO", that is, if the luminance $I_{vnxy}$ of pixel $v_{nxy}$ is greater than or equal to the threshold $T_{vn}$, then the procedure advances to step SE324.

In step SE324, "1" is added to the variable n, and then in step SE325, it is determined whether or not the variable n is greater than the number N of video images. If the result is "NO", then the procedure returns to step SE 322. Then, the procedure in steps SE322–SE324 is repeated for each pixel $v_{nxy}$ lying on the coordinates (x,y) of every video image. Then, the procedure given above in steps SE322–SE324 is completed for each pixel $v_{nxy}$ lying on the coordinates (x,y) of every video image, the value of the variable N becomes greater than N, the result in step SE325 becomes "YES", and the procedure advances to step SE39.

In step SE39, the synthesized pixel $v_{xy}$ which lies on the coordinates (x,y) of the synthesized image V is set equal to v, then the procedure advances to step SE40. In step SE40, "1" is added to the register value x. In step SE41, it is determined whether or not the register value x is greater than the maximum of X, and if the answer is "NO", then the procedure returns to step SE28. Then, the procedure in steps SE28–SE40 is repeated until the register value x becomes greater than the maximum value X. When the register value x becomes greater than the maximum value X, the result in step SE41 becomes "YES", and the procedure advances to step SE42. In step SE42, "1" is added to the register value y. In step SE43, it is determined whether or not the register value y is greater than the maximum Y, and if the answer is "NO", then the procedure returns to step SE27. Then the procedure in steps SE27–SE42 is repeated until the register value y becomes greater than the maximum Y. When the register value y becomes greater than the maximum value Y, the result in step SE43 becomes "YES", and the procedure ends.

In the aforementioned Embodiment 3, an example was given (the procedure in FIG. 5A step SE17) in which, when synthesizing the pixels of the still images, the synthesis ratios of the non-synthesizing pixels was averaged and distributed. However, regarding the procedure in step SE17, by using equation (10) it is possible to distribute the synthesis ratios of the non-synthesizing pixels proportionally with the synthesis ratios of the synthesizing pixels.

$$s = s + \left( \frac{w}{1-w} wsm + wsm \right) \cdot smxy \qquad (10)$$

Figure 6:
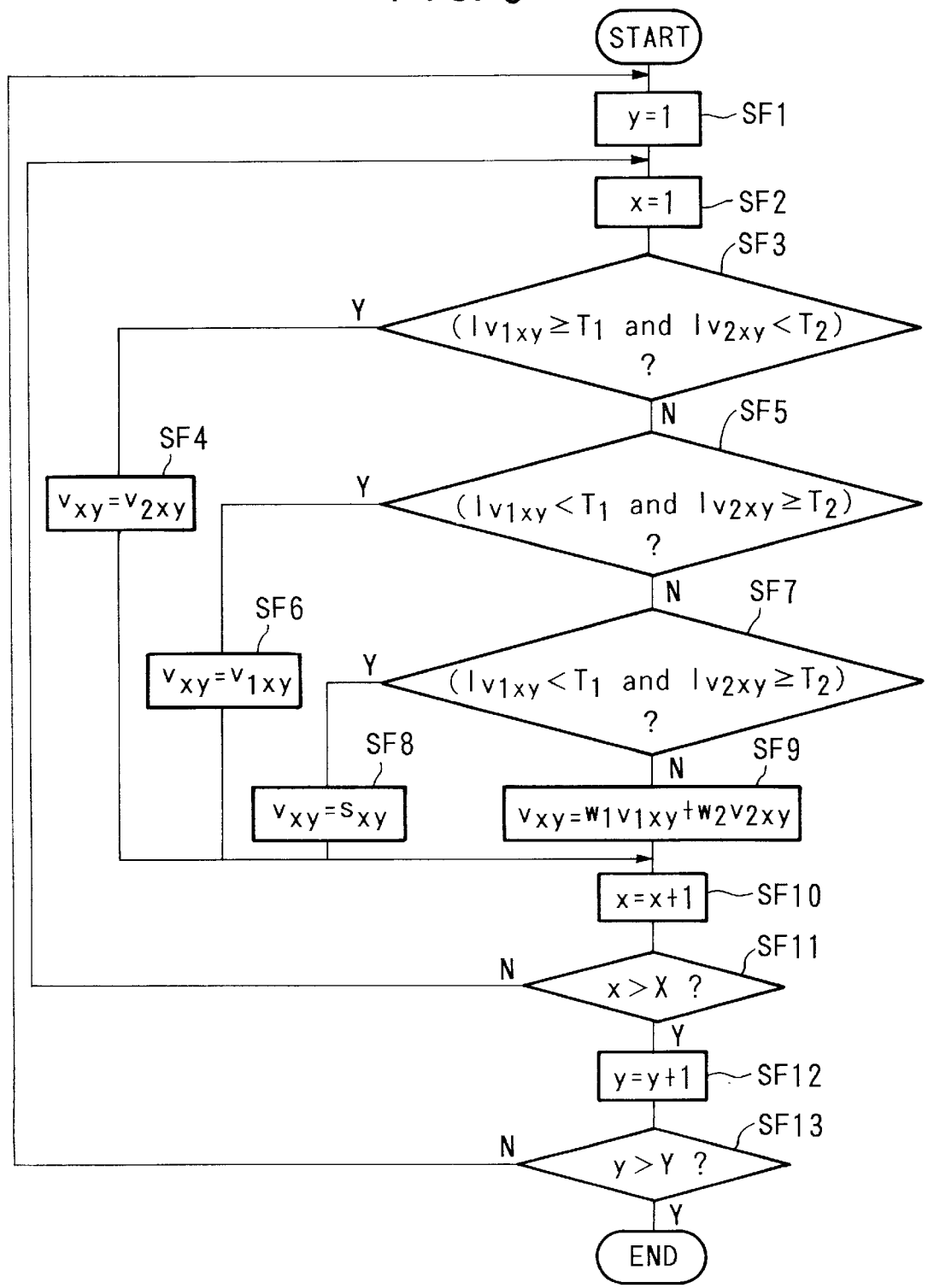
FIG. 6 is a flow chart showing the procedure in the case in which two video images $V_1$ and $V_2$ and a single still image S are synthesized using Embodiment 3 of the present invention.
Figure 7A:
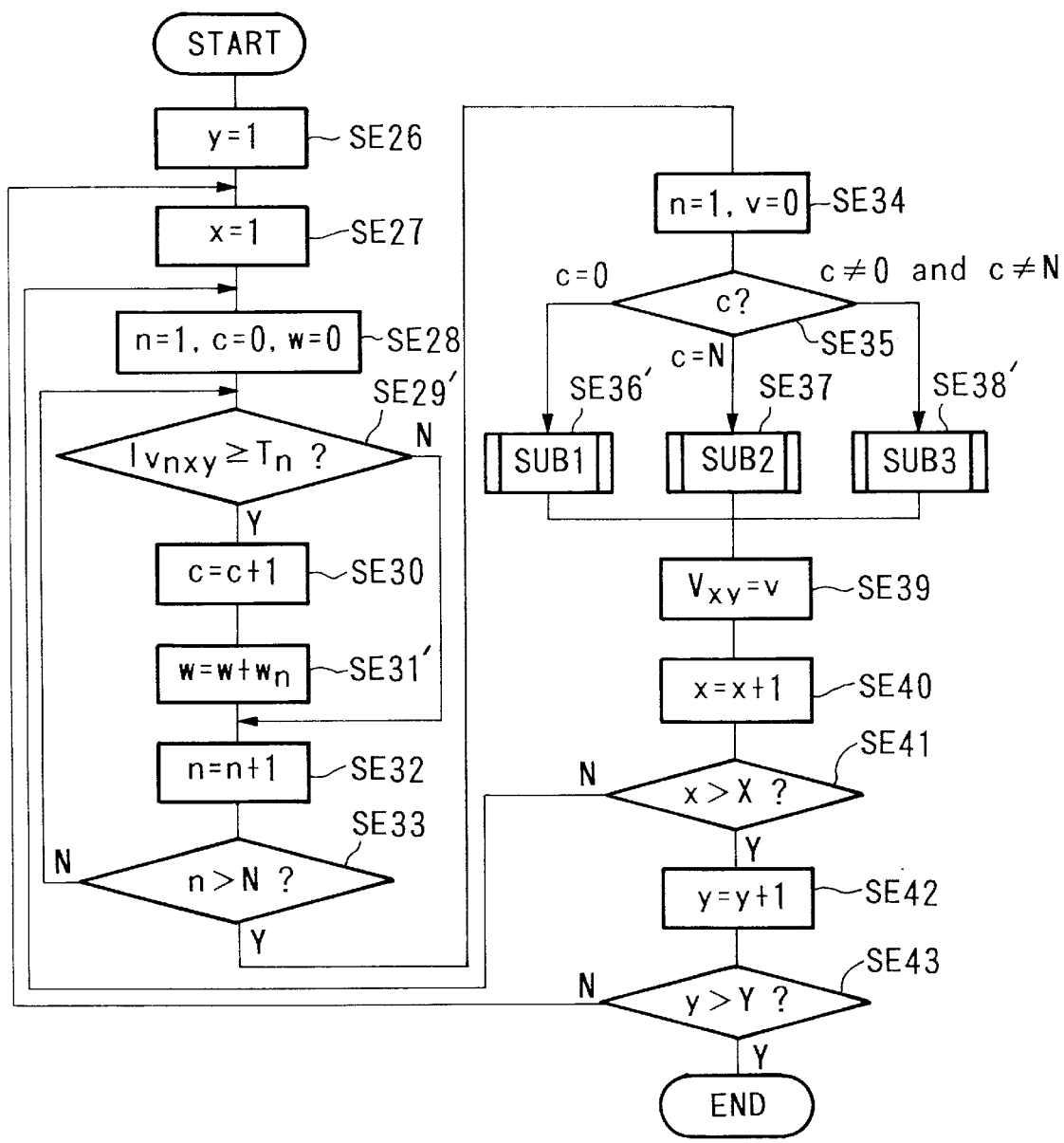
FIG. 7A is a flow chart showing the procedure in the case in which N video images $V_1$–$V_N$ and a single still image S are synthesized using Embodiment 3 of the present invention.
Figures 7B, 7C, 7D:
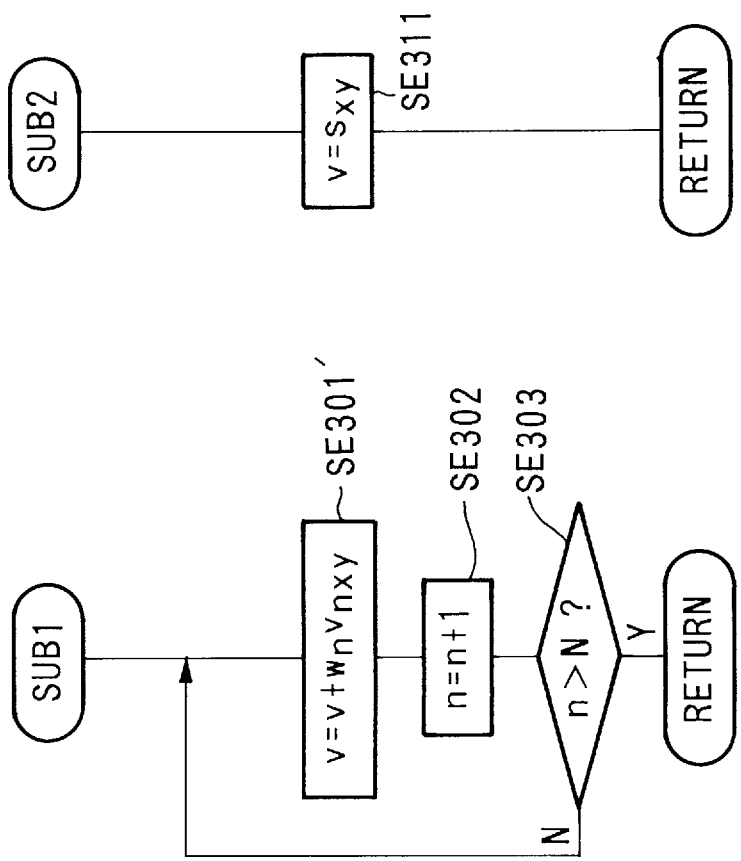
FIG. 7B is a flow chart showing the procedure in the case in which N video images $V_1$–$V_N$ and a single still image S are synthesized using Embodiment 3 of the present invention.
FIG. 7C is a flow chart showing the procedure in the case in which N video images $V_1$–$V_N$ and a single still image S are synthesized using Embodiment 3 of the present invention.
FIG. 7D is a flow chart showing the procedure in the case in which N video images $V_1$–$V_N$ and a single still image S are synthesized using Embodiment 3 of the present invention.

Next, in the aforementioned Embodiment 3, the procedure is explained in the case in which N=2 and M=1, that is, if the creation of a synthesized image V which is made by combining two video images $V_1$ and $V_2$ and one still image S is desired, by following the flow chart in FIG. 6. First, in step SF1, the initial value of the register y to vary the y coordinates is set at "1", and likewise, in step SF2, the initial value of the register x to vary the x coordinates is set at "1". Next, in step SF3, it is determined whether or not the luminance $I_{v1xy}$ of pixel $v_{1xy}$ lying on the coordinates (x,y) of the video image $V_1$ is greater than or equal to the threshold value $T_1$, and the luminance $I_{v2xy}$ of pixel $v_{2xy}$ is less than the threshold value $T_2$. If the result is "YES", then the procedure advances to step SF4.

In step SF4, the synthesized pixel $v_{xy}$ which lies on the coordinates (x,y) of the synthesized image $V_{xy}$ is set equal to pixel $v_{2xy}$ of video image V2, then the procedure moves on to step SF5.

In step SF5, it is determined whether or not the luminance $I_{v1xy}$ of pixel v1xy is less than the threshold value $T_1$ and the luminance $I_{v2xy}$ of pixel $v_{2xy}$ is greater than or equal to the threshold $T_2$. If the result is "YES", then the procedure advances to step SF6. In step SF6, synthesized pixel $v_{xy}$ is set equal to pixel $v_{1xy}$, then the procedure goes to step SF10.

On the other hand, if the result in step SF5 is "NO", that is, if the luminance $I_{v1xy}$ of pixel $v_{1xy}$ is greater than or equal to the threshold $T_1$ or the luminance $I_{v2xy}$ of pixel $v_{2xy}$ is less than the threshold $T_2$, then the procedure moves on to step SF7.

In step SF7, it is determined whether or not the luminance $I_{v1xy}$ of pixel $v_{1xy}$ is greater than or equal to the threshold value $T_1$ and the luminance $I_{v2xy}$ of pixel $v_{2xy}$ is greater than or equal to the threshold $T_2$. If the result is "YES", then the procedure advances to step SF8. In step SF8, synthesized pixel $v_{xy}$ is set equal to pixel $s_{xy}$ and then the procedure advances to step SF10.

On the other hand, if the result in step SF7 is "NO", that is, if the luminance $I_{v1xy}$ of pixel $v_{1xy}$ is less than the threshold $T_1$ or the luminance $I_{v2xy}$ of pixel $v_{2xy}$ is less than the threshold $T_2$, then the procedure advances to step SF9. In step SF9, the synthesized pixel $v_{xy}$ is created using equation (11), and then the procedure advances to step SF10.

$$v_{xy}=w_1v_{1xy}+w_2v_{2xy} \qquad (11)$$

In step SF10, "1" is added to the value of register x. In step SF11, it is determined whether or not the value of register x is greater than the maximum value X, and if the result is "NO", then the procedure returns to step SF3. Then, the procedure in steps SF3–SF10 is repeated until the value of register x becomes greater than the maximum value X. When the value of register x becomes greater than the maximum X, then the result in step SF11 becomes "YES", and the procedure advances to step SF12.

In step SF 12, "1" is added to the register value y. In step SF13, it is determined whether or not the value of register y is greater than the maximum value Y, and if the result is "NO", then the procedure returns to step SF2. Then the procedure in steps SF2–SF12 is repeated until the value of register y becomes greater than the maximum value Y. When the value of register y becomes greater than the maximum Y, then the result in step SF13 becomes "YES", and the procedure ends.

Next, in the aforementioned Embodiment 3, the procedure in the case that M=1, that is, if a synthesized image V is to be created by synthesizing N video images $V_1-V_N$ and a single still image S, is explained. The N video images $V_1-V_N$ are combined at their respective synthesis ratios $w_1:w_2: \ldots :w_{(N-1)}:w_N$ (with the conditions $w_1+w_2+ \ldots +w_{(N-1)}+w_N=1$; $w_1, w_2, \ldots, w_{(N-1)}, w_N \geq 0$) In this case, the pixel corresponding to the coordinates (x,y) on each video image $V_n$ ($1 \leq n \leq N$, n is a natural number) is designated $v_{nxy}$, and the luminance of pixel $v_{nxy}$ is designated $I_{vnxy}$ ($01 \leq I_{vnxy} \leq 1$; wherein 0=black, 1=white). Also, the threshold value $T_n$ ($0 \leq T_n \leq 1$) is set for the luminances of the pixels of each video image $V_n$.

FIGS. 7A–7D represent a flow chart which shows the procedure for the case in which a synthesized image is constructed by synthesizing N video images $V_1-V_N$ and a single still image S. In FIGS. 7A–7D, those procedures which correspond to the ones which were in FIGS. 5A–5E are given the same symbols. The procedures in the flow chart in FIGS. 7A–7D, when not synthesizing M still images $S_1-S_M$, are identical to those in the flow chart in FIGS. 5A–5E, so the explanation is omitted.

The image synthesis method described above in Embodiment 3 is able to be written as a program, stored in a memory apparatus such as a ROM, and run by a CPU; it is also possible to build it into the hardware.

Embodiment 4

In the following, the Embodiment 4 of the present invention will be explained. In the Embodiment 4, synthesized image P is constructed by synthesizing N (N is a natural number greater than 1) video images $V_1-V_N$ and M (M is a natural number) still images $S_1-S_M$, each of which are made up of (X×Y) (X and Y are natural numbers) pixel.

First, a synthesized still image S is constructed by selecting a pixel with the lowest luminance among those pixels that lie on the same coordinates of the still images $S_1-S_M$.

Next, a synthesized image P is constructed by synthesizing video images $V_1-V_N$ and the synthesized still image S. In the case where all the luminances of pixels that lie on the same coordinates of the video images $V_1-V_N$ are greater than predetermined threshold, the pixel that lie on the same coordinate of the still image S is selected as a synthesized still pixel of the synthesized image P. In other case, the pixel with the lowest luminance among those pixels that lie on the same coordinates of the video images $V_1-V_N$ is selected as a synthesized pixel.

In this case, the pixels that lie on the coordinates (x,y) ($1 \leq x \leq X$, $1 \leq y \leq Y$; wherein x and y are natural numbers) of each still image $S_m$ ($1 \leq n \leq M$; m is a natural number) and synthesized still image S are designated as pixel $s_{mxy}$ and $s_{xy}$, respectively. The luminance of pixel $s_{mxy}$ is represented by $I_{smxy}$ ($0 \leq I_{smxy} \leq 1$; wherein 0=black and 1=white). In addition, the pixel which lie on the coordinates (x,y) of each video image $V_n$ ($1 \leq n \leq N$; n is a natural number) is designated as $V_{nxy}$, and the luminance of this pixel is represented by $I_{vnxy}$ ($0 \leq I_{vnxy} \leq 1$; wherein 0=black and 1=white). Furthermore, a luminance threshold $T_{vn}$ ($01 \leq T_{vn} \leq 1$) is set for each video image $V_n$.

Figure 8A:
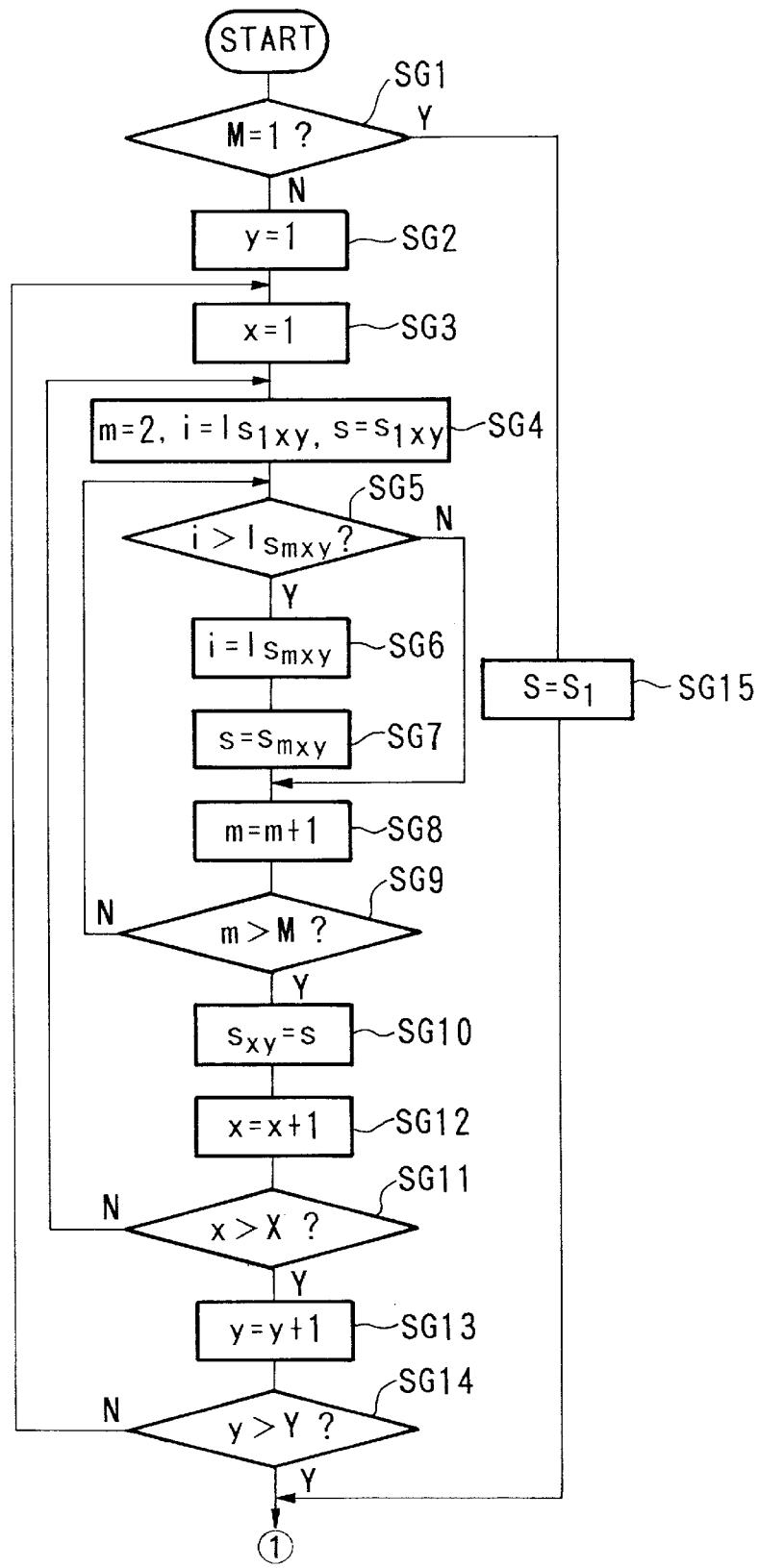
FIG. 8A is a flow chart to explain the image synthesis method of Embodiment 4 of the present invention.
Figure 8B:
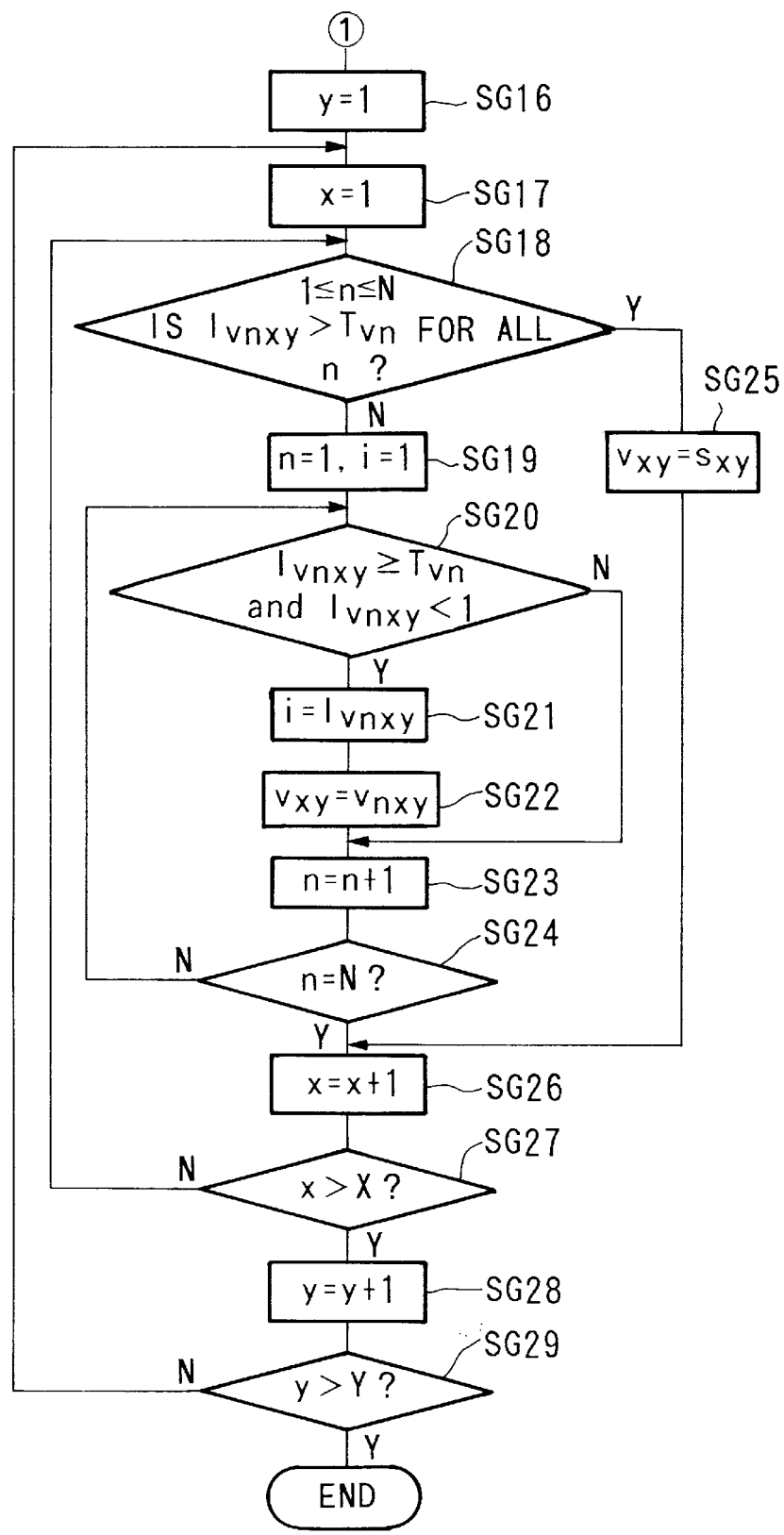
FIG. 8B is a flow chart to explain the image synthesis method of Embodiment 4 of the present invention.

In the following, the image synthesizing process according to the Embodiment 4 of the present invention will be explained with reference to the flow chart in FIGS. 8A and 8B. Initially, in step SG1, a decision is made as to whether or not M is "1", in other words, whether or not only one still image exists. In the case when the result of this decision is "NO", the process moves to step SG2. In step SG2, the initial value of register y for changing the y coordinates is set to "1". In step SG3, the initial value of register x for changing the x coordinates is similarly set to "1". Subsequently, in step SG4, the initial value of variable m indicating the order of the still images is set at "2", the initial value of the lowest luminance i is set equal to luminance $I_{s1xy}$ of pixel $s_{1xy}$, and the initial value of s indicating value of synthesized pixel is set equal to pixel $s_{1xy}$, then the procedure moves on to step SG5.

In step SG5, a decision is made as to whether luminance $I_{smxy}$ of pixel $s_{mxy}$ is less than luminance i or not. In the case when the result of this decision is "YES", the process moves to step SG6. In step SG6, luminance i is set equal to luminance $I_{smxy}$ and the process then moves to step SG7. In step SG7, after the s is set equal to the pixel $s_{mxy}$, the process moves to step SG8.

In step SG8, "1" is added to variable m; in step SG9, a decision is made as to whether or not variable m is greater than the number M of still images. In the case when the result of this decision is "NO", the process returns to step SG5. The procedure described in steps SG5–SG8 is then repeated with regard to pixels $s_{mxy}$ located at the coordinates (x,y) of all still images. After the procedure of steps SG5–SG8 has been completed on pixels $s_{mxy}$ located at the coordinates (x,y) of all still images, and the value of variable m is greater than M, the decision result of step SG9 becomes "YES", thereby allowing the process to proceed to step SG10.

In step SG10, pixel $s_{xy}$ located at coordinates (x,y) of synthesized image S is set equal to s, and the process then moves to step SG11. In step SG11, "1" is added to the value of register x. In step SG12, a decision is made as to whether or not the value of register x is greater than maximum value X. In the case when the result of this decision is "NO", the process returns to step SG4. The procedure of steps SG4–SG11 is then repeated until the value of register x becomes greater than maximum value X. When the value of register x becomes greater than maximum value X, the result of the decision in step SG12 becomes "YES", and the process moves to step SG13. In step SG13, "1" is added to the value of register y. In step SG14, a decision is made as to whether or not the value of register y is greater than maximum value Y. In the case when the result of this decision is "NO", the process returns to step SG3. The procedure of step SG3–SG13 is then repeated until the value of register y becomes greater than maximum value Y. When the value of register y becomes greater than maximum value Y, the result of the decision in step SGl4 becomes "YES", and the process moves to step SG16. In addition, when the decision result of step SG1 is "YES", in other words, M is "1", only one still image exists, hence the process skips to step SG15. In step SG15, after the still image $S_1$ is designated as synthesized still image S, the process moves to step SG16.

In steps SG16 and SG17, the initial value of "1" is given to "x" and "y".

In step SG18, a decision is made as to whether or not all the luminance $I_{v1xy}-I_{vNxy}$ of pixels $v_{1xy}-v_{Nxy}$ of each video image $V_1-V_N$ are greater than corresponding threshold values $T_{v1}-T_{vN}$. In the case when this decision result is "YES", the process moves to step SG25. In step SG25, the process ends after synthesized pixel $v_{xy}$ is set equal to the pixel $s_{xy}$ of synthesized still image S.

On the other hand, when the decision result of step SG18 is "NO", the process moves to step SG19. In step SG19, the initial value of variable n is set equal to "1", and the initial value of the lowest luminance i is similarly set equal to "1". Following this, the process moves to step SG20. In step SG20, a decision is made as to whether or not luminance $I_{vnxy}$ is less than or equal to threshold $T_{vn}$, and whether or not luminance $I_{vnxy}$ is less than luminance i. In the case when the result of this decision is "YES", the process moves to step SG21. In step SG21, luminance i is set equal to luminance $I_{vnxy}$, and the process moves to step SG22. In step SG22, a pixel $v_{xy}$ is set equal to synthesized pixel $v_{nxy}$, and the process then moves to step SG23.

In step SG23, "1" is added to variable n. Subsequently, in step SG24, a decision is made as to whether or not variable n is greater than the number N of video images. In the case when the result of this decision is "NO", the process returns to step SG20. The procedure of steps SG20–SG23 is then repeated for each pixel $v_{nxy}$ located at coordinates (x,y) of each video image. When the procedure of step SG20–SG23 has been completed with regard to each pixel $v_{nxy}$ located at coordinates (x,y) of each video image, the value of variable n becomes greater than N, the decision result of step SG24 becomes "YES", and the process ends.

In step SG26, "1" is added to the value in register "x". In step 27, a judgment is made as to whether the value "x" is greater than the maximum value "X" or not. If the judgment is "NO", the procedure returns to step SG18. Then, the procedures SG18–SG26 are repeated until the value "x" becomes greater than the value "X". If the value "x" becomes greater than the value "X" and the judgment is "YES", the procedure proceeds to step SG28. In step SG28, "1" is added to the value of register "y". In step SG29, a judgment is made as to whether the value "y" is greater than the maximum value "Y" or not. If the judgment is "NO", the procedure returns to step SG17. Then, the procedures SG17–SG28 are repeated until the value "y" becomes greater than the value "Y". The procedure is terminated when the value "y" becomes greater than the value "Y" and the judgment is "YES".

Furthermore, the image synthesizing process according to the aforementioned Embodiment 4 can be achieved by means of pre-recording a program in a memory apparatus such as a ROM and the like, and then running this program using a CPU. In addition, the same process can be performed by means of hardware as well.

Embodiment 5

In the following, the Embodiment 5 of the present invention will be explained. In the Embodiment 5 of the present invention, synthesized image P is constructed by synthesizing N (N is a natural number greater than 1) video images $V_1$–$V_N$ and M (M is a natural number) still images $S_1$–$S_M$, each of which are made up of (X×Y) (X and Y are natural numbers) pixel.

First, a synthesized still image S is constructed by selecting a pixel with the lowest luminance among those pixels which lie on the same coordinates of the still images $S_1$–$S_M$.

Next, a pixel possessing the lowest luminance among those pixels which lie on the same coordinates of the video images $V_1$–$V_N$ is selected. In the case where the luminance is greater than a predetermined threshold, the pixel which lie on the same coordinates of the still image S is selected as a pixel corresponding same coordinate of the synthesized image. In other case, the aforementioned pixel possessing the lowest luminance is selected as a pixel corresponding same coordinate of the synthesized image.

In this case, the pixels which lie on the coordinates (x,y) ($1 \leq x \leq X, 1 \leq y \leq Y$; wherein x and y are natural numbers) of each still image $S_m$ ($1 \leq n \leq M$; m is a natural number) and synthesized still image S are designated as pixel $s_{mxy}$ and $s_{xy}$, respectively. The luminance of pixel $s_{mxy}$ is represented by $I_{smxy}$ ($0 \leq I_{smxy} \leq 1$; wherein 0=black and 1=white). In addition, the pixel which lies on the coordinates (x,y) of each video image $V_n$ ($1 \leq n \leq N$; n is a natural number) is designated as $V_{nxy}$, and the luminance of this pixel is represented by $I_{vnxy}$ ($0 \leq I_{vnxy} \leq 1$; wherein 0=black and 1=white). Furthermore, a luminance threshold $T_v$ ($01 \leq T_v \leq 1$) is set for video image.

Figure 9:
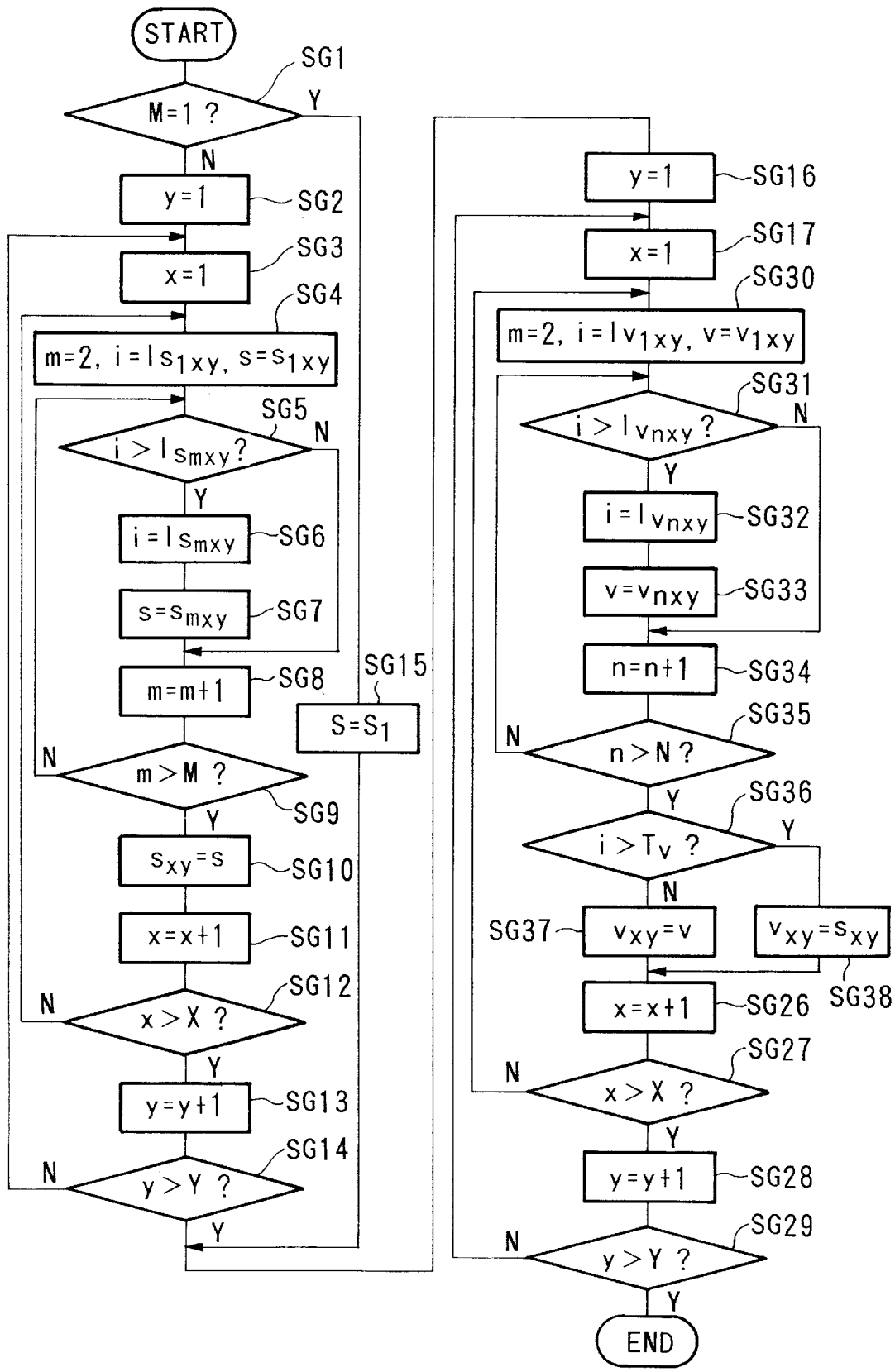
FIG. 9 is a flow chart to explain the image synthesis method of Embodiment 5 of the present invention.

In the following, the image synthesizing process according to the Embodiment 5 of the present invention will be explained with reference to the flow chart in FIG. 9. In this figure, procedures corresponding to those described in FIG. 8 will be denoted by the same character (numeral) and their explanations will be omitted. In other words, in the case when only one still image $S_1$ exists, this image is designated as synthesized still image S; in the case when a plurality of still images exist, the pixel with the lowest luminance among pixels of all still images $S_1$–$S_M$ located at the same coordinates is designated as synthesized pixel $s_{xy}$ corresponding to same coordinate of synthesized still image S. This process is identical to that described in the aforementioned Embodiment 4.

In step SG16, the initial value of register y for changing the y coordinate is similarly set to "1". In step SG17, the initial value of register x for changing the x coordinates is similarly set to "1". Subsequently, in step SG30, the initial value of variable n indicating the order of the video images is set equal to "2", the initial value of the minimum luminance i is set equal to luminance $I_{v1xy}$ of pixel $v_{1xy}$, and the initial value of v that represents the pixel possessing the lowest luminance corresponding to coordinate (x,y) is set equal to pixel $v_{1xy}$. Following these actions, the process moves to step SG31.

In step SG31, a decision is made as to whether luminance $I_{vnxy}$ of pixel $v_{nxy}$ is less than luminance i or not. In the case when the result of this decision is "YES", the process moves to step SG32. In step SG32, luminance i is set equal to luminance $I_{vnxy}$ and the process then moves to step SG33. In step SG33, after v is set equal to pixel $v_{nxy}$, the process moves to step SG34.

In step SG34, "1" is added to variable n; in step SG35, a decision is made as to whether or not variable n is greater than the number N of video images. In the case when the result of this decision is "NO", the process returns to step SG31. The procedure described in steps SG31–SG34 is then repeated with regard to pixels $v_{nxy}$ located at the coordinates (x,y) of all video images. After the procedure of steps SG31–SG34 has been completed on pixels $v_{nxy}$ located at the coordinates (x,y) of all video images, and the value of variable n is greater than N, the decision result of step SG35 becomes "YES", thereby allowing the process to proceed to step SG36.

In step SG36, a decision is made as to whether or not luminance i is greater than predetermined threshold $T_v$. In the case when the result of this decision is "NO", the process moves to step SG37. In step SG37, pixel $v_{xy}$ located at coordinates (x,y) of synthesized image V is set equal to v, and the process then skips to step SG26.

On the other hand, in the case when the decision result of step SG36 is "YES", in other words, when luminance i is greater than threshold $T_v$, the process moves to step SG38. In step SG38, synthesized pixel $v_{xy}$ is set equal to pixel $s_{xy}$ of synthesized still image S, and the process then moves to step SG26.

In step SG26, "1" is added to the value of register x. In step SG27, a decision is made as to whether or not the value of register x is greater than maximum value X. In the case when the result of this decision is "NO", the process returns to step SG30. The procedure of steps SG30–SG26 is then repeated until the value of register x becomes greater than maximum value X. When the value of register x becomes greater than maximum value X, the result of the decision in step SG27 becomes "YES", and the process moves to step SG28. In step SG28, "1" is added to the value of register y. In step SG29, a decision is made as to whether or not the value of register y is greater than maximum value Y. In the case when the result of this decision is "NO", the process returns to step SG29. The procedure of step SG17–SG28 is then repeated until the value of register y becomes greater than maximum value Y. When the value of register y becomes greater than maximum value Y, the result of the decision in step SG29 becomes "YES", which in turn allows the process to end.

Furthermore, the image synthesizing process according to the aforementioned Embodiment 5 can be achieved by means of pre-recording a program in a memory apparatus such as a ROM and the like, and then running this program using a CPU. In addition, the same process can be performed by means of hardware as well.

Embodiment 6

Figure 10:
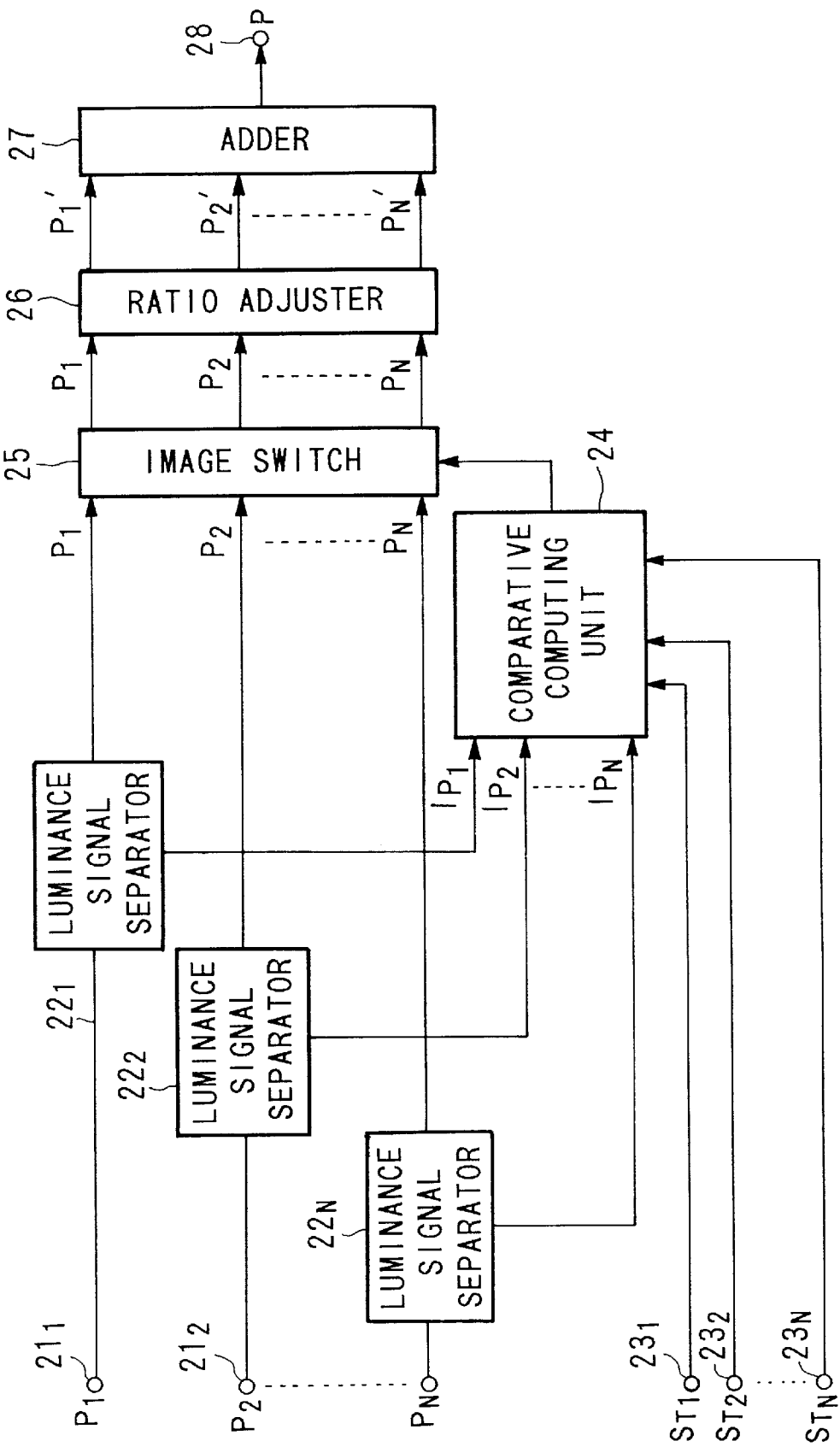
FIG. 10 is a block diagram to explain the image synthesis apparatus of Embodiment 6 of the present invention.

In the following, the Embodiment 6 of the present invention will be explained. FIG. 10 is a block diagram showing the structure of an image synthesizing apparatus according to the Embodiment 6. In FIG. 10, the image synthesizing apparatus is formed from an N number (N is a natural number greater than 1) of input terminals $21_1$–$21_N$, an N number of luminance signal separators $22_1$–$22_N$, an N number of input terminals $23_1$–$23_N$, comparative computing unit 24, image switch 25, ratio adjuster 26, adder 27, and output terminal 28.

An N number of images $P_1$–$P_N$ are inputted from input terminals $21_1$–$21_N$, respectively, and supplied to the corresponding luminance signal separators $22_1$–$22_N$. Each luminance signal separator $22_1$–$22_N$ then supplies an inputted image $P_1$–$P_N$, respectively, to image switch 25. In addition, the aforementioned luminance signal separators $22_1$–$22_N$ separate luminance signals $I_{P1}$–$I_{PN}$ from images $P_1$–$P_N$ and supply them to comparative computing unit 24. An N number of threshold signals $S_{T1}$–$S_{TN}$ are inputted from input terminals $23_1$–$23_N$, respectively, and supplied to comparative computing unit 24. Threshold signals $S_{T1}$–$S_{TN}$ correspond to thresholds $T_1$–$T_N$ of luminances of pixels previously set at each image $P_1$–$P_N$. Comparative computing unit 24 compares each luminance signal $I_{P1}$–$I_{PN}$ with the corresponding threshold signal $S_{T1}$–$S_{TN}$, and then supplies natural numbers k corresponding to all luminance signals $I_{Pk}$ which are less than or equal to the corresponding threshold signal $S_{Tk}$ ($1 \leq k \leq N$) to image switch 25. In the case when all luminance signal $I_{P1}$–$I_{PN}$ of N video images $P_1$–$P_N$ are greater than the corresponding threshold signals $S_{T1}$–$S_{TN}$, this information is reported to image switch 25. In the case when such information is reported, i.e., information that all luminance signals $I_{P1}$–$I_{PN}$ are greater than threshold signal $S_{T1}$–$S_{TN}$, images switch 25 supplies all video images $P_1$–$P_N$ to ratio adjuster 26; in all other cases, image switch 25 supplies all video images $P_k$ corresponding to supplied natural numbers k to ratio adjuster 26. Ratio adjuster 26 redistributes the predetermined synthesis ratios of the not inputted visual images over those of the inputted visual images. Inputted video images $P_k$ are multiplied by a sum of the predetermined synthesis ratio and the redistributed syntheses ratio. And the resultant video images $P_k'$ are outputted to adder 27. Video images $P_k'$ are added by adder 27 and the sum is outputted through terminal 28 as a synthesized image P.

Embodiment 7

Figure 11:
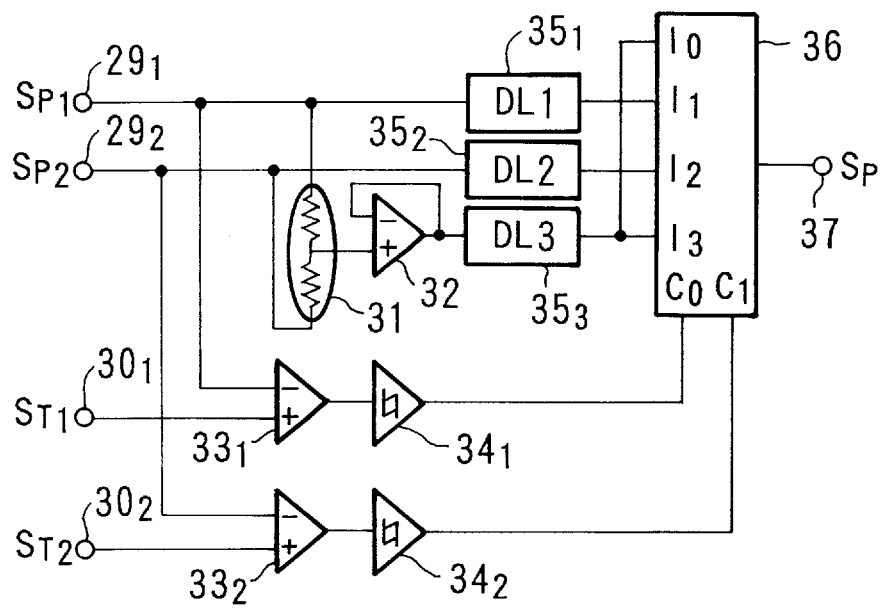
FIG. 11 is a block diagram to explain the image synthesis apparatus of Embodiment 7 of the present invention.

In the following, the Embodiment 7 of the present invention will be explained. FIG. 11 is a block diagram showing a structure of an image synthesizing apparatus according to the Embodiment 7. In FIG. 11, the image synthesizing apparatus is formed from input terminals $29_1$, $29_2$, $30_1$, and $30_2$; partial resistor 31; operational amplifier 32; comparator $33_1$ and $33_2$; Schmitt trigger $34_1$ and $34_2$; delay lines $35_1$–$35_3$; analog switch 36; and output terminal 37. Image signals $S_{P1}$, $S_{P2}$ of images $P_1$, $P_2$ are respectively inputted from input terminals $29_1$, $29_2$, and supplied to one input terminal of corresponding comparators $33_1$, $33_2$. On the other hand, the two threshold signals $S_{T1}$, $S_{T2}$ are inputted from input terminals $30_1$, $30_2$, respectively, and then supplied to the other terminals of comparators $33_1$, $33_2$, respectively. Threshold signals $S_{T1}$, $S_{T2}$ correspond to luminance thresholds $T_1$, $T_2$ previously designated for images $P_1$, $P_2$. Comparators $33_1$, $33_2$ compare, respectively, the luminance signals of each image signal $S_{P1}$, $S_{P2}$ with the corresponding threshold signals $S_{T1}$, $S_{T2}$. In the case when each luminance signal is greater than its respective corresponding threshold signal $S_{T1}$, $S_{T2}$, a comparative signal of level "H" is outputted, while in the case when these aforementioned signals are less than or equal to their threshold signals, a comparative signal of level "L" is outputted. Each comparative signal is subsequently shaped into a waveform by means of Schmitt triggers $34_1$, $34_2$ and then supplied to control terminals C0, C1 of analog switch 36.

Image signals $S_{P1}$, $S_{P2}$ are supplied to input terminals $I_1$, $I_2$ of analog switch 36 via delay lines $35_1$, $35_2$ each possessing a predetermined delay, and one-half of each signal is respectively summed by means of partial resister 31. These signals then undergo "buffering" by means of operational amplifier 32 of amplification ratio 1, and are then supplied to input terminal I3 of analog switch 36 via delay line $35_3$ also possessing a predetermined delay.

Analog switch 36 then respectively sets the values of control data DC0, DC1 to "1", respectively, in the case when each of the comparative signals inputted from control terminal C0, C1 is at level "H", or sets the values of control data DC0, DC1 to "0", respectively, in the case when each signal displays a level "L". In the case when the values of control data DC0, DC1 read "00", the output signal of delay line $35_3$ inputted from input terminal I0 is selected; in the case when the aforementioned values read "01", the output signal of delay line $35_1$ inputted from input terminal I1 is selected; in the case when the aforementioned values read "10", the output signal of delay line $35_2$ inputted from input terminal I2 is selected; and in the case when the aforementioned values read "11", the output signal of delay line $35_3$ input from input terminal I3 is selected. The selected output signal is then outputted from output terminal 37 as synthesized image signal $S_P$.

Furthermore, delay lines $35_1$–$35_3$ are provided for the purpose of adjusting the input time difference between the analog signal and the aforementioned comparative signal inputted to analog switch 36. However, in the case when a high quality synthesized image signal $S_P$ is not in particular necessary, these structures may be omitted.

Figure 12:
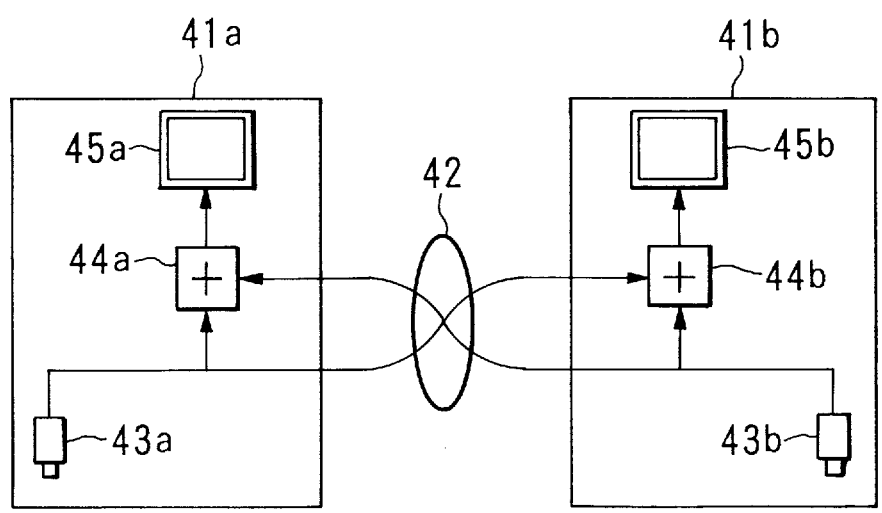
FIG. 12 is a block diagram showing a structural example of an image communication system making use of the image synthesis apparatus described in Embodiment 7 of the present invention.
Figure 13:
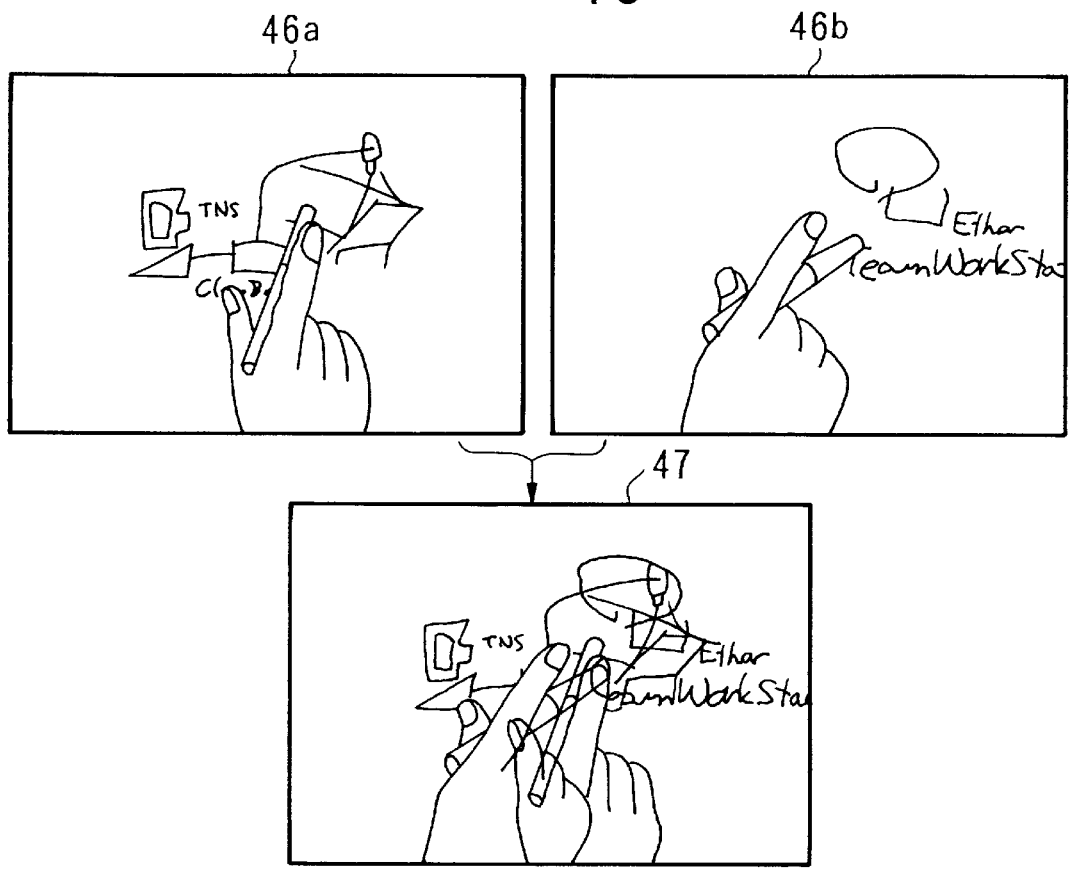
FIG. 13 is a diagram to explain the synthesis of the desktop images of each image communication terminal 41a and 41b using the image communication system shown in FIG. 12.

FIG. 12 shows a structural example of an image communication system in which the image synthesizing apparatus according to the aforementioned Embodiment 7 is utilized. In FIG. 12, two image communication terminal units 41a, 41b are connected via communication circuit 42 in a manner such that interactive communication is possible (bidirectional communication). Image communication terminal units 41a, 41b comprise, respectively, image input units 43a, 43b; image synthesizing units 44a, 44b; and display units 45a, 45b. Image input units 43a, 43b respectively comprise a video camera or the like which captures the desktop of each user, and outputs images 46a, 46b, for example, as shown in FIG. 13. Image synthesizing apparatus 44a conducts synthesis such that image 46a, supplied directly from image input apparatus 43a, and image 46b, supplied from image input apparatus 43b via communication circuit 42, appear transparent and discernible. Image synthesizing apparatus 44a then supplies image 47 shown in FIG. 13 to display apparatus 45a. Image synthesizing apparatus 44b conducts similar synthesis such that image 46b, supplied directly from image input apparatus 43b, and image 46a, supplied from image input apparatus 43a via communication circuit 42, appear transparent and discernible, and then supplies image 47, shown in FIG. 13, to display apparatus 45b. According to the present embodiment, reduction of the contrast can be prevented, and synthesized images can be viewed clearly.

Embodiment 8

Figure 14:
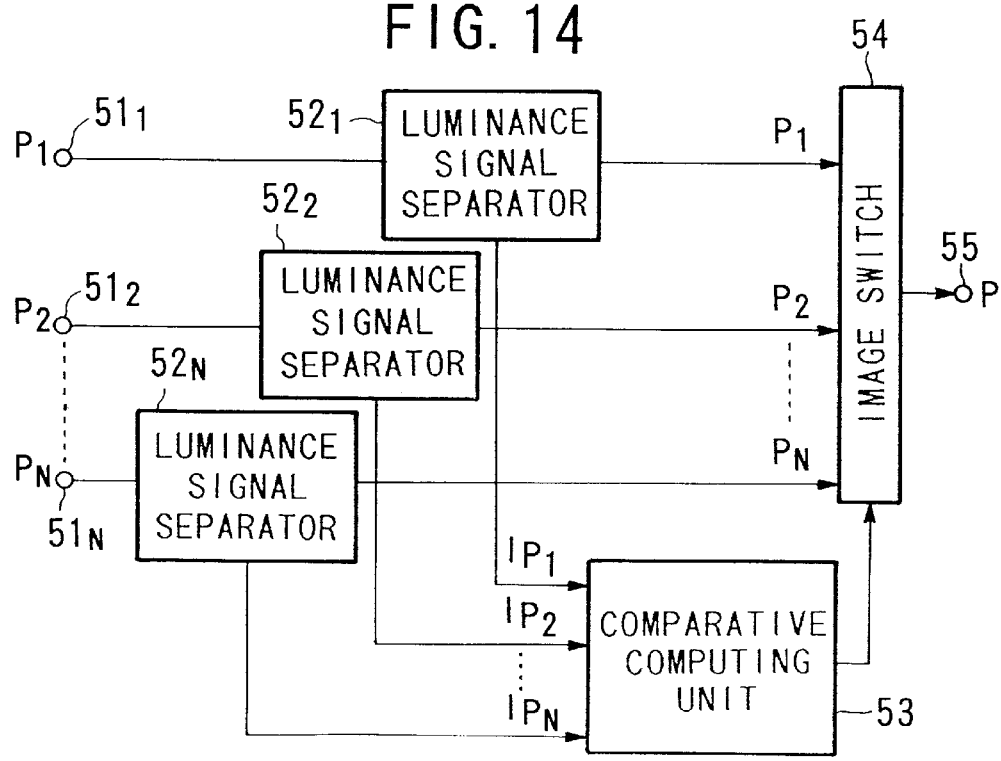
FIG. 14 is a block diagram showing the structure of the image synthesis apparatus described in Embodiment 8 of the present invention.

In the following, the Embodiment 8 of the present invention will be explained. FIG. 14 is a block diagram showing the structure of an image synthesizing apparatus according to the Embodiment 8. In FIG. 14, the aforementioned image synthesizing apparatus comprises an N number (N is a natural number greater than 1) of input terminals $51_1$–$51_N$, an N number of luminance signal separators $52_1$–$52_N$, comparative computing unit 53, image switch 54, and output terminal 55.

An N number of images $P_1$–$P_N$ are inputted, respectively, from input terminals $51_1$–$51_N$, and are supplied to the corresponding luminance signal separator $52_1$–$52_N$. Each luminance signal separator $52_1$–$52_N$ supplies an inputted image $P_1$–$P_N$ to image switch 54, and at the same time, separates luminance signal $I_{P1}$–$I_{PN}$ from the image $P_1$–$P_N$, and supplies this luminance signal to comparative computing unit 53. Comparative computing unit 53 compares the levels of all luminance signals $I_{P1}$–$I_{PN}$ and reports the luminance signal which is the lowest level to image switch 54. Image switch 54 then outputs the image possessing the reported luminance signal as output image P from output terminal 55.

Figure 15:
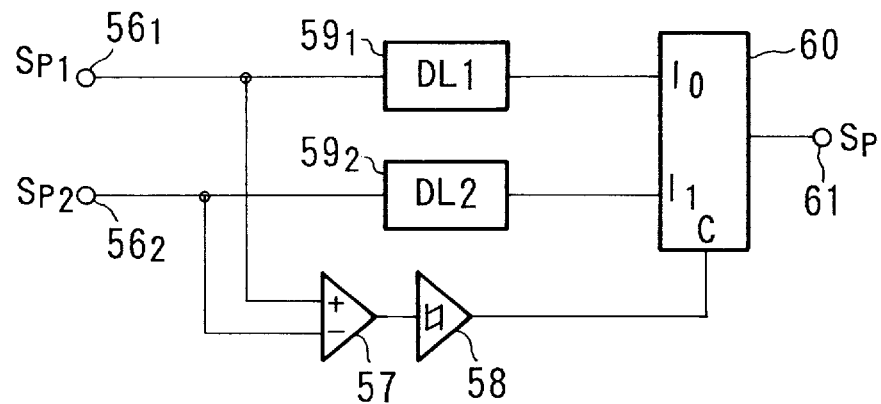
FIG. 15 is a block diagram showing the structure of the image synthesis apparatus which synthesizes two images P1 and P2, described in Embodiment 8 of the present invention.

In the Embodiment 8, in the case when N=2, in other words, the case when two images $P_1$ and $P_2$ are synthesized by means of the image synthesizing apparatus is shown in FIG. 15. In FIG. 15, image synthesizing apparatus comprises input terminals $56_1$, $56_2$; comparator 57; Schmitt trigger 58; delay lines $59_1$, $59_2$: analog switch 60; and output terminal 61.

Image signals $S_{P1}$, $S_{P2}$ of the two images $P_1$, $P_2$ are inputted respectively from input terminals $56_1$, $56_2$, and then supplied to the respective input terminal of comparator 57. Comparator 57 compares the luminance signals of image signals $S_{P1}$, $S_{P2}$, and outputs a comparative signal of level "H" in the case when luminance signal of image signal $S_{P1}$ is greater than the luminance signal of image signal $S_{P2}$, or a comparative signal of level "L" in the case when the other situation occurs. Comparative signal is then shaped into a waveform by means of Schmitt trigger 58 and sent to control terminal C of analog switch 60.

Image signals $S_{P1}$, $S_{P2}$ are respectively supplied to input terminals I0, I1 of analog switch 60 via delay lines $59_1$, $59_2$ each possessing a predetermined delay. In the case when an "L" level comparative signal is inputted from control terminal C, analog switch 60 selects the output signal inputted from input terminal I0; in the case when an "H" level comparative signal is inputted, analog switch 60 selects the output signal inputted from input terminal I1. The selected output signal is then outputted from output terminal 61 as output image signal SP.

Furthermore, delay lines $59_1$, $59_2$ are provided for the purpose of adjusting the input time difference between the analog signal and the aforementioned comparative signal inputted from analog switch 60. However, in the case when a high quality output image signal $S_P$ is not in particular necessary, these structures may be omitted.

Figure 16:
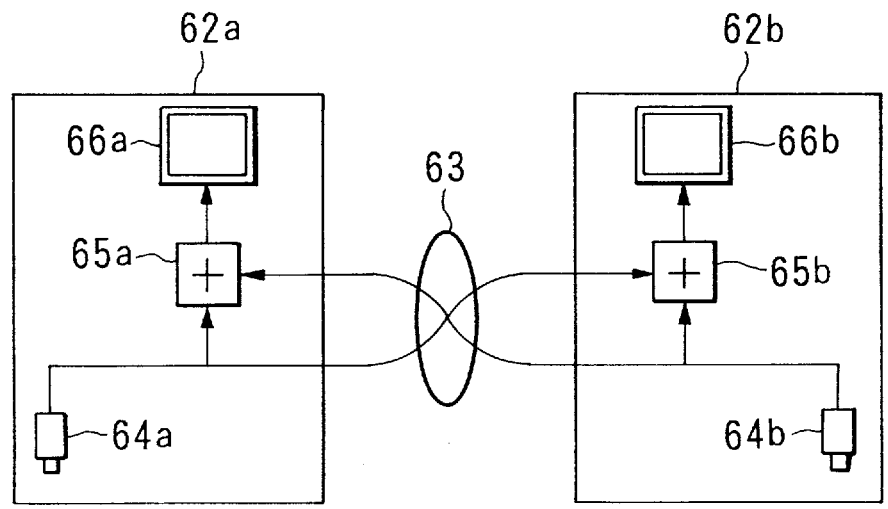
FIG. 16 is a block diagram showing a structural example of an image communication system making use of the image synthesis apparatus shown in FIG. 15.
Figure 17:
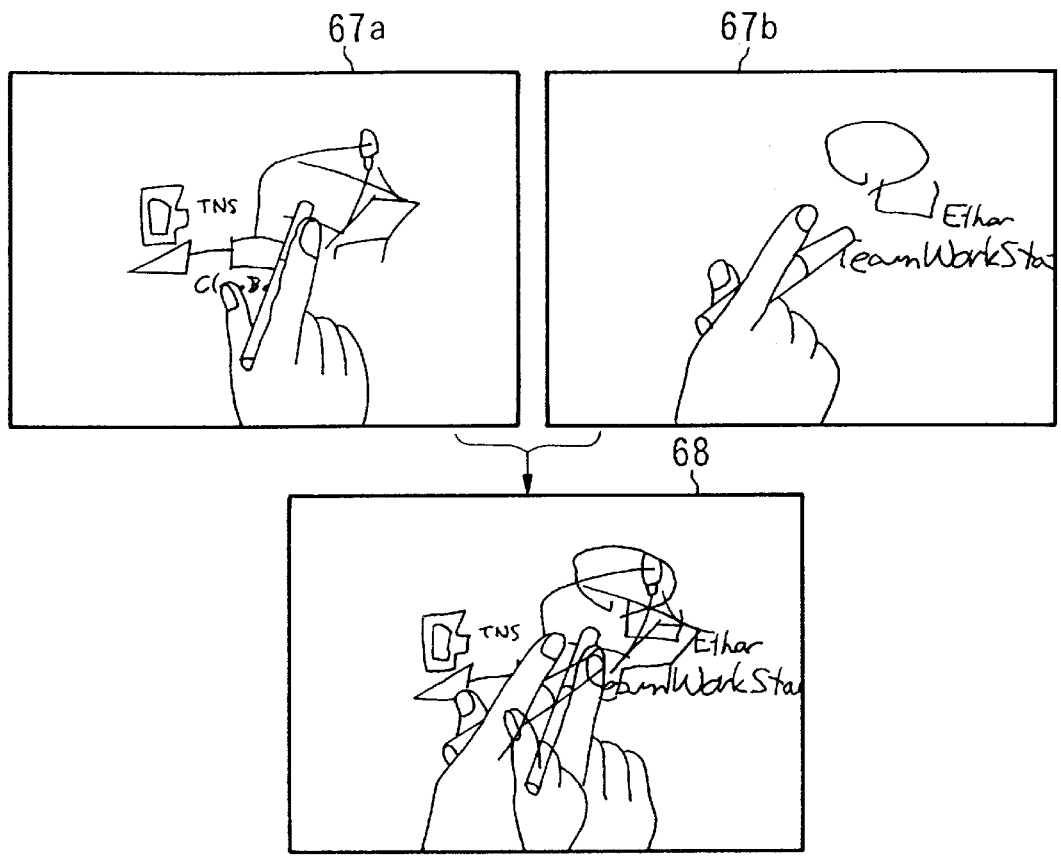
FIG. 17 is a diagram to explain the synthesis of the desktop images of each image communication terminal 62a and 62b using the image communication system shown in diagram 16.

FIG. 16 shows a structural example of an image communication system in which the image synthesizing apparatus shown in FIG. 15 is utilized. In FIG. 16, two image communication terminal units 62a, 62b are connected via communication circuit 63 in a manner such that interactive communication is possible (bidirectional communication). Image communication terminal units 62a, 62b comprise, respectively, image input units 64a, 64b; image synthesizing units 65a, 65b; and display units 66a, 66b. Image input units 64a, 64b respectively comprise a video camera or the like which captures the desktop of each user, and outputs images 67a, 67b, for example, as shown in FIG. 17. Image synthesizing apparatus 65a conducts synthesis such that image 67a, supplied directly from image input apparatus 64a, and image 67b, supplied from image input apparatus 64b via communication circuit 63, appear transparent and discernible. Image synthesizing apparatus 65a then supplies image 68 shown in FIG. 17 to display apparatus 66a. Image synthesizing apparatus 65b conducts a similar synthesis such that image 67b, supplied directly from image input apparatus 64b, and image 67a, supplied from image input apparatus 64a via communication circuit 63, appear transparent and discernible, and then supplies image 68, shown in FIG. 17, to display apparatus 66b. According to the present embodiment, reduction of the contrast can be prevented, and synthesized images can be viewed clearly.

Embodiment 9

Figure 18:
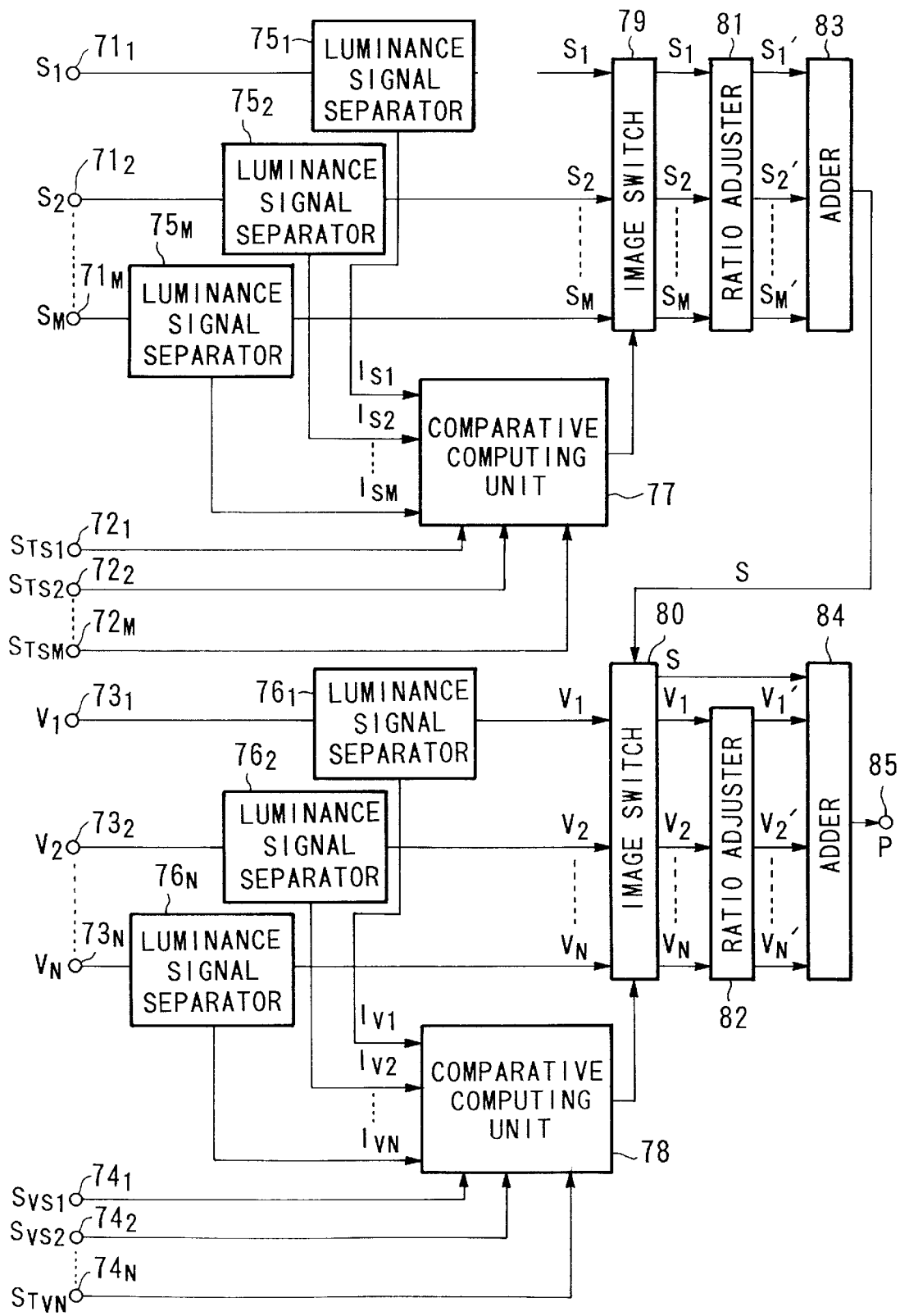
FIG. 18 is a block diagram showing the structure of the image synthesis apparatus described in Embodiment 9 of the present invention.

In the following, the Embodiment 9 of the present invention will be explained. FIG. 18 is a block diagram showing the structure of an image synthesizing apparatus according to the Embodiment 9. In FIG. 18, the aforementioned image synthesizing apparatus comprises an M number (M is a natural number) of input terminals $71_1$–$71_M$ and $72_1$–$72_M$; an N number of input terminals $73_1$–$73_N$, and $74_1$–$74_N$; an M number of luminance signal separators $75_1$–$75_M$; an N number of luminance signal separators $76_1$–$76_N$; comparative computing units 77 and 78; image switches 79 and 80; ratio adjusters 81 and 82; adders 83 and 84; and output terminal 85.

An M number of still images $S_1$–$S_M$ are inputted, respectively, from input terminals $71_1$–$71_M$, and are supplied to the corresponding luminance signal separators $75_1$–$75_M$. Each luminance signal separator $75_1$–$75_M$ supplies an inputted still image $S_1$–$S_M$ to image switch 79, and at the same time, separates luminance signal $I_{S1}$–$I_{SM}$ from the respective still image $S_1$–$S_M$, and supplies this luminance signal to comparative computing unit 77. An M number of threshold signals $S_{TS1}$–$S_{TSM}$ are respectively inputted from input terminals $72_1$–$72_M$, and supplied to comparative computing unit 77. Threshold signals $S_{TS1}$–$S_{TSM}$ correspond to luminance thresholds $T_{S1}$–$T_{SM}$ of pixels previously set at each still image $S_1$–$S_M$. Comparative computing unit 77 compares each luminance signal $I_{S1}$–$I_{SM}$ with the corresponding threshold signal $S_{TS1}$–$S_{TSM}$, and then supplies natural numbers k corresponding to all luminance signals $I_{Sk}$ which are less than or equal to the corresponding threshold signal $S_{TSk}$ ($1 \leq \leq M$) to image switch 79. In the case when all luminance signals $I_{S1}$–$I_{SM}$ of M still images $S_1$–$S_M$ are greater than the corresponding threshold signals $S_{TS1}$–$S_{TSM}$, this information is reported to image switch 79. In the case when such information is reported, i.e., information that all luminance signals $I_{S1}$–$I_{SM}$ are greater than threshold signals $S_{TS1}$–$S_{TSM}$, images switch 79 supplies all still images $S_1$–$S_M$ to ratio adjuster 81; in all other cases, image switch 79 supplies all still images $S_k$ corresponding to supplied natural numbers k to ratio adjuster 81.

Ratio adjuster 81 redistributes the predetermined synthesis ratios of not inputted visual image over those of the inputted visual images. Inputted visual images $S_k$ are multiplied by a sum of the predetermined synthesis ratio and the redistributed synthesis ratio. The products $S'_k$ are supplied to adder 83. Adder 83 adds still image $S'_k$ and the sum is supplied as a synthesized still image to visual switch 80.

An N number of video images $V_1$–$V_N$ are inputted, respectively, from input terminals $73_1$–$73_N$, and are supplied to the corresponding luminance signal separators $76_1$–$76_N$. Each luminance signal separator $76_1$–$76_N$ supplies an inputted video image $V_1$–$V_N$ to image switch 88, and at the same time, separates luminance signal $I_{V1}$–$I_{VN}$ from the respective video image $V_1$–$V_N$, and supplies this luminance signal to comparative computing unit 78. An N number of threshold signals $S_{TV1}$–$S_{TVN}$ are respectively inputted from input terminals $74_1$–$74_N$, and supplied to comparative computing unit 78. Threshold signals $S_{TV1}$–$S_{TVN}$ correspond to luminance thresholds $T_{V1}$–$T_{VN}$ of pixels previously set at each video image $V_1$–$V_N$. Comparative computing unit 78 compares each luminance signal $I_{V1}$–$I_{VN}$ with the corresponding threshold signal $S_{TV1}$–$S_{TVN}$, and then supplies natural numbers k corresponding to all luminance signals $I_{Vk}$ which are less than or equal to the corresponding threshold signal $S_{TVk}$ ($1 \leq k \leq N$) to image switch 80. In the case when all the luminance signals $I_{V1}$–$I_{VN}$ of N video images $V_1$–$V_N$ are greater than the corresponding threshold signals $S_{TV1}$–$S_{TVN}$, this information is reported to image switch 80. In the case when such information is reported, image switch 80 supplies the inputted synthesized still image S to adder 84; in all other cases, image switch 80 supplies all video images $V_k$ corresponding to supplied natural numbers k to ratio adjuster 82.

Ratio adjuster 82 redistributes the predetermined synthesis ratios of the not inputted visual images over those of the inputted visual images. Inputted video image $V_k$ are multiplied by the sum of the above operation, and the resultant video image $V'_k$ are outputted to adder 84. Adder 84 outputs the synthesized still image S when a synthesized still image is inputted. Otherwise, video images $V'_k$ are added by adder 84 and the sum is outputted through terminal 85 as a synthesized image P.

Embodiment 10

Figure 19:
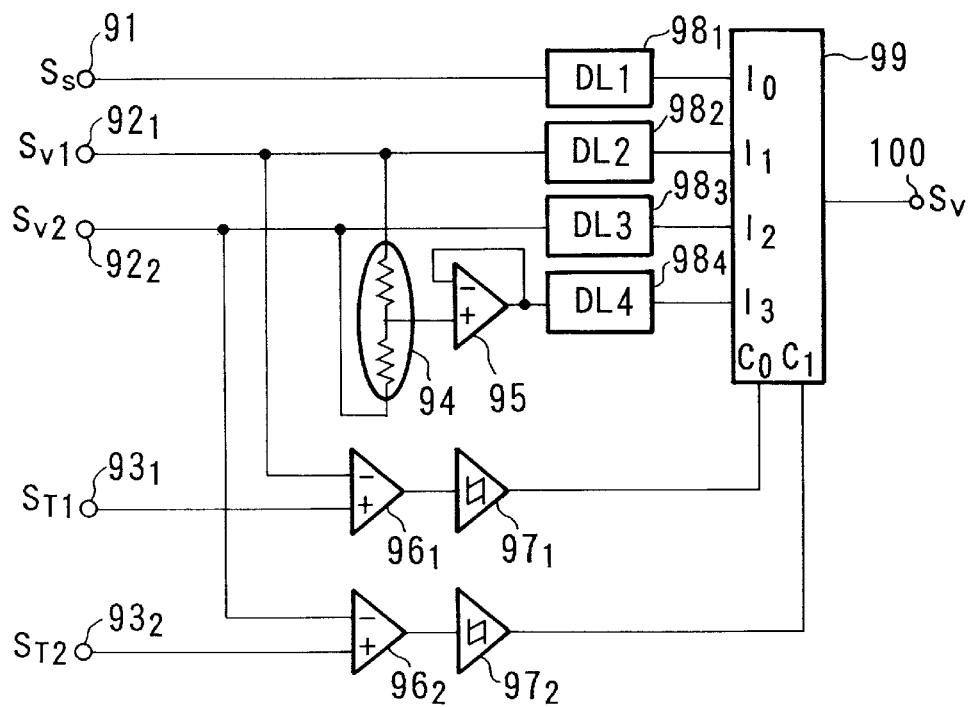
FIG. 19 is a block diagram showing the structure of the image synthesis apparatus described in Embodiment 10 of the present invention.

In the following, the Embodiment 10 of the present invention will be explained. FIG. 19 is a block diagram showing a structure of an image synthesizing apparatus according to the Embodiment 10. In FIG. 19, the image synthesizing apparatus is formed from input terminals 91, $92_1$, $92_2$, $93_1$, and $93_2$; partial resistor 94; operational amplifier 95; comparator $96_1$ and $96_2$; Schmitt trigger $97_1$ and $97_2$; delay lines $98_1$–$98_4$; analog switch 99; and output terminal 100.

One image signal $S_s$ of still image S is inputted from input terminal 91 and supplied to input terminal I0 of analog switch 99 via delay line $98_1$ possessing a predetermined delay. In addition, two image signals $S_{V1}$, $S_{V2}$ of video images $V_1$, $V_2$ are respectively inputted from input terminals $92_1$, $92_2$, and supplied to one input terminal of corresponding comparators 961, 962, respectively. On the other hand, the two threshold signals $S_{T1}$, $S_{T2}$ are inputted from input terminals $93_1$, $93_2$, respectively, and then supplied to the other terminals of comparators $96_1$, $96_2$, respectively. Threshold signals $S_{T1}$, $S_{T2}$ correspond to luminance thresholds $T_1$, $T_2$ previously designated for video images $V_1$, $V_2$. Comparators $96_1$, $96_2$ compare, respectively, the luminance signals of each image signal $S_{V1}$, $S_{V2}$ with the corresponding threshold signals $S_{T1}$, $S_{T2}$. In the case when each luminance signal is greater than its respective corresponding threshold signal $S_{T1}$, $S_{T2}$, a comparative signal of level "H" is outputted, while in the case when these aforementioned signals are less than or equal to their threshold signals, a comparative signal of level "L" is outputted. Each comparative signal is subsequently shaped into a waveform by means of Schmitt triggers $97_1$, $97_2$ and then supplied to control terminals C0, C1 of analog switch 99.

Image signals $S_{V1}$, $S_{V2}$ are supplied to input terminals I1, I2 of analog switch 99 via delay lines $98_2$, $98_3$ each possessing a predetermined delay, and one-half of each signal is respectively summed by means of partial resister 94. The resultant signal then undergoes "buffering" by means of operational amplifier 95 of amplification ratio 1, and is then supplied to input terminal I3 of analog switch 99 via delay line $98_4$ also possessing a predetermined delay.

Analog switch 99 then respectively sets the values of control data DC0, DC1 to "1", in the case when each of the comparative signals inputted from control terminal C0, C1 is at level "H", or sets the values of control data DC0, DC1 to "0", respectively, in the case when each signal displays a level "L". In the case when the values of control data DC0, DC1 read "11", the output signal of delay line $98_1$ inputted from input terminal I0 is selected; in the case when the aforementioned values read "01", the output signal of delay line 982 inputted from input terminal I1 is selected; in the case when the aforementioned values read "10", the output signal of delay line $98_3$ inputted from input terminal I2 is selected; and in the case when the aforementioned values read "00", the output signal of delay line $98_4$ input from input terminal I3 is selected. The selected output signal is then outputted from output terminal 100 as synthesized image signal $S_V$.

Furthermore, delay lines $98_1$–$98_4$ are provided for the purpose of adjusting the input time difference between the analog signal inputted from analog switch 99 and the aforementioned comparative signal. However, in the case when a high quality synthesized image signal $S_V$ is not in particular necessary, these structures may be omitted.

In addition, in the case when two still images are provided, i.e., as in the number of video images provided, a circuit similar to the circuit relating to image signals $S_{V1}$, $S_{V2}$ of video images $V_1$, $V_2$ in FIG. 19 is provided, and the luminance signals of each still image are respectively compared with previously set threshold signals by means of a comparator. Synthesis is then conducted at a predetermined synthesis ratio using a partial resistor or the like, and image signals $S_{V1}$, $S_{V2}$ of video images $V_1$, $V_2$ are inputted along with the image signals of the still images into an analog switch which has been expanded to contain two more input terminals and two more control terminals. Based on the comparative signal inputted from the control terminal, in the case when an image signal of a still image is selected, and when the luminance signals of the two still images are either greater or less than a threshold signal based on the comparative signal from each comparator relating to the still image, it is possible to select the image signal of the synthesized still image. In all other cases, according to the same structure, it is possible to select the image signal of a still image possessing a luminance signal less than or equal to the threshold signal.

Figure 20:
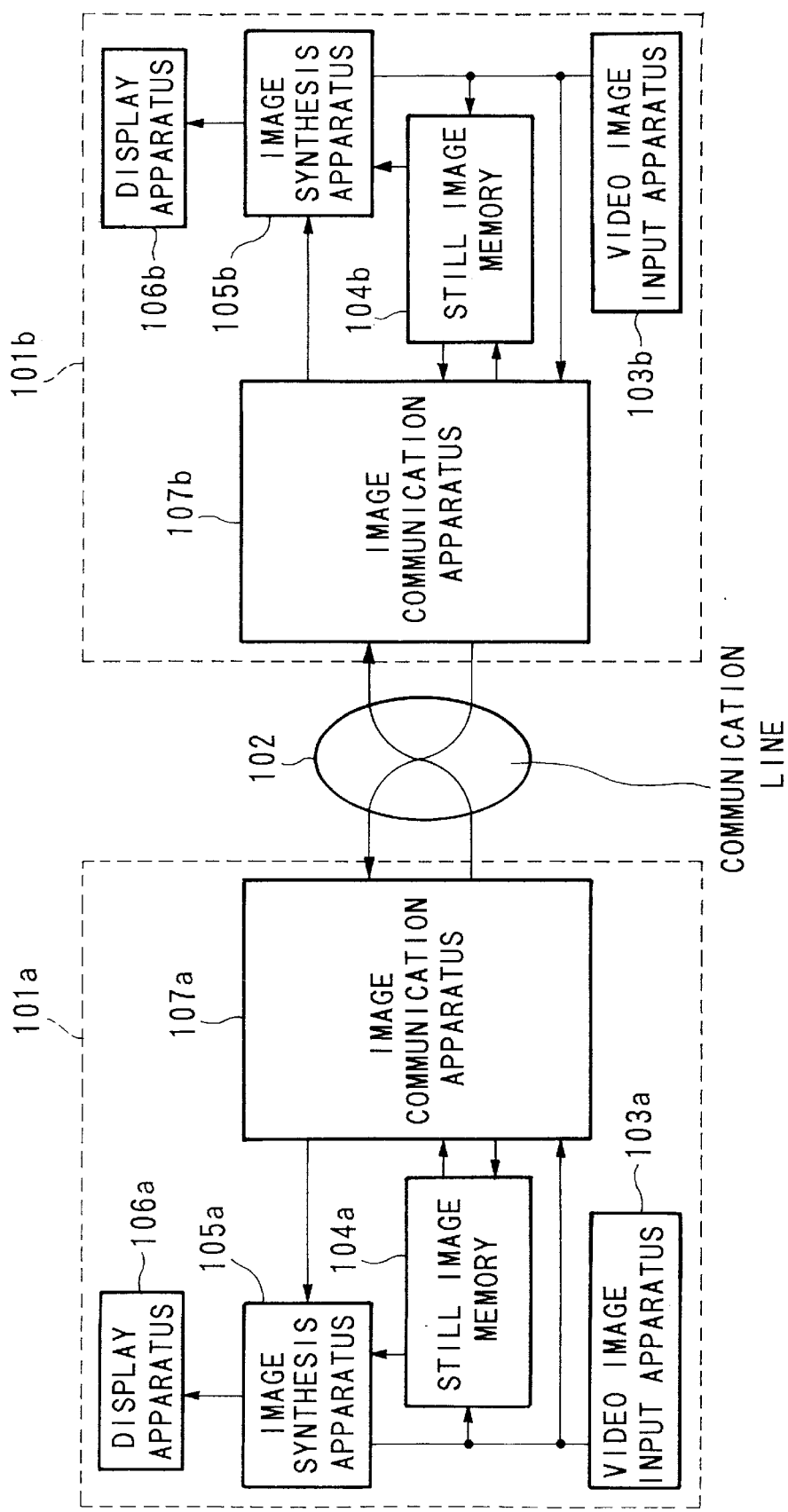
FIG. 20 is a block diagram showing a structural example of an image communication system making use of the image synthesis apparatus described in Embodiment 10 of the present invention.

FIG. 20 shows a structural example of an image communication system in which the image synthesizing apparatus according to the aforementioned Embodiment 10 is utilized. In FIG. 20, two image communication terminal units 101a, 101b are connected via communication line 102 in a manner such that interactive communication is possible (bidirectional communication). Image communication terminal units 101a, 101b comprise, respectively, video image input apparatuses 103a, 103b; still image memories 104a, 104b; image synthesizing apparatuses 105a, 105b; and display apparatuses 106a, 106b. Video image input apparatuses 103a, 103b respectively comprise a high resolution camera which can capture document text and the like in fine detail.

In the following, the actions when constructing a shared drawing (image) by joint use of the still image inputted to image communication terminal unit 101a will be explained. Initially, in image communication terminal unit 101a, in order to jointly use a document by means of image communication terminal units 101a, 101b, the document provided on a desk is captured using video image input apparatus 103a. One frame of the video image is then preserved in still image memory 104a as a still image (e.g., image 108 in FIG. 21). Subsequently, image communication apparatus 107a transmits the still image preserved in still image memory 104a via communication line 102. Image communication terminal unit 101b stores the still image from image communication terminal unit 101a in still image memory 104b.

Figure 21:
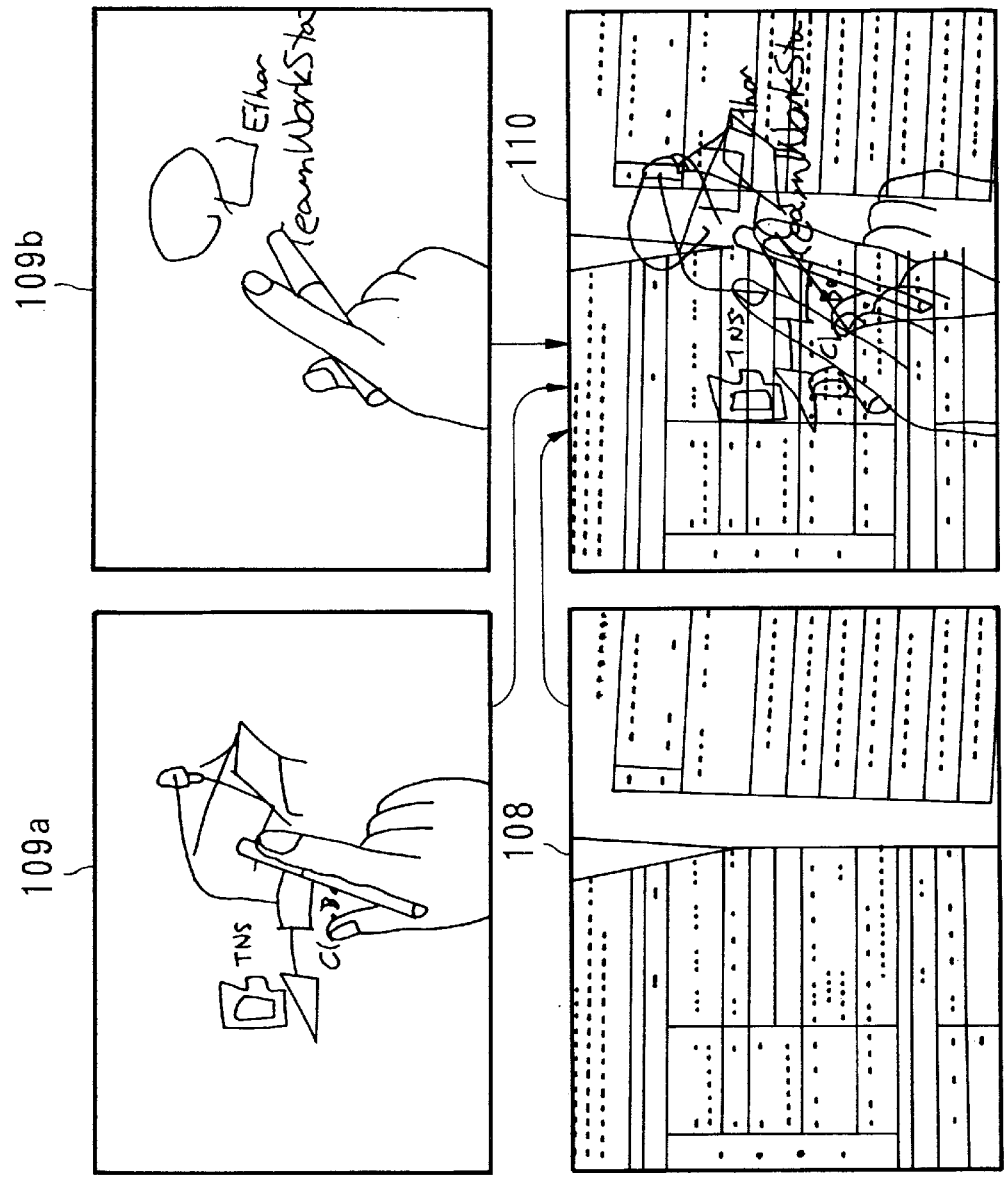
FIG. 21 is a diagram to explain the synthesis of the desktop images of each image communication terminal 101a and 101b using the image communication system shown in diagram 20.

Subsequently, in image communication terminal unit 101a, the video image (e.g., image 109a of FIG. 21) obtained by capturing a desktop using video image input apparatus 103a, is transmitted to image communication terminal unit 101b via communication line 102 by means of image communication apparatus 107a. In addition, image synthesizing apparatus 105a conducts synthesis such that image preserved in still image memory 104a (see image 108 of FIG. 21); the resultant video image (e.g., image 109a of FIG. 21) from video image input apparatus 103a; and the video image (e.g., image 109b of FIG. 21) from image communication terminal unit 101b, supplied via image communication apparatus 107a, appear transparent and discernible. An image 110, as shown in FIG. 21, is then supplied by display apparatus 106a.

In the same manner, in image communication terminal unit 101b, the video image obtained by capturing a desktop using video image input apparatus 103b, is transmitted to image communication terminal unit 101a via communication line 102 by means of image communication apparatus 107b. In addition, image synthesizing apparatus 105b conducts synthesis such that image preserved in still image memory 104b; the resultant video image from video image input apparatus 103b; and the video image from image communication terminal unit 101a, supplied via image communication apparatus 107b, appear transparent and discernible. The resultant image is then supplied to display apparatus 106b.

As explained in the aforementioned, it is possible to commonly use a document image or the like as a still image of a high precision by means of operating the above image communication system. In addition, it is also possible for a plurality of users to simultaneously line up and point to this still image, as well as make annotations using a pen.

According to the aforementioned Embodiment 10, when synthesizing video images 109a, 109b and still image 108, due to change of the synthesis process according to the luminance of each pixel, reduction of the contrast can be prevented, and synthesized images can be viewed clearly.

Embodiment 11

Figure 22:
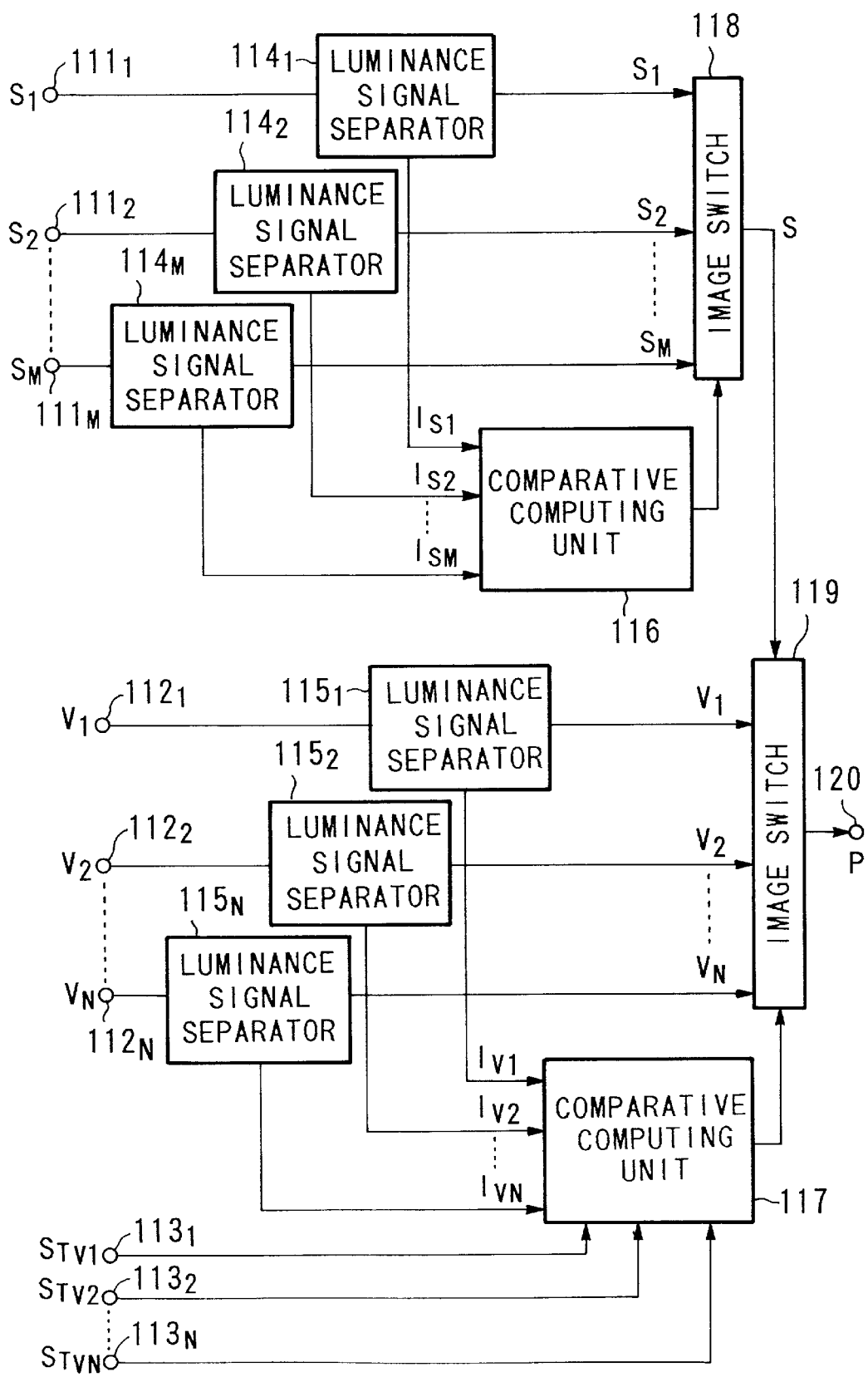
FIG. 22 is a block diagram showing the structure of the image synthesis apparatus described in Embodiment 11 of the present invention.

In the following, the Embodiment 11 of the present invention will be explained. FIG. 22 is a block diagram showing the structure of an image synthesizing apparatus according to the Embodiment 11. In FIG. 22, the aforementioned image synthesizing apparatus comprises an M number (M is a natural number) of input terminals $111_1$–$111_M$; an N number of input terminals $112_1$–$112_N$, and $113_1$–$113_N$ (N is a natural number greater than 1); an M number of luminance signal separators $114_1$–$114_m$; an N number of luminance signal separators $115_1$–$115_N$; comparative computing units 116 and 117; image switches 118 and 119; and output terminal 120.

An M number of still images $S_1$–$S_M$ are inputted, respectively, from input terminals $111_1$–$111_M$, and are supplied to the corresponding luminance signal separator $114_1$–$114_M$. Each luminance signal separator $114_1$–$114_M$ supplies an inputted still image $S_1$–$S_M$ to image switch 118, and at the same time, separates luminance signal $I_{S1}$–$I_{SM}$ from the respective still image $S_1$–$S_M$, and supplies these luminance signals to comparative computing unit 116. Comparative computing unit 116 compares the levels of luminance signals $I_{S1}$–$I_{SM}$ and reports the luminance signal of the lowest level to image switch 118. Image switch 118 then supplies the image possessing this reported luminance signal to image switch 119 as output still image S.

An N number of video images $V_1$–$V_N$ are inputted, respectively, from input terminals $112_1$–$112_N$, and are supplied to the corresponding luminance signal separator $115_1$–$115_N$. Each luminance signal separator $115_1$–$115_N$ supplies an inputted video image $V_1$–$V_N$ to image switch 119, and at the same time, separates luminance signal $I_{V1}$–$I_{VN}$ from the respective video image $V_1$–$V_N$, and supplies these luminance signals to comparative computing unit 117. An N number of threshold signals $S_{TV1}$–$S_{TVN}$ are respectively inputted from input terminals $113_1$–$113_N$, and supplied to comparative computing unit 117. Threshold signals $S_{TV1}$–$S_{TVN}$ correspond to luminance thresholds $T_{V1}$–$T_{VN}$ previously set at each video image $V_1$–$V_N$. Comparative computing unit 117 compares each luminance signal $I_{V1}$–$I_{VN}$ with the corresponding threshold signal $S_{TV1}$–$S_{TVN}$, and then supplies a natural number k corresponding to the luminance signal with the lowest luminance from among all luminance signals $I_{Vk}$ which are less than or equal to the corresponding threshold signal $S_{TVk}$ ($1 \leq k \leq N$) to image switch 119. In the case when the luminance signals $I_{V1}$–$I_{VN}$ of all N video images $V_1$–$V_N$ are greater than their corresponding threshold signals $S_{TV1}$–$S_{TVN}$, this information is reported to image switch 119. In the case when such information is reported, image switch 119 outputs the inputted synthesized still image S to output terminal 120 as output image P; in all other cases, image switch 119 outputs the video image $V_k$ corresponding to natural number k to output terminal 120 as output image P.

Embodiment 12

Figure 23:
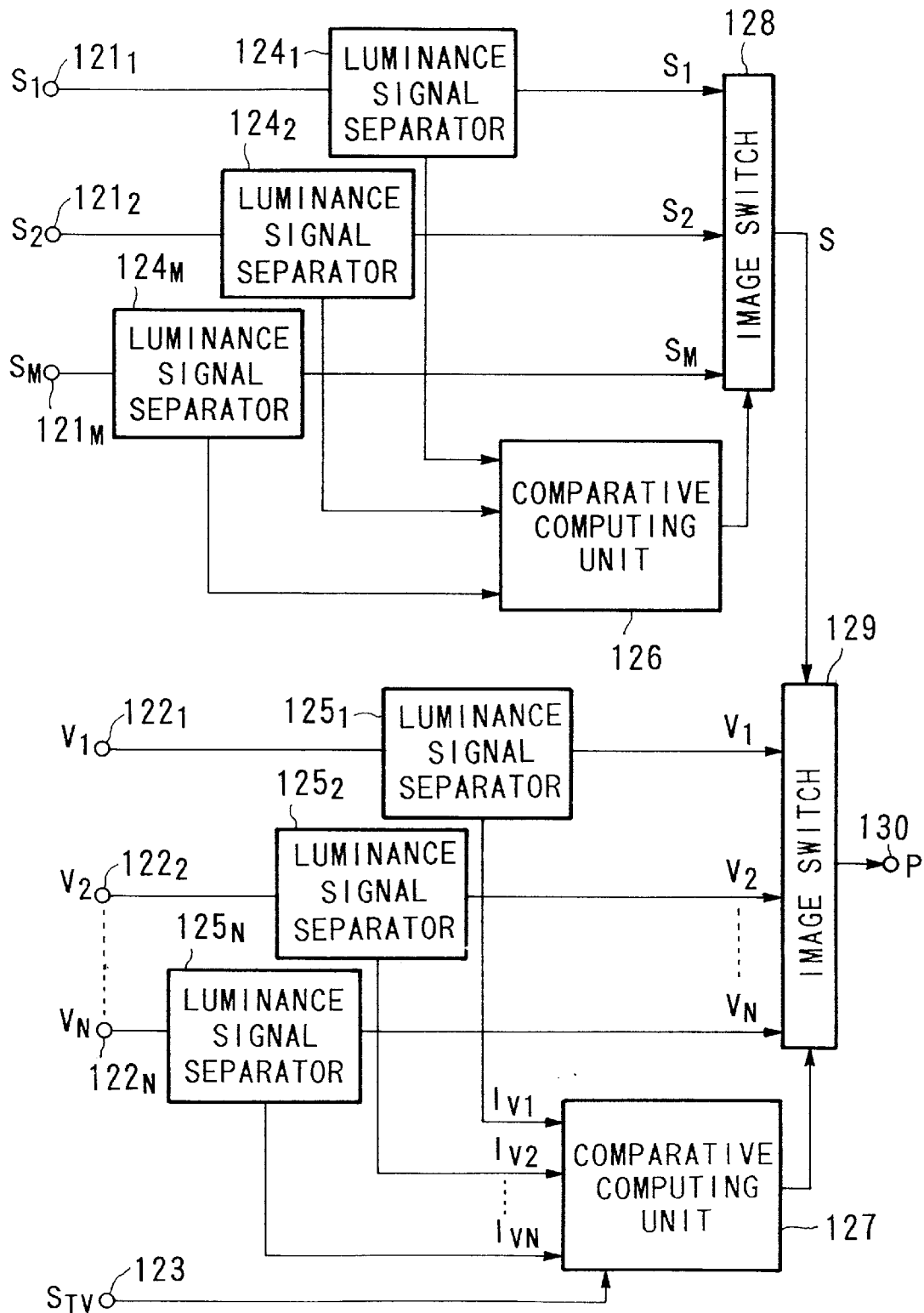
FIG. 23 is a block diagram showing the structure of the image synthesis apparatus described in Embodiment 12 of the present invention.
Figure 24:
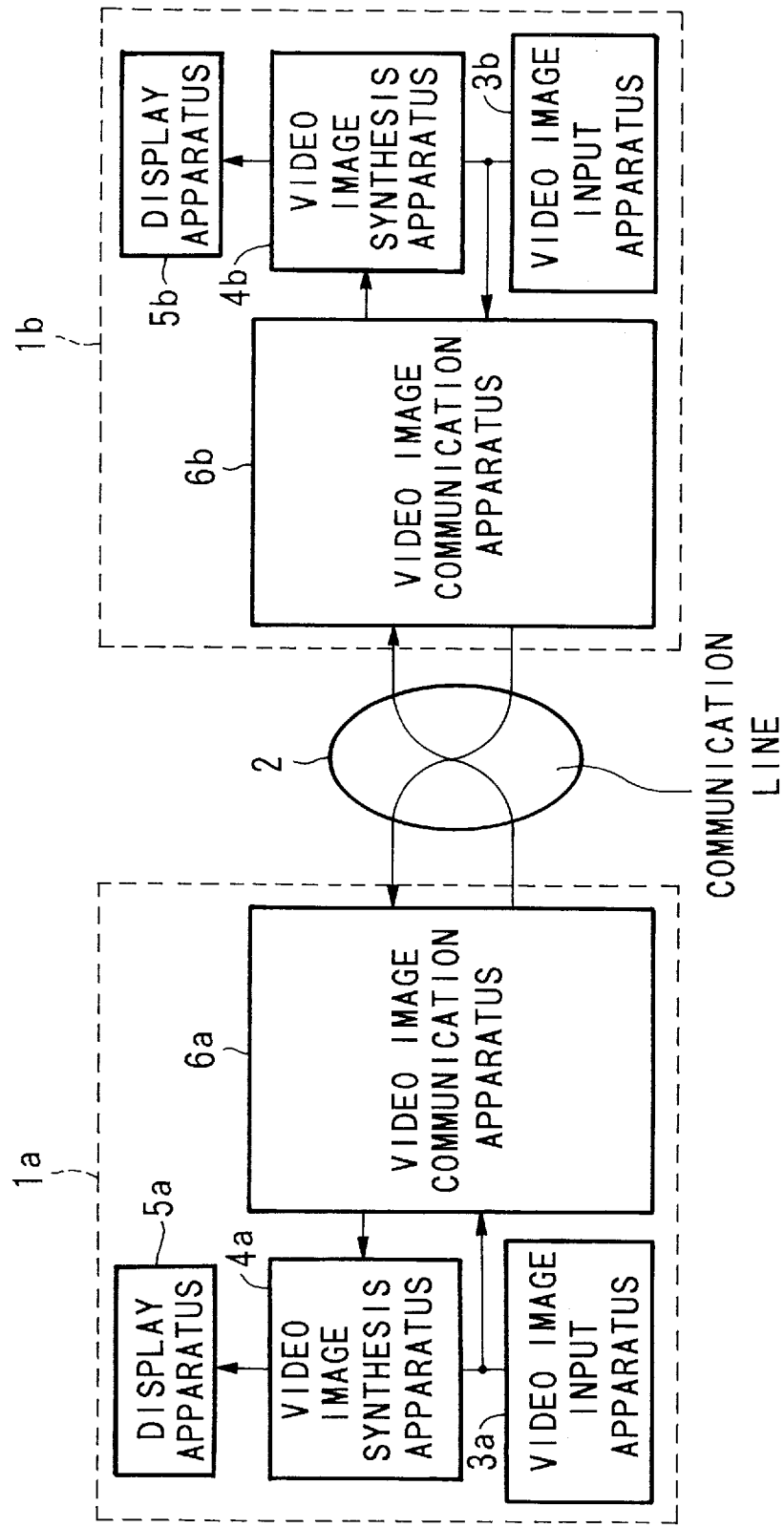
FIG. 24 is a block diagram showing a structural example of an image communication system using Prior Image Synthesis Method 1.
Figure 25:
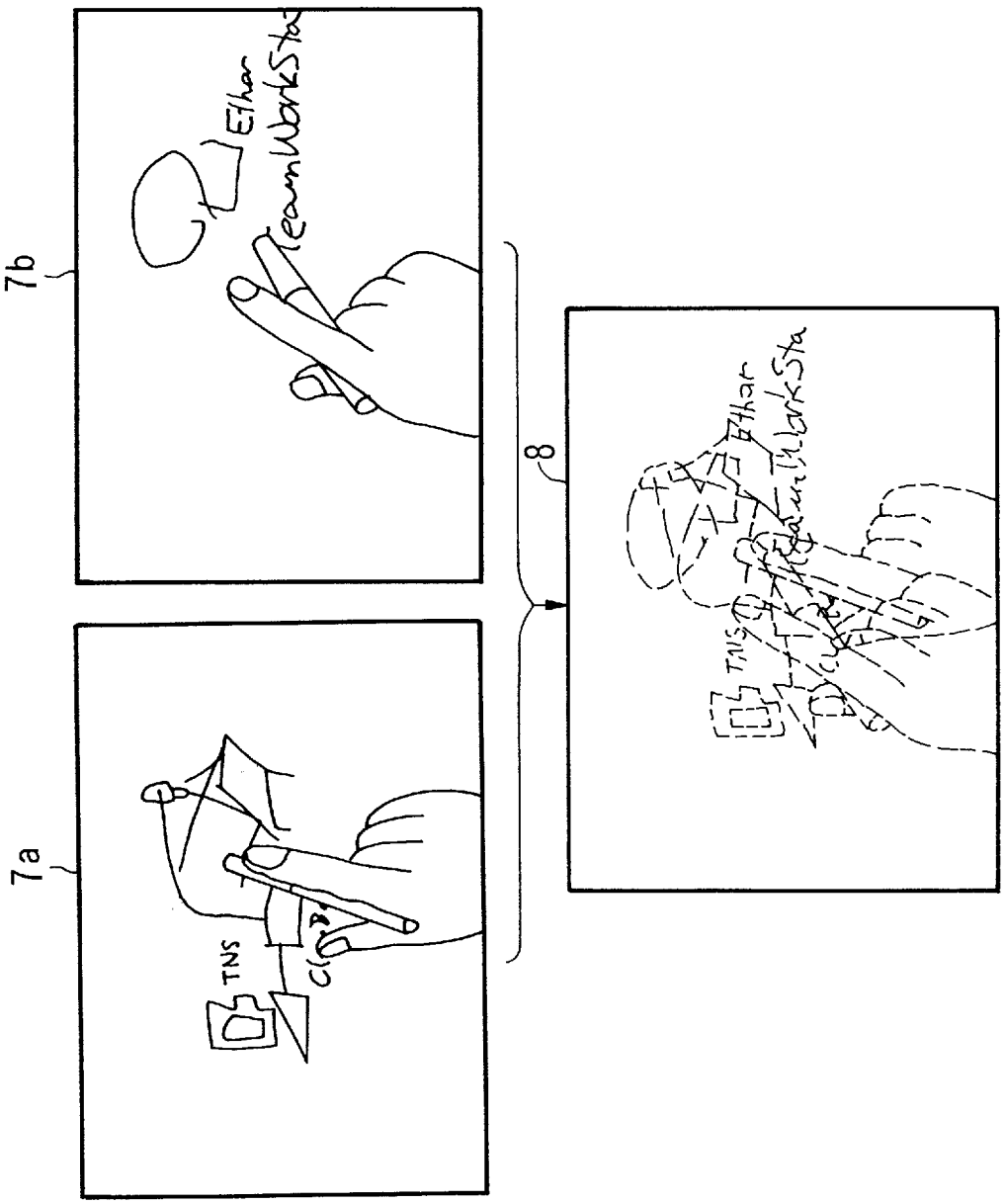
FIG. 25 is a diagram to explain Prior Image Synthesis Method 1.
Figure 26:
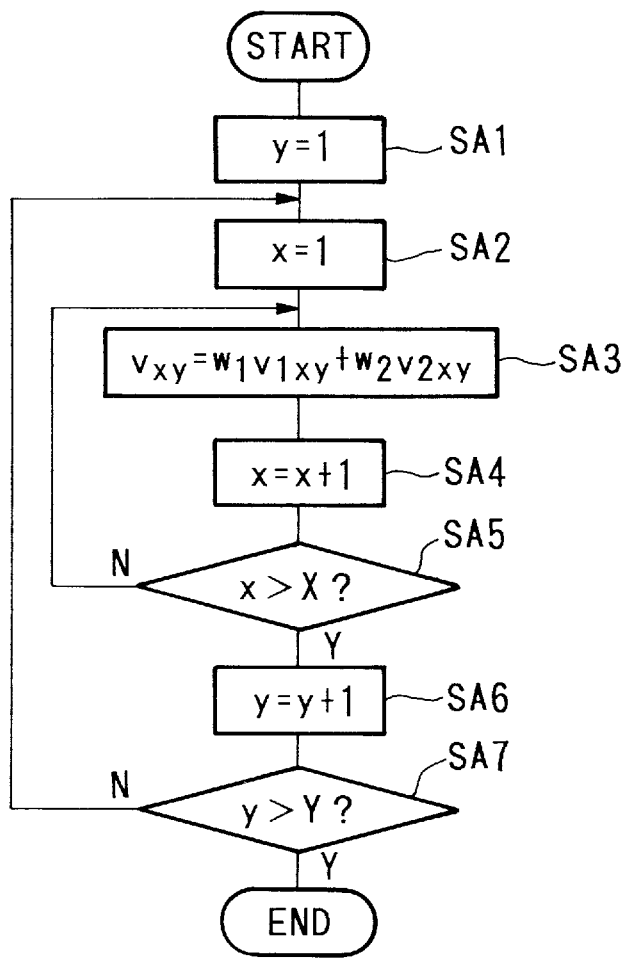
FIG. 26 is a flow chart to explain Prior Image Synthesis Method 1.

In the following, the Embodiment 12 of the present invention will be explained. FIG. 23 is a block diagram showing the structure of an image synthesizing apparatus according to the Embodiment 12. In FIG. 23, the aforementioned image synthesizing apparatus comprises an M number (M is a natural number) of input terminals 121₁–121_M; an N number of input terminals 122₁–122_N (N is a natural number greater than 1); input terminal 123; an M number of luminance signal separators 124₁–124_M; an N number of luminance signal separators 125₁–125_N; comparative computing units 126 and 127; image switches 128 and 129; and output terminal 130.

An M number of still images $S_1$–$S_M$ are inputted, respectively, from input terminals 121₁–121_M, and are supplied to the corresponding luminance signal separator 124₁–124_M. Each luminance signal separator 124₁–124_M supplies an inputted still image $S_1$–$S_M$ to image switch 128, and at the same time, separates luminance signal $I_{S1}$–$I_{SM}$ from the respective still image $S_1$–$S_M$, and supplies these luminance signals to comparative computing unit 126. Comparative computing unit 126 compares the levels of luminance signals $I_{S1}$–$I_{SM}$ and reports the luminance signal of the lowest level to image switch 128. Image switch 128 then supplies the image possessing this reported luminance signal to image switch 129 as output still image S.

An N number of video images $V_1$–$V_N$ are inputted, respectively, from input terminals 122₁–122_N, and are supplied to the corresponding luminance signal separator 125₁–125_N. Each luminance signal separator 125₁–125_N supplies an inputted video image $V_1$–$V_N$ to image switch 129, and at the same time, separates luminance signal $I_{V1}$–$I_{VN}$ from the respective video image $V_1$–$V_N$, and supplies these luminance signals to comparative computing unit 127. A threshold signal $S_{TV}$ is inputted from input terminal 123, and supplied to comparative computing unit 127. Threshold signal $S_{TV}$ corresponds to the luminance threshold $T_V$ of a pixel commonly preset for all video images $V_1$–$V_N$. Comparative computing unit 127 compares each luminance signal $I_{V1}$–$I_{VN}$, and then reports a natural number k corresponding to the luminance signal with the lowest luminance from among all luminance signals $I_{Vk}$ ($1 \leq k \leq N$) to image switch 129. In addition, comparative computing unit 127 compares the luminance signal with the lowest luminance $I_{Vk}$ with the threshold signal $S_{TV}$. In the case when the luminance signal $I_{Vk}$ is greater than threshold signals $S_{TV}$, this information is reported to image switch 129. In the case when such information is reported, i.e., information that luminance signal $I_{Vk}$ is greater than threshold signals $S_{TV}$, image switch 129 outputs the inputted synthesized still image S to output terminal 130 as output image P; in all other cases, image switch 129 outputs the video image $V_k$ corresponding to natural number k to output terminal 130 as output image P.

What is claimed is:

1. A method of synthesizing an image on a display terminal of a video communication system from N images $P_1$–$P_N$ corresponding to writings and hand writings generated by multiple users at remote locations to generate a clear and coherent resultant image for group work, said images corresponding to a plurality of regions, the method comprising the steps of:

comparing a luminance $I_{p1xy}$–$I_{pNxy}$ of each pixel $P_{1xy}$–$P_{Nxy}$ positioned at same coordinates (x,y) of said N images $P_1$–$P_N$ with a predetermined threshold $T_1$–$T_N$ corresponding to each of said images $P_1$–$P_N$, N being a natural number greater than 1;

determining a synthesized pixel $P_{xy}$ at said coordinates (x,y) of a synthesized image by synthesizing said pixels $P_{1xy}$–$P_{Nxy}$ using a predetermined synthesis ratio for each of said images $P_1$–$P_N$ when said luminance $I_{p1xy}$–$I_{pNxy}$ of said pixels $P_{1xy}$–$P_{Nxy}$ are all greater than the corresponding threshold $T_1$–$T_N$;

determining said synthesized pixel $P_{xy}$ at said coordinates (x,y) of said synthesized image by synthesizing pixels having a luminance less than or equal to the corresponding threshold $T_1$–$T_N$ using an arbitrary synthesis ratio when luminance of at least one of said pixels is less than or equal to the corresponding threshold; and repeating the above steps for each of the regions to be synthesized, to generating the clear and coherent resultant image.

2. A method of synthesizing an image on a display terminal of a video communication system from N images $P_1$–$P_N$ corresponding to writings and hand movements generated by multiple users at remote locations to generate a clear and coherent resultant image for group work, said images corresponding to a plurality of regions, the method comprising the steps of:

comparing a luminance $I_{p1xy}$–$I_{pNxy}$ of each pixel $P_{1xy}$–$P_{Nxy}$ positioned at same coordinates (x,y) of said N images $P_1$–$P_N$ to each other, N being a natural number greater than 1;

taking a pixel having the lowest luminance among said pixels $P_{1xy}$–$P_{Nxy}$ as a synthesized pixel $P_{xy}$ at said coordinates (x,y) of a synthesized image; and repeating the above steps for each of the regions to be synthesized, to generate the clear and coherent resultant image.

3. A method of synthesizing an image on a display terminal of a video communication system from N video images $P_1P_N$ and M still images $S_1$–$S_M$ corresponding to writings and hand movements generated by multiple users at remote locations to generate a clear and coherent resultant image for group work, said video and still images corresponding to a plurality of regions, N being a natural number greater than 1 and M being a natural number, the method comprising the steps of:

determining a value of M, and when M is 1, taking a still image $S_1$ as a synthesized still image S;

comparing, when M is greater than 1, a luminance $I_{s1xy}$–$I_{sMxy}$ of each pixel $S_{1xy}$–$S_{Mxy}$ positioned at same coordinates (x,y) of said M still images $S_1$–$S_M$ with a predetermined threshold $T_{s1}$–$T_{sM}$ corresponding to each of said still images $S_1$–$S_M$;

determining a synthesized still pixel $s_{xy}$ at said coordinates (x,y) of a synthesized still image S by synthesizing said pixels $s_{1xy}$–$s_{Mxy}$ using a predetermined synthesis ratio for each of said still images $S_1$–$S_M$ when said luminances $I_{s1xy}$–$I_{smxy}$ of said pixels $s_{1xy}$–$s_{Mxy}$ are all greater than the corresponding threshold $T_{s1}$–$T_{sM}$;

determining said synthesized still pixel $s_{xy}$ at said coordinates (x,y) of said synthesized still image S by synthesizing pixels having a luminance less than or equal to the corresponding threshold $T_{s1}$–$T_{sM}$ using an arbitrary synthesis ratio when at least one of said pixels has a luminance less than or equal to the corresponding threshold;

repeating the above steps for each of the regions to be synthesized;

comparing a luminance $I_{v1xy}$–$I_{vNxy}$ of each pixel $v_{1xy}$–$v_{Nxy}$ positioned at same coordinates (x,y) of said N video images $V_1$–$V_N$ with a predetermined threshold $T_{v1}$–$T_{vN}$ corresponding to each of said video images $V_1$–$V_N$;

taking said synthesized still pixel $s_{xy}$ at said coordinates (x,y) of said synthesized still image S as a synthesized pixel $P_{xy}$ at said coordinates (x,y) of a synthesized image P when said luminances $I_{v1xy}$–$I_{vNxy}$ of said pixels are all greater than the corresponding threshold $T_{v1}$–$T_{vN}$;

determining said synthesized pixel $P_{xy}$ at said coordinates (x,y) of said synthesized image P by synthesizing pixels having a luminance less than or equal to the corresponding threshold $T_{v1}$–$T_{vN}$ among said pixels $V_{1xy}$–$V_{Nxy}$ using an arbitrary ratio when at least one of said pixels has a luminance less than or equal to the corresponding threshold; and repeating the above steps for each of the regions to be synthesized, to generate the clear and coherent resultant image.

4. A method of synthesizing an image on a display terminal of a video communication system from N video images and M still images generated by multiple users at remote locations. said video and still images corresponding to a plurality of regions, N being a natural number greater than 1 and M being a natural number, the method comprising the steps of:

determining a value of M, and when M is 1, taking a still image $S_1$ as a synthesized still image S;

comparing, when M is greater than 1, a luminance $I_{s1xy}$–$I_{sMxy}$ of each pixel $s_{1xy}$–$s_{Mxy}$ positioned at same coordinates (x,y) of said M still images $S_1$–$S_M$ to each other;

taking a pixel having a lowest luminance among said pixels $s_{1xy}$–$s_{Mxy}$ as a synthesized still pixel $s_{xy}$ at said coordinates (x,y) of a synthesized still image S;

repeating the above steps for each of the comparing a luminance $I_{v1xy}$–$I_{vNxy}$ of each pixel $v_{1xy}$–$v_{Nxy}$ positioned at same coordinates (x,y) of said N video images $V_1$–$V_N$ with a predetermined threshold $T_{v1}$–$T_{vN}$ corresponding to each of said video images $V_1$–$V_N$;

taking said synthesized still pixel $s_{xy}$ at said coordinates (x,y) of said synthesized still image S as a synthesized pixel $P_{xy}$ at said coordinates (x,y) of a synthesized image P when said luminance $I_{v1xy}$–$I_{vNxy}$ of said pixels $v_{1xy}$–$v_{Nxy}$ are all greater than the corresponding threshold $T_{v1}$–$T_{vN}$;

taking a pixel having a lowest luminance among the pixels having a luminance less than or equal to the corresponding threshold $T_{v1}$–$T_{vN}$ among said pixels $v_{1xy}$–$v_{Nxy}$ as said synthesized pixel $P_{xy}$ at said coordinates (x,y) of said synthesized image P when at least one of said pixels has a luminance less than or equal to the corresponding threshold; and repeating the above steps for each of the regions to be synthesized, thereby generating the clear and coherent resultant image.

5. A method of synthesizing an image on a display terminal of a video communication system from N video images and M still images generated by multiple users at remote locations, said video and still images corresponding to a plurality of regions, N being a natural number greater than 1 and M being a natural number, the method comprising the steps of:

determining a value of M, and when M is 1, taking a still image $S_1$ as a synthesized still image S;

comparing, when M is greater than 1, a luminance $I_{s1xy}$–$I_{sMxy}$ of each pixel $s_{1xy}$–$s_{Mxy}$ positioned at same coordinates (x,y) of M still images $S_1$–$S_M$ to each other;

taking a pixel having a lowest luminance among said pixels $s_{1xy}$–$s_{Mxy}$ as a synthesized still pixel $s_{xy}$ at said coordinates (x,y) of a synthesized still image S;

repeating the above steps for each of the regions to be synthesized;

comparing a luminance $I_{v1xy}$–$I_{vNxy}$ of each pixel $V_{1xy}$–$V_{Nxy}$ positioned at same coordinates (x,y) of said N video images $V_1$–$V_N$ to each other;

selecting a pixel having a lowest luminance among said pixels $v_{1xy}$–$v_{Nxy}$;

taking said synthesized still pixel $s_{xy}$ at said coordinates (x,y) of said synthesized still image S as a synthesized pixel $p_{xy}$ at said coordinates (x,y) of a synthesized image P when a luminance of the selected pixel is greater than a predetermined threshold;

taking said selected pixel as said synthesized pixel $p_{xy}$ at said coordinates (x,y) of said synthesized image P when the luminance of the selected pixels is less than or equal to the predetermined threshold; and repeating the above steps for each of the regions to be synthesized, to generate the clear and coherent resultant image.

6. An apparatus for synthesizing an image on a display terminal of a video communications system from N images $P_1$–$P_N$ generated by multiple users at remote locations, pixel by pixel for every pixel, N being a natural number greater than 1, the apparatus comprising:

comparing means for comparing a luminance signal $I_{p1xy}$–$I_{pNxy}$ of each pixel $P_{1xy}$–$P_{Nxy}$ positioned at same coordinates (x,y) of said N images $P_1$–$P_N$, received from remote locations, with a predetermined threshold luminance signal $S_{T1}$–$S_{TN}$ corresponding to each of said images $P_1$–$P_N$, and for outputting first information when said luminance signals $I_{p1xy}$–$I_{pNxy}$ are all greater than the corresponding threshold luminance signal $S_{T1}$–$S_{TN}$ and outputting second information regarding the luminance signals less than or equal to the corresponding threshold luminance signal $S_{T1}$–$S_{TN}$ when the luminance of the selected pixels is less than or equal to the predetermined threshold; and synthesizing means for synthesizing an image from said images $P_1$–$P_N$ with a predetermined ratio for each of said images $P_1$–$P_N$, when said first information is ouputted from the comparing means, for synthesizing an image from images having the corresponding luminance signals to said second information among said images $P_1$–$P_N$ with arbitrary ratio when said second information is ouputted from the comparing means.

7. An apparatus for synthesizing an image on a display terminal of a video communication system from N images $P_1$–$P_N$ generated by multiple users at remote locations. pixel by pixel for every pixel, N being a natural number greater than 1, the apparatus comprising:

comparing means for comparing a luminance signal $I_{p1}$–$I_{pN}$ of each of pixel $P_{1xy}$–$P_{Nxy}$ positioned at same coordinates (x, y) of said N images $P_1$–$P_N$ received from the remote locations, and outputting information regarding a lowest luminance signal; and selection means for selecting the pixel having the lowest luminance signal as a synthesized pixel $P_{xy}$ at coordinates (x, y) of a synthesized image.

8. An apparatus for synthesizing an image on a display terminal of a video communication system from N video images and M still images generated by multiple users at remote locations, pixel by pixel for every pixel, N being a natural number greater than 1 and M being a natural number, the apparatus comprising:

first comparing means for comparing a luminance signal $I_{s1}$–$I_{sM}$ of each pixel positioned at same coordinates (x, y) of said M still images $S_1$–$S_M$ with a predetermined threshold luminance signal $S_{Ts1}$–$S_{TsM}$ corresponding to each of said still images $S_1$–$S_M$, outputting first information when said luminance signals $I_{s1xy}$–$I_{smxy}$ are all greater than the corresponding threshold signals $S_{Ts1}$–$S_{TsM}$, and outputting second information regarding the luminance signals less than or equal to the corresponding threshold signals $S_{Ts1}$–$S_{TsM}$ when at least one of said pixels has a luminance less than or equal to the corresponding threshold;

first synthesizing means for synthesizing a synthesized still image from said still images $S_1$–$S_M$ with predetermined synthesis ratio for each of said still images $S_1$–$S_M$ when said first information is ouputted from the first comparing means, and synthesizing a synthesized still image from the corresponding images to said second information at an arbitrary ratio when said second information is ouputted from the first comparing means;

second comparing means for comparing a luminance signal $I_{v1}$–$I_{vN}$ of each pixel positioned at same coordinates (x, y) of said N video images $V_1$–$V_N$ with each of predetermined threshold luminance signal $S_{Tv1}$–$S_{TvN}$ corresponding to each of said video images $V_1$–$V_N$, and when said luminance signals $I_{v1xy}$–$I_{vNxy}$ are all greater than the corresponding threshold luminance signals $S_{Tv1}$–$S_{TvN}$ outputting third information indicating that at least one of said pixels has a luminance less than or equal to the corresponding threshold, outputting fourth information regarding the luminance signals less than or equal to the corresponding threshold luminance signals $S_{Tv1}$–$S_{TvN}$;

second synthesizing means for outputting said synthesized still image as a synthesized image when said third information is ouputted from the second comparison means, and for synthesizing a synthesized image from an image having the corresponding luminance signals to said fourth information among said images $V_1$–$V_N$ with arbitrary ratio when at least one of said pixels has a luminance less than or equal to the corresponding threshold.

9. An apparatus for synthesizing an image on a display terminal of a video communication system from N video images and M still images generated by multiple users at remote locations, pixel by pixel for every pixel, N being a natural number greater than 1 and M being a natural number, the apparatus comprising:

first comparison means for comparing a luminance signal $I_{s1} \propto I_{sM}$ of each pixel positioned at same coordinates (x,y) of M still images $S_1$–$S_M$ received from remote locations, and outputting first information regarding a lowest luminance signal;

selection means for selecting a still image having the luminance signal corresponding to said first information and outputting the selected still image as a synthesized still image;

second comparison means for comparing a luminance signal $I_{v1}$–$I_{vN}$ of each pixel of each of said N video images $V_1$–$V_N$ with a predetermined threshold luminance signal $S_{Tv1}$–$S_{TvN}$ corresponding to each of said video images $V_1$–$V_N$ and when said luminance signals $I_{v1xy}$–$I_{vNxy}$ are greater than the corresponding threshold luminance signals $S_{Tv1}$–$S_{TvN}$ outputting second information or outputting the lowest luminance signal as third information when at least one of said pixels has a luminance less than or equal to the corresponding threshold; and synthesizing means for outputting said synthesized still image as a synthesized image when said second information is ouputted from the second comparison means, and for outputting the video image having the luminance signal corresponding to said third information as said synthesized image when at least one of said pixels has a luminance less than or equal to the corresponding threshold.

10. An apparatus for synthesizing an image on a display terminal of a video communication system from N video images $V_1$–$V_N$ and M still images $S_1$–$S_M$ generated by multiple users at remote locations, pixel by pixel for every pixel, N being a natural number greater than 1 and M being a natural number, the apparatus comprising:

first comparison means for comparing a luminance signal $I_{s1}$–$I_{sM}$ of each pixel positioned at same coordinates of M still images $S_1$–$S_M$, and outputting first information regarding the lowest luminance signal;

selection means for selecting the still image corresponding to said first information and outputting the selected still image as a synthesized still image;

second comparison means for comparing a luminance signal $I_{v1}$–$I_{vN}$ of each pixel of said N video images $V_1$–$V_N$ and outputting second information regarding a lowest luminance signal, comparing the lowest luminance signal with a predetermined threshold luminance signal, and when the lowest luminance signal is greater than said threshold luminance signal, outputting third information; and synthesizing means for outputting said synthesized still image as a synthesized image when said third information is ouputted from the second comparison means, and for outputting the video image corresponding to said second information as said synthesized image when said lowest luminance signal has a luminance less than or equal to the corresponding threshold.

* * * * *